US007114340B2

(12) United States Patent
Pecharsky et al.

(10) Patent No.: US 7,114,340 B2
(45) Date of Patent: Oct. 3, 2006

(54) METHOD OF MAKING ACTIVE MAGNETIC REFRIGERANT MATERIALS BASED ON GD-SI-GE ALLOYS

(75) Inventors: Alexandra O. Pecharsky, Ames, IA (US); Karl A. Gschneidner, Jr., Ames, IA (US); Vitalij K. Pecharsky, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 228 days.

(21) Appl. No.: 10/413,417

(22) Filed: Apr. 14, 2003

(65) Prior Publication Data

US 2003/0221750 A1 Dec. 4, 2003

Related U.S. Application Data

(63) Continuation-in-part of application No. 09/793,822, filed on Feb. 23, 2001, now Pat. No. 6,589,366.

(60) Provisional application No. 60/187,713, filed on Mar. 8, 2000.

(51) Int. Cl.
 F25B 21/00 (2006.01)
 H01F 1/053 (2006.01)
(52) U.S. Cl. ............... 62/3.1; 62/6; 62/4; 62/51.1; 505/889; 505/890; 505/891; 148/301; 148/101; 420/416
(58) Field of Classification Search ............... 148/101, 148/102, 103, 301, 303, 302, 120, 121, 122; 62/3.1, 4, 6, 51.1
See application file for complete search history.

(56) References Cited

U.S. PATENT DOCUMENTS

| 5,332,029 A | * | 7/1994 | Tokai et al. .............. 165/4 |
| 5,743,095 A | | 4/1998 | Gschneidner et al. ........ 62/3.1 |
| 6,022,486 A | | 2/2000 | Tokai et al. ................ 252/67 |
| 6,030,468 A | | 2/2000 | Yagi et al. ................ 148/301 |
| 6,336,978 B1 | | 1/2002 | Tokai et al. ............... 148/301 |

OTHER PUBLICATIONS

Hansen, Constitution of Binary Alloys, 1958, pp. 772, 774, 1193 and 1205.*
L. Morellon, P.A. Algarabel, M.R. Ibarra, J. Blasco, and B. Garcia-Landa, "Magnetic-field-induced structural phase transition in $Gd_5(Si_{1.8}Ge_{2.2})$", Phys. Rev. B58, 721-724 (1998).
L. Morellon, J. Stankiewicz, B. Garcia-Landa, P.A. Algarabel, and M.R. Ibarra, "Giant magnetoresistance near the magnetostructural transition in $Gd_5(Si_{1.8}Ge_{2.2})$", Appl. Phys. Lett. 73, 3462-3464 (1998).
L. Morellon, J. Blasco, P.A. Algarabel, and M.R. Ibarra, "Nature of the first-order antiferromagnetic-ferromagnetic transition in the Ge-rich magnetocaloric compounds $Gd_5(Si_xGe_{1-x})_4$", Phys. Rev. B62, 1022-1026 (2000).
J. Stankiewicz, L. Morellon, P.A. Algarabel, and M.R. Ibarra, "Hall effect in $Gd_5(Si_{1.8}Ge_{2.2})$", Phys. Rev. B61, 12651-12653 (2000).

(Continued)

*Primary Examiner*—John Patrick Sheehan

(57) ABSTRACT

An alloy made of heat treated material represented by $Gd_5(Si_xGe_{1-x})_4$ where $0.47 \leq x \leq 0.56$ that exhibits a magnetic entropy change $(-\Delta S_m)$ of at least 16 J/kg K, a magnetostriction of at least 2000 parts per million, and a magnetoresistance of at least 5 percent at a temperature of about 300K and below, and method of heat treating the material between 800 to 1600 degrees C. for a time to this end.

8 Claims, 32 Drawing Sheets

OTHER PUBLICATIONS

L. Morellon, P.A. Algarabel, C. Magen, and M.R. Ibarra, "Giant magnetoresistance in the Ge-rich magnetocaloric compound, $Gd_5(Si_{0.1}Ge_{0.9})_4$", J. Magn. Magn. Mater. 237, 119-123 (2001).

E.M. Levin, V.K. Pecharsky, and K.A. Gschneidner, Jr., "Magnetic field and temperature dependencies of the electrical resistance near the magnetic crystallographic first order phase transition of $Gd_5(Si_2Ge_2)$", Phys. Rev. B60, 7993-7997 (1999).

V.K. Pecharsky and K.A. Gschneidner, Jr., "Phase relationships and Crystallography in the Pseudobinary System $Gd_5Si_4$-$Gd_5Ge_4$", J. Alloys Compds. 260, 98-106 (1997).

V.K. Pecharsky and K.A. Gschneidner, Jr., "Tunable Magnetic Regenerator Alloys with a Giant Magnetocaloric Effect for Magnetic Refrigeration from ~20 to~290K", Appl. Phys. Lett. 70, 3299-3301 (1997).

V.K. Pecharsky and K.A. Gschneidner, Jr., "Giant Magnetocaloric Effect in $Gd_5(Si_2Ge_2)$", Phys. Rev. Lett. 78, 4494-4497 (1997).

V.K. Pecharsky and K.A. Gschneider, Jr., "Effect of Alloying on the Giant Magnetocaloric Effect of $Gd_5(Si_2Ge_2)$", J. Magn. Magn. Mater. 167, L179-L184 (1997).

T.B. Massalski, Editor-in-Chief, Binary Alloy Phase Diagrams, 2nd ed., ASM International, Materials Park, Ohio (1990).

D.H. Dennison, M.J. Tschetter and K.A. Gschneidner, Jr., "The Solubility of Tantalum in Eight Liquid Rare-Earth Metals" J. Less-Common Metals 10, 109-115 (1965).

P. Rogl, "Phase Equilibria in Ternary and Higher Order Systems with Rare Earth Elements and Silicon" in Handbook on the Physics and Chemistry of Rare Earths, K.A. Gschneidner, Jr. and L. Eyring, eds., Elsevier Science Publishers, B.V., Amsterdam, pp. 92-94 (1984).

"Transformations in the $Gd_5(Si_{1.95}Ge_{2.05})$ alloy induced by the temperature and magnetic field cycling though the first-order magnetic-mantensitic phase transition", E.M. Levin et al., Physical. Review B, vol. 63, 064426-1 through 10, Jan. 23, 2001.

"Magnetic refrigeration materials", K.A. Gschneidner, Jr. et al., Journal of Applied Physics, vol. 85, No. 8, pp. 5365-5368, Apr. 15, 1999.

"Uncovering the structure-property relationships is $R_5(Si_xGe_{4-x})$ intermetallic phases" Vitalij K. Pecharscy et al., Journal of Alloys and Compounds, vol. 344, pp. 362-368, 2002.

"The effect of varying the crystal structure on the magnetism, electronic structure and thermodynamics in the $Gd_5(Si_yGe_{y-x})_4$ system near x=0.5", V.K. Pecharsky et al., Journal of Solid State Chemistry, vol. 171, pp. 57-68, 2003.

"The room temperature metastable/stabe phase relationships in the pseudo-binar, $Gd_5$ $Si_4$—$Gd_gGe_y$ System" A.O Pecharsky et al., Journal of Alloys and Compounds, vol. 338, pp. 126-135 2002.

* cited by examiner

METHOD OF MAKING ACTIVE MAGNETIC REFRIGERANT MATERIALS BASED ON GD-SI-GE ALLOYS

RELATED APPLICATION

The application is a continuation-in-part of Ser. No. 09/793,822 filed on Feb. 23, 2001, now U.S. Pat. No 6,589,366 issued Jul. 8, 2003, claiming benefit of provisional application Ser. No. 60/187,713 filed Mar. 8, 2000.

CONTRACTUAL ORIGIN OF INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to magnetic refrigeration, magnetostrictive, and magnetoresistive materials and, more particularly, to methods of making active magnetic refrigerant regenerator alloys, and magnetostrictive and magnetoresistive materials.

BACKGROUND OF THE INVENTION

Magnetic refrigeration is being considered as an alternative technique to gas compressor technology for cooling and heating based on engineering and economic considerations that indicate that magnetic regenerator refrigerators, in principle, are more efficient than gas cycle refrigerators and thus can yield savings in the cost of operation and conservation of energy.

Magnetic refrigeration utilizes the ability of a magnetic field to affect the magnetic part of a solid material's entropy to reduce it and, therefore, increase the lattice (vibrational) part of the entropy in an isothermal process or the temperature of the solid material in an adiabatic process. When the magnetic field is removed, the change or return of the magnetic entropy of the magnetic solid material reduces the temperature of the material. Thus, magnetic refrigeration is effected by cyclic heat dissipation and heat absorption in the course of adiabatic magnetization and adiabatic demagnetization of the magnetic solid material via application/discontinuance of an external magnetic field. A refrigeration apparatus that exhausts or vents the released heat on one side of the apparatus when the magnetic solid material is magnetized and cools a useful load on another side when the magnetic solid material is demagnetized is known in the magnetic refrigeration art as an active magnetic regenerator magnetic refrigerator (also known by the acronym AMR/MR).

U.S. Pat. No. 5,743,095 describes active magnetic refrigerant materials having general molecular formula $Gd_5(Si_xGe_{1-x})_4$ that provide a giant magnetocaloric effect for use in magnetic refrigerators when $0 \leq x \leq 0.5$. Also as described in that patent are alloys for $0.5 < x \leq 1.0$ which order magnetically between 295 and 335 K and have useful and large (but not giant) magnetocaloric properties. The giant magnetocaloric effect in the former alloys ($x \leq 0.5$) is due to a first order magnetic/structural transition,[1] and thus these alloys are useful for cooling applications from just below room temperature (275 K) down to liquid hydrogen temperatures (20 K). The large magnetocaloric effect in the latter alloys (x>0.5) is due to a second order magnetic transformation, making these alloys useful magnetic refrigerants for the high temperature layer of a multilayered active magnetic regenerator of a cooling device for the rejection of heat to the ambient, and also for heat pumps to reach ~350 K. The upper temperature limit can be increased from 275 K to 300 K by providing x=0.525 and heat treatment pursuant to this invention as described below such that x values of $0.525 \leq x \leq 1.0$ provide a large magnetocaloric effect material.

For most magnetic refrigeration and heat pump applications, large amounts (e.g. several hundred grams to hundreds of kilograms) of the magnetocaloric materials per device are needed to obtain sufficient cooling. For example, for a highly efficient magnetic air conditioner about 0.5 kg of magnetic refrigerant could provide a cooling power of 1 kW (kilowatt). Since a typical home requires about 5 kW of cooling power, about 2.5 kg of magnetic refrigerant are needed. For less efficient devices, more magnetic refrigerant material is required. The current process for making the giant and the large magnetocaloric materials $Gd_5(Si_xGe_{1-x})_4$ involves arc-melting the appropriate amounts of the individual elements (Gd, Si, and Ge), but this technique normally is limited to 50 to 100 gram quantities. Larger quantities can be prepared by arc-melting but generally the resulting ingots are inhomogeneous; i.e. parts of the ingot have excellent magnetocaloric properties much greater than other parts of the ingot having lower magnetocaloric properties, which at best are about the same as the current prototype magnetic refrigerant, Gd, for near room temperature applications. The ingot inhomogeneity is readily understood since, for the $Gd_5(Si_xGe_{1-x})_4$ alloys, the exact Gd to (Si+Ge) ratio 5:4 has been found to be critical. For example, small deviations from the 5:4 ratio have been found to lead to the appearance of the $Gd(Si_xGe_{1-x})$, 1:1, or $Gd_5(Si_xGe_{1-x})_3$, 5:3, phases, and therefore, to significantly reduced magnetic refrigerant cooling capacity.

These very same alloys, which exhibit the giant magnetocaloric effect, also exhibit an extremely large magnetostriction and also a large magnetoresistance when undergoing the first order transformation. Based on crystallographic data, $Gd_5(Si_2Ge_2)$ has a reversible linear colossal magnetostriction of ~10,000 parts per million (ppm) along the [100] axis, or a volumetric colossal magnetostriction of ~4500 ppm. In comparison, the magnetostriction of Terfenol-D [$(Tb_{0.7}Dy_{0.3})Fe_2$] is ~1200 ppm. Since the colossal magnetostriction is due to the first order phase transition it is expected to occur in all $Gd_5(Si_xGe_{1-x})_4$ alloys for $0 \leq x \leq 0.56$. Thus the method of this invention described herein for the production of the giant magnetocaloric materials also applies for producing the colossal magnetostrictive alloys, which are useful as actuators, positioning devices, etc. controlled by the change of the magnetic field and also for magnetoelastic sensors to detect stresses.

Measurements of the electrical resistance of $Gd_5(Si_xGe_{1-x})_4$ alloys for $0.24 \leq x \leq 0.525$ as a function of temperature and magnetic field show that there is a large (~25%) change in the resistance at the first order phase transformation when induced by a magnetic field above their respective ordering temperatures. The sign of the change is positive for x=0.375 and negative for x=0.5. Such large changes have been observed in artificial, non-rare earth, magnetic multilayered materials, and have been labeled as "giant" magnetoresistors. There are a number of applications in the electronics field for giant magnetoresistance materials, including read heads in magnetic recording devices and sensors.

Furthermore, the Si to Ge ratio is also important since the magnetic ordering (Curie) temperature ($T_C$) is strongly dependent on the relative amounts of these two elements. For example, for x greater than 0.525 for the $Gd_5(Si_xGe_{1-x})_4$ material, the giant magnetocaloric, colossal magnetostriction, and giant magnetoresistance effects are not observed; and for x greater than or equal to 0 and less than or equal to 0.525, the Curie temperature varies almost linearly with x from approximately 20 K at x=0 to approximately 300 K at x=0.525, and the material exhibits the giant magnetocaloric, colossal magentostrictive, and giant magnetoresistance effects.

Arc-melting 100 gram quantities at a time is labor intensive and thus an extremely expensive operation. Furthermore, use of commercially pure Gd (having more than 0.1 wt. % interstitial and other impurities) instead of high purity Gd (less than 0.1 wt. % impurities) to prepare the $Gd_5(Si_xGe_{1-x})_4$ material for $0 \leq x \leq 0.525$ by arc-melting has led to only average magnetocaloric properties and not the giant magnetocaloric properties desired. The magnetocaloric properties of $Gd_5(Si_xGe_{1-x})_4$ for $0.525 \leq x \leq 1.0$, however, are not nearly as sensitive to the impurities in the Gd metal used to prepare the alloys by arc-melting.

Copending Ser. No. 09/793,822, now U.S. Patent 6,589,366, describes a method of making relatively larger quantities of the $Gd_5(Si_xGe_{1-x})_4$ material for $0 \leq x \leq 1.0$ using commercially pure Gd, Si and Ge as starting charge components in a more cost effective manner.

The present invention provides a heat treatment for $Gd_5(Si_xGe_{1-x})_4$ and other alloys to provide heat treated material having improved magnetocaloric and other magnetothermal properties that are better than those of Gd metal at and near room temperature.

SUMMARY OF THE INVENTION

The present invention provides, in one embodiment, heat treated material comprising $Gd_5(Si_xGe_{1-x})_4$ where $0.47 \leq x \leq 0.56$ having magnetocaloric and other magnetic field dependent properties increased by virtue of heat treatment. The present invention can be practiced to heat treat $Gd_5(Si_xGe_{1-x})_4$ material that is made from high purity Gd, Si, and Ge melting charge components or made from commercially available Gd, Si, and Ge melting charge components that contain much higher concentration of one or more interstitial elements, such as carbon, as described in the above-referenced application Ser. No. 09/793,822, Now U.S. Pat. No. 6,589,366. The present invention also can be practiced on other materials including those represented by $R_5(Si_xGe_{1-x})_4$ where $0 \leq x \leq 1.0$ and where R is one or more rare earth elements other than Gd and also those materials represented by $(R_{1-y}R'_y)_5(Si_xGe_{1-x})_4$ where $0 \leq y \leq 1.0$ and $0 \leq x \leq 1.0$ and where R and R' each is a rare earth element and at least one of R and R' is a rare earth other than Gd.

In an illustrative embodiment of the invention, the heat treated material comprises $Gd_5(Si_xGe_{1-x})_4$ where $0.47 \leq x \leq 0.56$ and exhibits a magnetic entropy change ($-\Delta S_m$) of at least 16 J/kg K for a magnetic field change of 0 to 50 kOe at a temperature of about 300K and below, such as to least about 190K, such that the material can be utilized as a magnetic refrigerant (regenerator) at and near room temperature (295K). The heat treated material also exhibits a volumetric magnetostriction of at least 2000 parts per million and a magnetoresistance of at least 5%.

In a further embodiment of the invention, the heat treatment is conducted between about 800 degrees C. to about 1600 degrees C. for a time dependent on the composition (Si-to-Ge ratio) followed by rapid cooling to room temperature to provide a homogenous microstructure comprising monoclinic crystallographic phase $Gd_5(Si_xGe_{1-x})_4$ for $0.47 \leq x \leq 0.56$, or orthorhombic (II) crystallographic phase $Gd_5(Si_xGe_{1-x})_4$ or mixture thereof for $0.5 \leq x \leq 0.56$.

Also, other magnetic materials including but not limited to, $R_5(Si_xGe_{1-x})_4$ and $(R_{1-y}R'_y)_5(Si_xGe_{1-x})_4$ materials, where $0 \leq y \leq 1.0$ and $0 \leq x \leq 1.0$ and R and R' is/are a rare earth element or combination of rare earth elements as described above, can be produced pursuant to the invention having giant magnetocaloric properties, colossal magnetostriction and giant magnetoresistance. Such materials exhibit a magnetic entropy change ($-\Delta S_m$) of at least 10 J/kg K for a magnetic field change of 0 to 50 kOe at a temperature of about 300K and below, such as to least about 190K, and a volumetric magnetostriction of at least 2000 parts per million and a magnetoresistance of at least 5%.

Heat treatment pursuant to the invention produces a material that exhibits extraordinary magnetothermal properties, such as giant magnetocaloric effect (magnetic entropy change) based on a reversible structural/magnetic and/or a reversible ferromagnetic/antiferromagnetic first order phase transition upon heating, providing a sharp reduction in magnetization near the magnetic ordering temperature (Curie temperature). For example, the heat treated material exhibits a magnetic entropy change that is about 50% greater than that exhibited by the same alloy material arc-melted (as-cast) pursuant to U.S. Pat. No. 5,743,095. The method may include a heat treatment of as-cast $Gd_5(Si_xGe_{1-x})_4$ material for $0.47 \leq x \leq 0.56$ to obtain increased giant magnetocaloric properties (and also giant magnetostriction and magnetoresistance) at room temperature, for example where heat treatment provides magnetocaloric properties about 50% greater than that exhibited by arc-melted (as-cast) material of the same composition.

The aforementioned advantages of the present invention will become more readily apparent from the following detailed description taken with the following drawings.

DESCRIPTION OF THE DRAWINGS

FIG. 3A shows a flat piece of Ta covering the entire opening of the crucible; FIG. 3B shows an inverted, slightly larger crucible covering the opening; and FIG. 3C shows a welded-shut crucible.

DETAILED DESCRIPTION OF THE INVENTION

Figure 1:
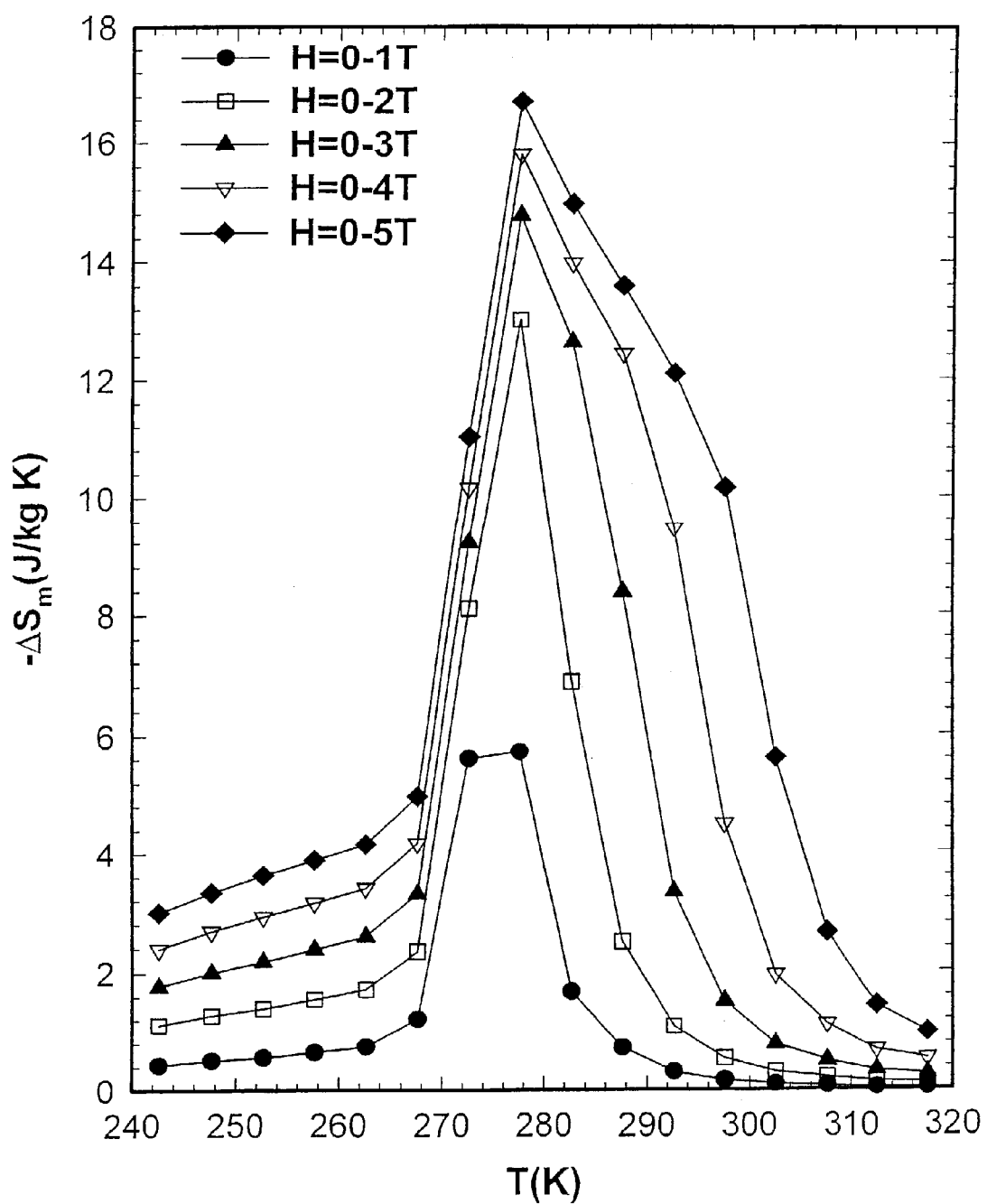
FIG. 1 illustrates the magnetocaloric effect (MCE) properties of $Gd_5(Si_2Ge_2)$ prepared by induction melting commercially available Gd plus Si and Ge in a Ta crucible pursuant to the invention.

The present invention provides in one embodiment a method of heat treating a material represented by $Gd_5(Si_xGe_{1-x})_4$ where $0.47 \leq x \leq 0.56$ made using high purity charge components or one or more commercially pure charge components as described in Ser. No. 09/793 822, now U.S. Pat. No. 6,589,366, the teachings of which are incorporated herein by reference, to provide magnetocaloric properties better than those exhibited by high purity Gd metal at room temperature. In an illustrative embodiment of the invention, the heat treated material comprises $Gd_5(Si_xGe_{1-x})_4$ where $0.47 \leq x \leq 0.56$ and exhibits a magnetic entropy change ($-\Delta S_m$) of at least 16 J/kg K for a magnetic field change of 0 to 50 kOe at a temperature of about 300K and below such as for example to about 190K such that the material can be utilized as an active magnetic refrigerant (regenerator) at and near room temperature (295K). The heat treated material also exhibits a volumetric magnetostriction of at least 2000 parts per million, a magnetostriction of at least 7000 parts per million along the [100] crystal axis, and a magnetoresistance of at least 5%.

Although the invention is described below with respect to making and heat treating the material represented by $Gd_5(Si_xGe_{1-x})_4$ where $0.47 \leq x \leq 0.56$, the invention can be used to make other magnetocaloric materials including, but not limited to, the $R_5(Si_xGe_{1-x})_4$ materials where $0 \leq x \leq 1.0$ and R is one or a combination of rare earth elements other than Gd and the $(R_{1-y}R'_y)_5(Si_xGe_{1-x})_4$ materials where $0 \leq y \leq 1.0$ and $0 \leq x \leq 1.0$ and R and R' each is a rare earth element and at least one of R and R' is a rare earth element other than Gd. The rare earth element, R and/or R', is/are selected from the group consisting of Gd, Sc, Y, La, Ce, Pr, Nd, Sm, Eu, Tb, Dy, Ho, Er, Tm, Yb, and Lu, or a combination thereof as described above. These materials exhibit a magnetic entropy change ($-\Delta S_m$) of at least 10 J/kg K for a magnetic field change of 0 to 50 kOe at a temperature of about 300K and below such as for example to about 190K in combination with a volumetric magnetostriction of at least 2000 parts per million, a magnetostriction of at least 7000 parts per million along the [100] crystal axis, and a magnetoresistance of at least 5%. The materials heat treated pursuant to the invention can also be made as colossal or giant magnetostrictive and giant magnetoresistive materials. Examples of such other $R_5(Si_xGe_{1-x})_4$ alloys include, but are not limited to, $Gd_5(Si_{0.5}Ge_{0.5})_4$, $Tb_5(Si_{0.5}Ge_{0.5})_4$, and $Dy_5(Si_{0.25}Ge_{0.75})_4$. Examples of such other $(R_{1-y}R'_y)_5(Si_xGe_{1-x})_4$ alloys include, but are not limited to, $(Gd_{0.8}Tb_{0.2})_5(Si_{0.5}Ge_{0.5})_4$, $(Gd_{0.9}Dy_{0.1})_5(Si_{0.5}Ge_{0.5})_4$, $(Gd_{3.8}Dy_{1.2})Si_4$ and $(Gd_{4.2}Er_{0.8})Si_4$. The R and/or R' can be commercially pure rare earth charge components having a relatively high content of carbon impurity, such as about 0.03 atomic % C and above (e.g. about 0.03 to 1 atomic % C impurity).

The following Example is provided to illustrate practice of the invention to make and heat treat the magnetic refrigerant material $Gd_5(Si_xGe_{1-x})_4$ where $0.47 < x \leq 0.56$ using commercially pure Gd, Si, and Ge components.

Commercially pure elements Gd, Si, and Ge were reacted in a Ta crucible to form $Gd_5(Si_2Ge_2)$. Commercially available chunks of Gd, Si, and Ge were used although pellets, powders, and other forms of these charge components can be used. The Gd chunks were placed in the bottom of the crucible with the Ge and Si chunks on top, and then the crucible and contents were heated up slowly in an induction furnace under a high vacuum ($10^{-6}$ torr) to melt the Ge (938 degrees C.) which reacted with the Gd to form a $GdGe_x$ alloy. A graphite felt radiation shield sleeve was disposed about the Ta crucible. Purity of the commercially pure Gd was 98.1 at. % (99.8 wt. %); that of the commercially pure Ge was 99.99 at. %; and that of the commercially pure Si was 99.99 at. % where at. % is atomic % and wt. % is weight %. Generally the heat of reaction of the formation of $GdGe_x$ was large enough to raise the temperature so the Si melts (1414 degrees C.) and reacts with the $GdGe_x$ phase, which results in another temperature excursion which may be high enough to melt the entire mixture. If not, the power to the induction furnace was increased to heat the charge to 1800 degrees C. and hold for 1 hour to homogenize the melt.

When large quantities >200 g (grams) of the alloy were prepared by direct reaction of the three components, it was found that because of the large heat of formation of the $Gd_5(Si_xGe_{1-x})_4$ alloy, this will lead to an excessive heat excursion and the molten Gd metal at the bottom of the crucible is in contact with the Ta for a sufficiently long time to dissolve some of the Ta before the molten Gd reacts to form the $Gd_5(Si_xGe_{1-x})_4$ alloy. The solubility of Ta in molten Gd varies from 0.07 at. % at 1381 degrees C. to 0.34 at. % at 1772 degrees $C^2$ and this may be sufficient to open pin holes in the Ta crucible, especially at the welded interfaces of the crucible bottom where it is attached to the crucible walls, allowing the molten alloy to leak out of the crucible. To overcome possible melting of the Ta crucible, a small amount of crushed $Gd_5(Si_2Ge_2)$, which had been prepared earlier, was placed on and covered the bottom of the crucible. Thus when the Gd melts it dissolves and/or reacts with the $Gd_5(Si_2Ge_2)$ and never reaches the crucible bottom or walls as pure Gd.

The Carbon Impurity Effect

Figure 2:
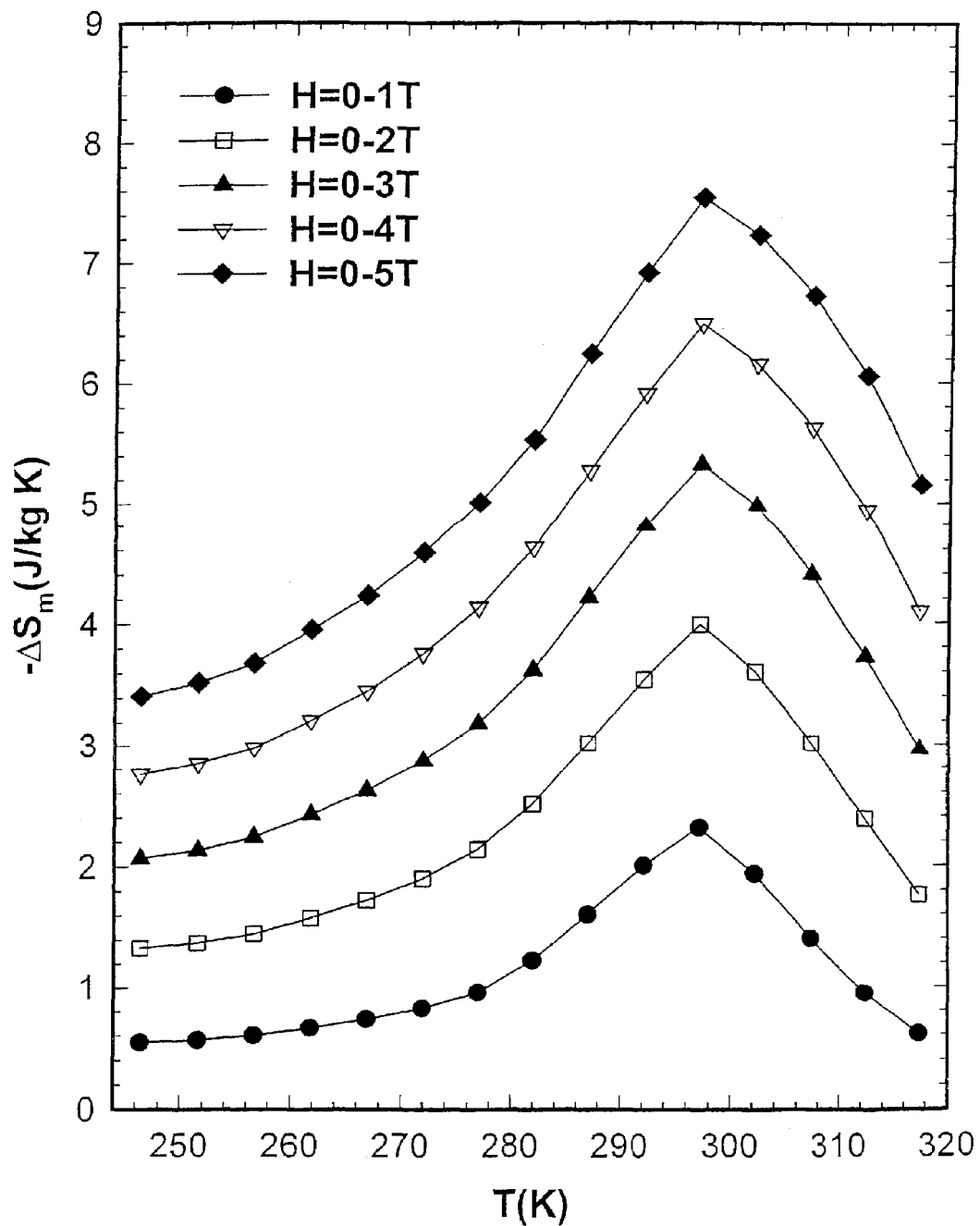
FIG. 2 illustrates the magnetocaloric effect (MCE) properties of $Gd_5(Si_2Ge_2)$ prepared by arc-melting commercially available Gd plus Si and Ge.

The inventors compared the magnetocaloric effect (MCE) properties of $Gd_5(Si_2Ge_2)$ prepared by the reaction of the induction melted three alloy components in a Ta crucible with those of an arc-melted button sample. The inventors found that $-\Delta S_m$ (MCE) value of the sample prepared in the Ta crucible was 17 J/kg K (FIG. 1) compared to 7 J/kg K (FIG. 2) for the arc-melted sample. Both samples were prepared from the same commercial Gd stock, which had a carbon impurity content of 327 wt. ppm (0.43 at. %) and an oxygen impurity content of 0.186 wt. % (1.85 at. %), where wt. ppm means parts per million by weight. The induction melted sample was prepared by heating Gd, Si, and Ge to a temperature of 1800° C. in vacuum, holding for about 60 minutes before cooling directly to room temperature without an intermediate anneal. The arc-melted sample was prepared by melting Gd, Si, and Ge under 1 atmosphere of He in an electrically generated arc on a water cooled Cu hearth, and was remelted six times, turning over the metal button between melts to insure homogeneity. The former value is about the same as reported in inventors' original paper announcing the discovery of the giant magnetocaloric materials[3] (the Gd used in that study[3] was obtained from the Ames Laboratory, Materials Preparation Center, Ames, Iowa, and had significantly lower C and O impurity contents, such lower C, O material being referred to herein as AL material). An exemplary Gd material available from Ames Laboratory typically exhibits a C impurity of about 236 ppm atomic, N impurity of about 11 ppm atomic, O impurity of about 472 ppm atomic, and F impurity of less than about 25 ppm atomic.

In contrast, commercially pure Gd generally comprises at least about 90 atomic % Gd, about 0.03 to about 1 atomic % C impurity, about 0.10 to about 4 atomic % O impurity, about 0.01 to about 1 atomic % N impurity, and about 0.001 to about 1 atomic % all other impurities, where other impurities include Cl, F, Na, Mg, Al, Si, Ca, Ti, Fe, Ni, Y, and Ta. A typical range of impurities in commercially pure Gd are 900–2,950 ppm atomic C, 270–460 ppm atomic N, 12,800–26,500 ppm atomic O, and 4–2,090 ppm atomic F.

Figure 3:
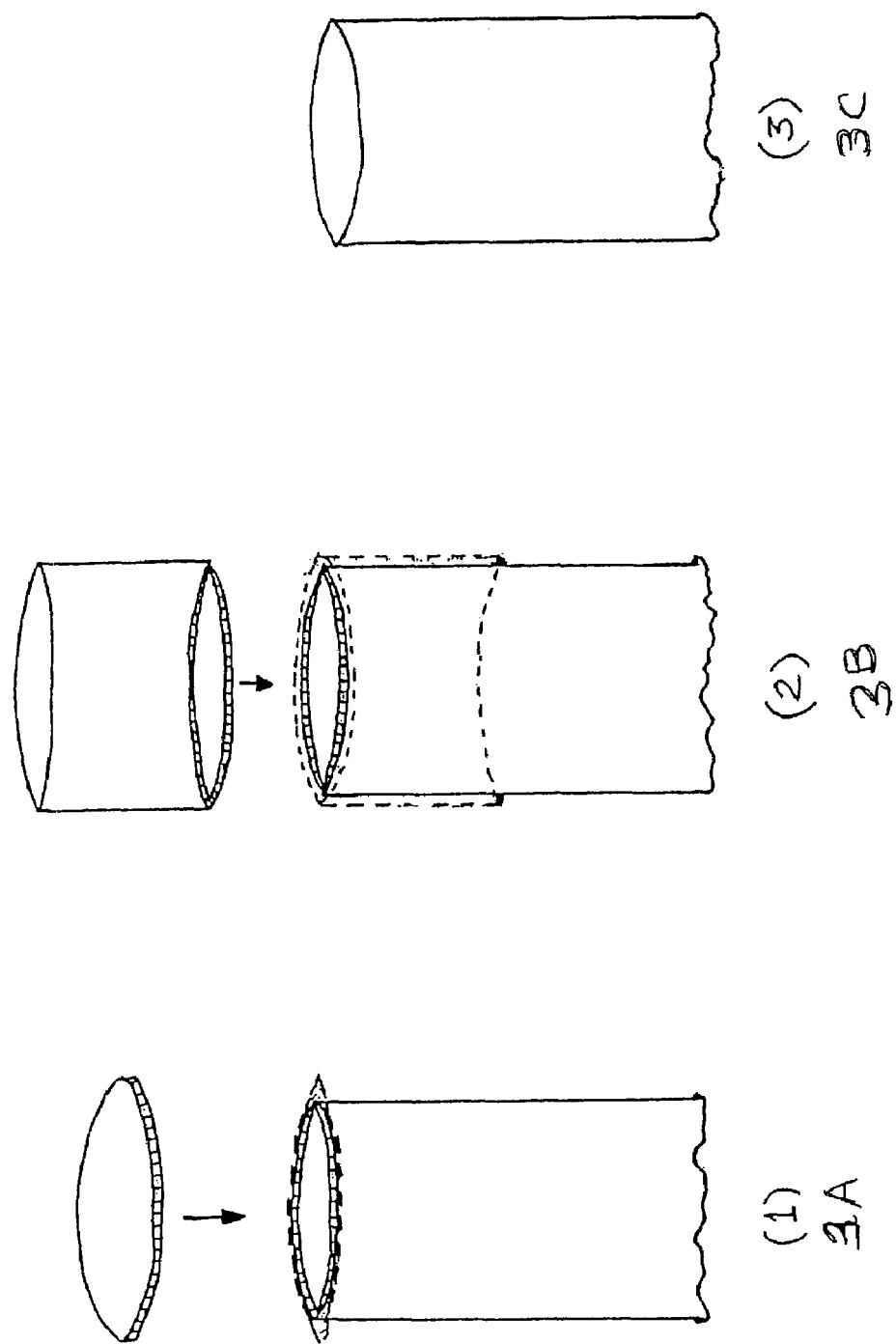
FIG. 3 is a schematic view of Ta crucibles used for the preparation of $Gd_5(Si_2Ge_2)$ by induction melting with different covers over the crucible.
Figure 4:
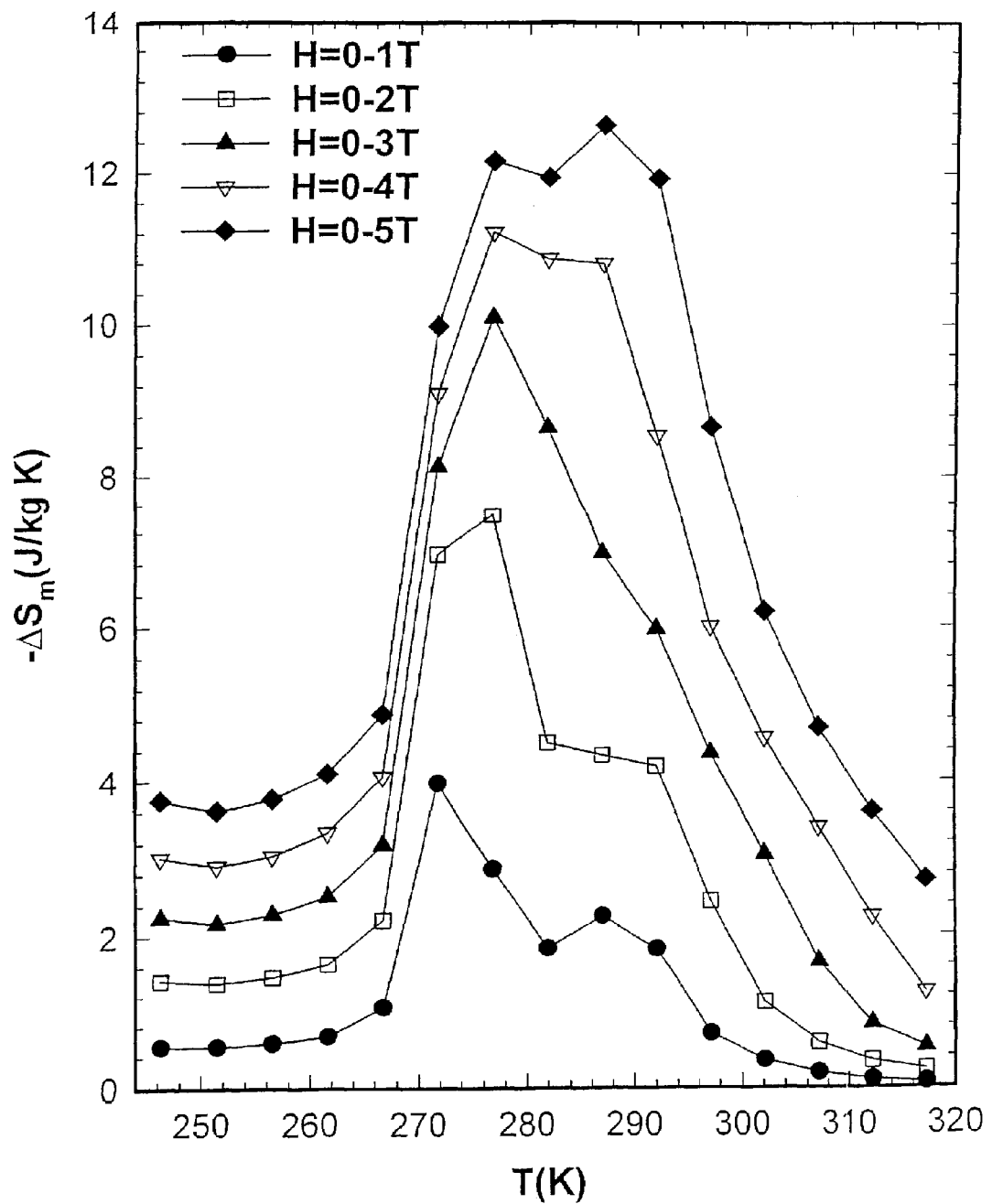
FIG. 4 illustrates the magnetocaloric effect calculated from magnetization measurements of $Gd_5(Si_2Ge_2)$ prepared by induction melting commercial Gd plus Si and Ge pursuant to the invention in a Ta crucible with a flat sheet of Ta covering the crucible.
Figure 6:
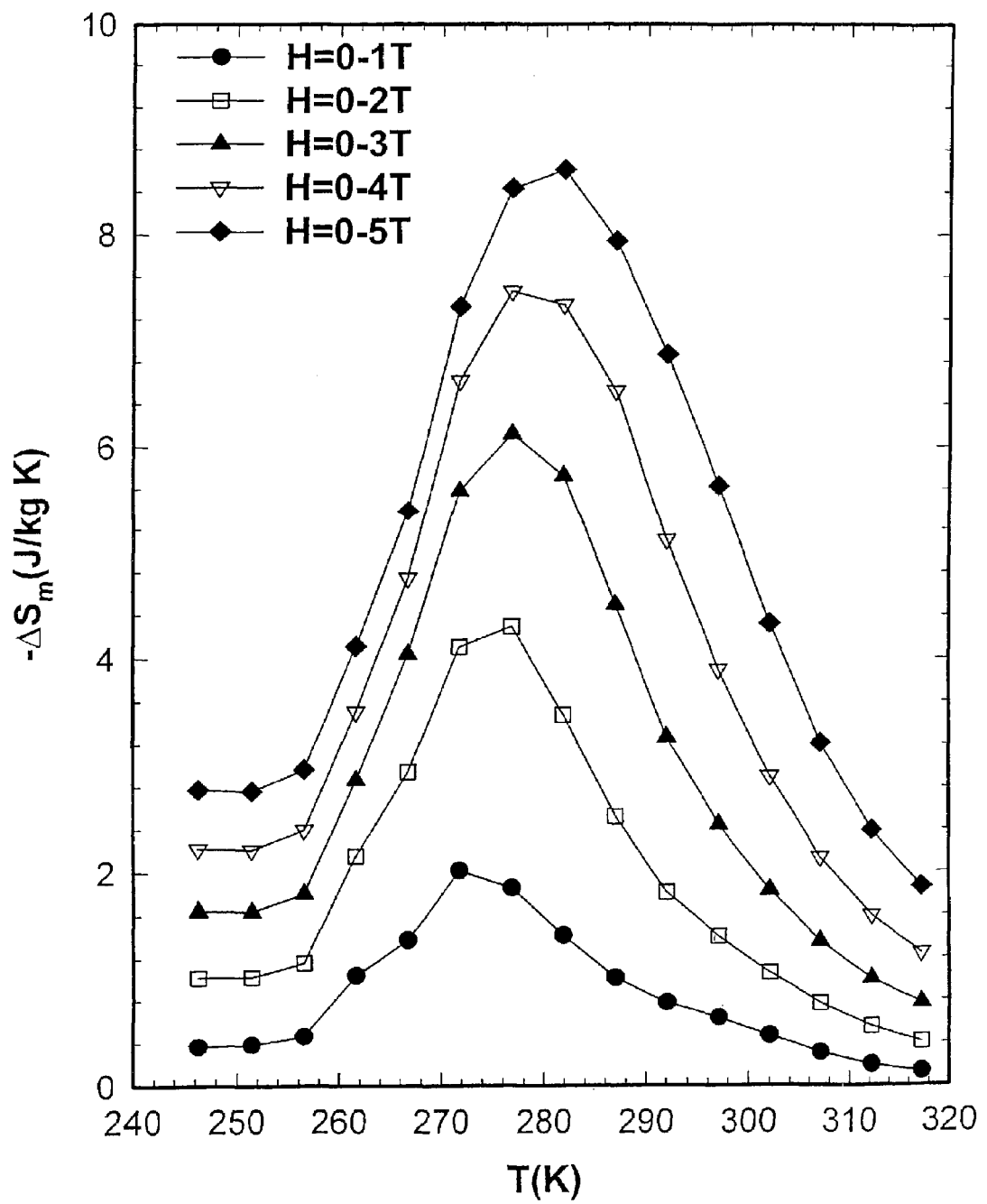
FIG. 6 illustrates the magnetocaloric effect calculated from magnetization measurements of $Gd_5(Si_2Ge_2)$ prepared by induction melting commercial Gd plus Si and Ge pursuant to the invention in a Ta welded-shut crucible.
Figure 7:
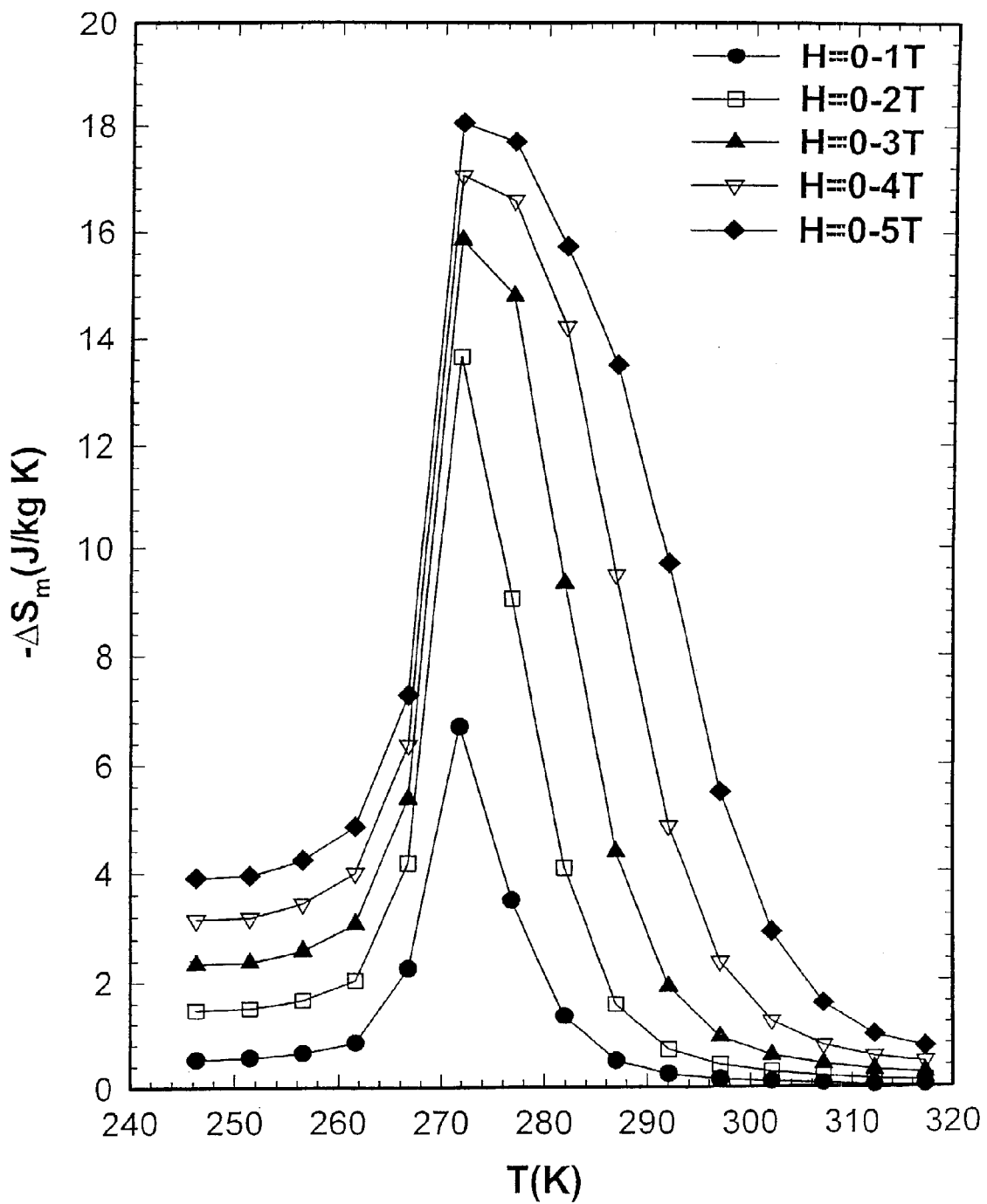
FIG. 7 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour.
Figure 8:
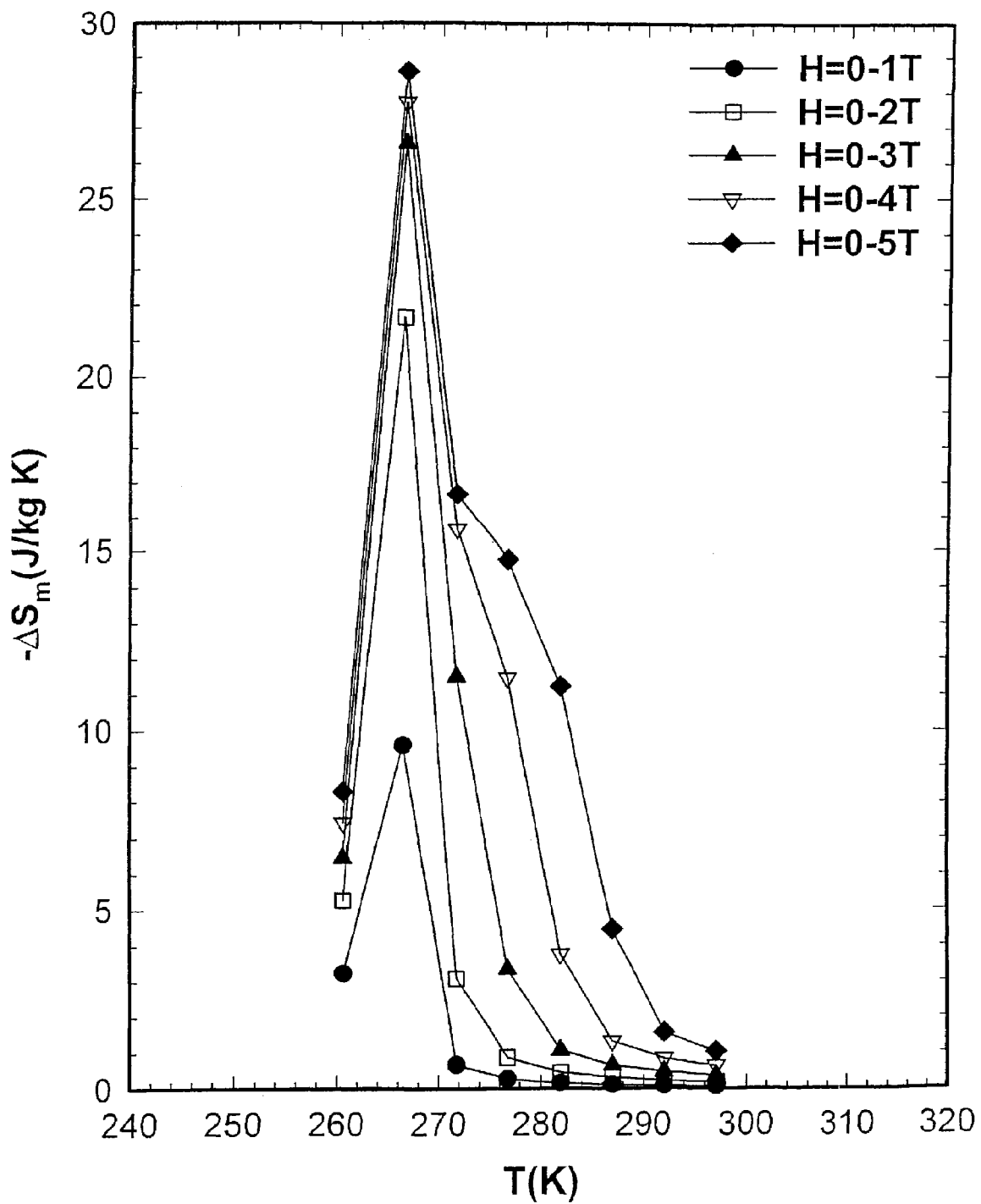
FIG. 8 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour and heat treated at 1600 degrees C. for 1 hour after rapid solidification.

It would appear that the C and O impurities in the molten $Gd_5(Si_2Ge_2)$ alloy, which is held for 1 hour at 1800 degrees C. at $\sim 10^{-6}$ torr, react to form CO or $CO_2$ which are pumped-off in the dynamic vacuum of $\sim 10^{-6}$ torr. The C and O reaction appears unlikely to occur in the molten arc-melted button, since the time is so short (a few minutes) and since arc-melting is carried out in a helium (or argon) atmosphere very little C and O impurities are removed during the arc-melting process. Experiments were conducted to evaluate the detrimental effect of carbon impurity on the giant MCE as indicated from a study of the effect of alloying additions.[4] For example, three samples, which were prepared by melting in Ta crucibles with different covers over the crucible, were heated together simultaneously in the induction furnace and held in the molten state for 15 minutes at 1800 degrees C. at $10^{-6}$ torr. The three cover arrangements were as follows: (1) a flat piece of Ta covering the entire opening of the crucible, FIG. 3A; (2) an inverted, slightly larger crucible covering the opening, FIG. 3B; and (3) a welded-shut crucible, FIG. 3C. After the melting operation the samples were cooled down and it was noted that the welded-shut crucible was bowed outward, indicating that a gas pressure had built up inside the crucible during the heating operation. The magnetization measurements of the three $Gd_5(Si_2Ge_2)$ samples made in these crucibles gave maximum $-\Delta S_m$ values of 12 to 13 J/kg K and two peaks (magnetic ordering temperatures) of 277 and 287 K for the first cover arrangement (FIG. 4); $-\Delta S_m=13$ and 5 J/Kg K at 257 and 297 K, respectively for the inverted crucible arrangement (FIG. 5); and a $-\Delta S_m=8$ J/kg K and a single peak at 278 K for the sealed crucible (FIG. 6). These $-\Delta S_m$ values indicate that the C impurity remained in the $Gd_5(Si_2Ge_2)$ alloy which was melted in the welded-shut Ta crucible, and that $-\Delta S_m$ was essentially the same as for the arc-melted button (see above). Chemical analysis of the arc-melted button indicate that this sample contained 318 wt. ppm (0.42 at. %) C impurity, which is essentially the same as that of the commercial starting Gd metal [327 wt. ppm (0.43 at. %) C]. Furthermore, the C impurity content of a $Gd_5(Si_2Ge_2)$ sample held molten at 1800 degrees C. for 1 hour in a Ta crucible at $10^{-6}$ torr with a loose-fitting lid was 109 wt. ppm (0.14 at. %), and its maximum $-\Delta S_m$ value was 18 J/kg K (FIG. 7). Additional confirmation was obtained from another $Gd_5(Si_2Ge_2)$ sample melted in a Ta crucible with a flat lid, FIG. 3A at 1800 degrees C. for 1 hour and heat treated at 1600 degrees C. for one hour after rapid solidification, which was obtained by shutting of the power to the induction furnace. The maximum $-\Delta S_m$ value and magnetic ordering temperature was 28 J/kg K and 267 K, respectively (FIG. 8). Furthermore, a comparison of the chemical analyses of the Gd starting material and the last-made $Gd_5(Si_2Ge_2)$ alloy, see Table 1, shows that there is a reduction in both C and O impurities, by 0.26 and 0.41 at. %, respectively. This suggests that the C impurity is lost as a mixture of CO (>55%) and $CO_2$ (<45%), assuming that the reduction of the amount of O impurity is due entirely to the C oxidation process.

TABLE 1

Chemical Analysis Of The Commercial Gadolinium Starting Material and of a Melted in Ta Crucible, Rapidly Quenched, Heat Treated $Gd_5(Si_2Ge_2)$ Sample (All Values Reported in Atomic Percent)

| Impurity | Gadolinium | $Gd_5(Si_2Ge_2)$ |
|---|---|---|
| C | 0.43 | 0.17 |
| N | 0.43 | 0.28 |
| O | 1.83 | 1.42 |
| F | 0.37 | 0.17 |

Segregation Effect

Figure 5:
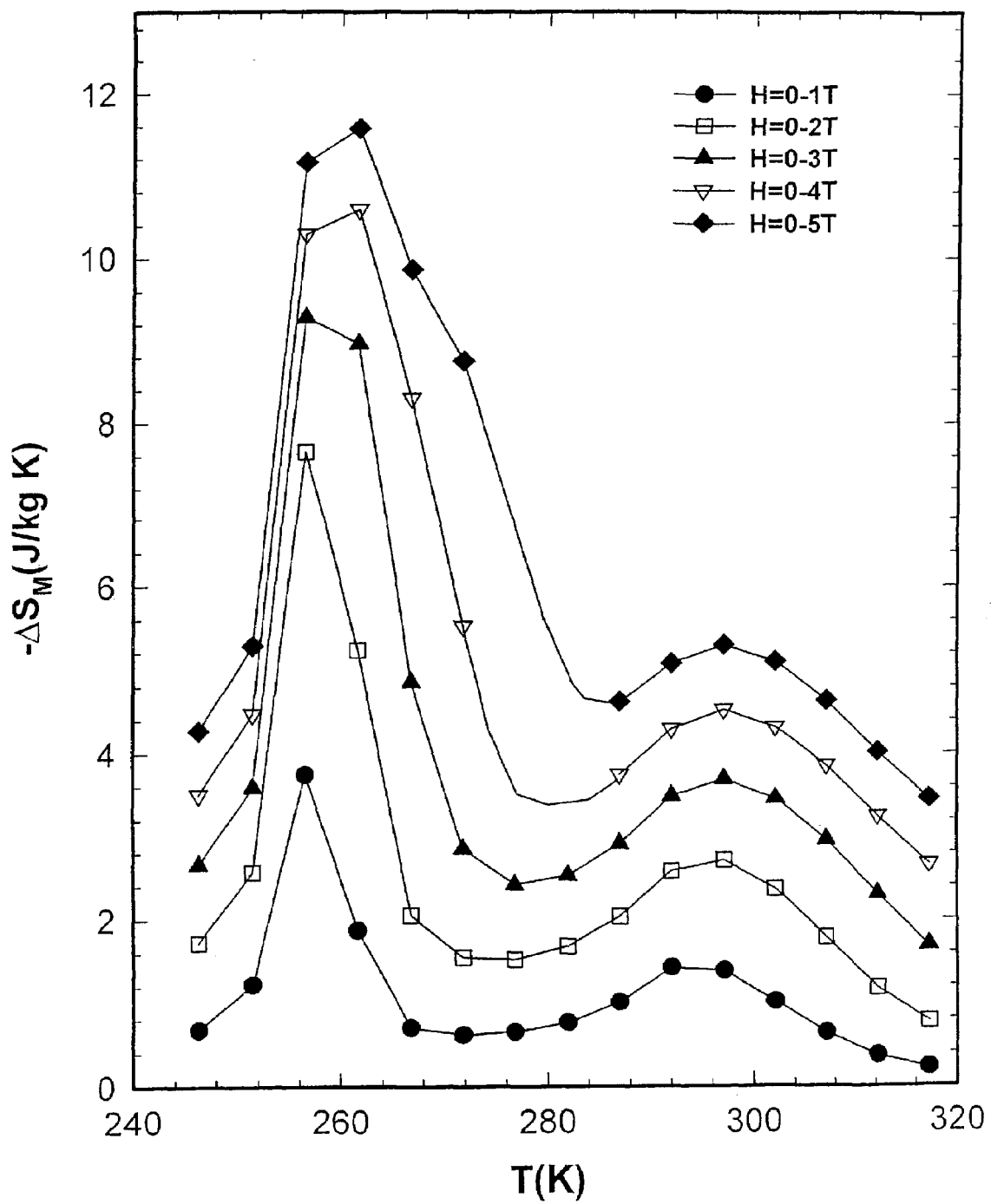
FIG. 5 illustrates the magnetocaloric effect calculated from magnetization measurements of $Gd_5(Si_2Ge_2)$ prepared by induction melting commercial Gd plus Si and Ge pursuant to the invention in a Ta crucible covered by an inverted, slightly larger Ta crucible.

The MCE data determined from magnetization measurements for most of the $Gd_5(Si_2Ge_2)$ alloys prepared by reacting the alloy components in a Ta crucible exhibited a double peak structure in the $-\Delta S_m$ vs. T plots (FIGS. 4 and 5). The samples were melted in the Ta crucible with flat lid, FIG. 3A and with an inverted crucible lid, FIG. 3B at 1800 degrees C. for 15 minutes at $10^{-6}$ torr, then the induction furnace power was turned down slowly until the temperature reached 1700 degrees C. (~50 degrees C. below the melting point of the alloy) in 15–30 minutes and held there for 15 minutes. This process was continued in the same manner holding at 1650 degrees C. for 15 minutes and finally for 30 minutes at 1600 degrees C. before turning off the power.

After obtaining these results one of the $Gd_5(Si_2Ge_2)$ samples was remelted at 1800 degrees C. under vacuum of $10^{-6}$ torr and cooled in the same manner as noted in the above paragraph. But since some of the sample did not melt, it was again reheated at 1870 degrees C. for 15 minutes, then cooled to 1750, 1700, and 1650 degrees C. holding for 15 minutes before a final anneal at 1600 degrees C. for 30 minutes. This alloy was then sampled at the top and bottom portions of the ingot. The MCE values were $-\Delta S_m=19$ J/kg K and $T_c=272$ K for a sample taken from the top of the ingot, and $-\Delta S_m=14$ J/kg K and $T_c=287$ K from the bottom of the ingot sample. The difference in the $-\Delta S_m$ values (and the different $T_c$ values) from top to bottom suggested that phase segregation of the melt occurs on solidification because the $Gd_5(Si_2Ge_2)$ material does not melt congruently. Furthermore, the low $-\Delta S_m$ and high Curie temperature for the bottom portion of the ingot suggests that a Si-rich $Gd_5(Si_xGe_{1-x})_4$ phase solidified first, and since the solid phase is expected to be more dense than the liquid phase it sinks to the bottom of the crucible. From published results[5] alloys richer than x=0.5 would exhibit a normal MCE (i.e. $-\Delta S_m<19$ J/kg K) and have a $T_c>275$ K. The last to freeze liquid would be a Ge-rich alloy (x<0.5) which would exhibit the giant MCE (i.e. $-\Delta S_m \geq 19$ J/kg K) and have a $T_c<275$ K, which is what was observed.

Figure 9:
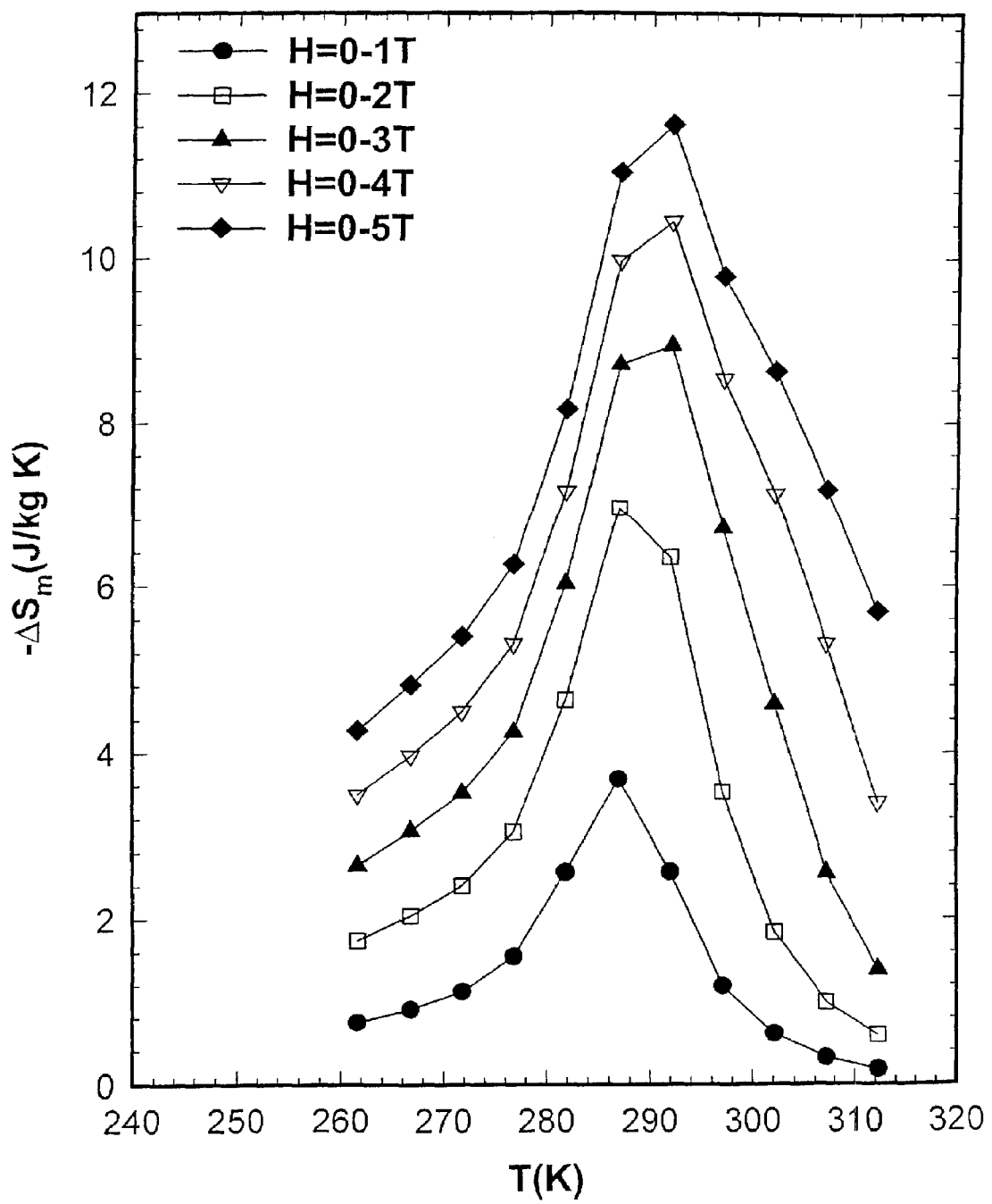
FIG. 9 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour and rapidly cooled to room temperature. The sample for the measurement was taken from the top of the solidified ingot.
Figure 10:
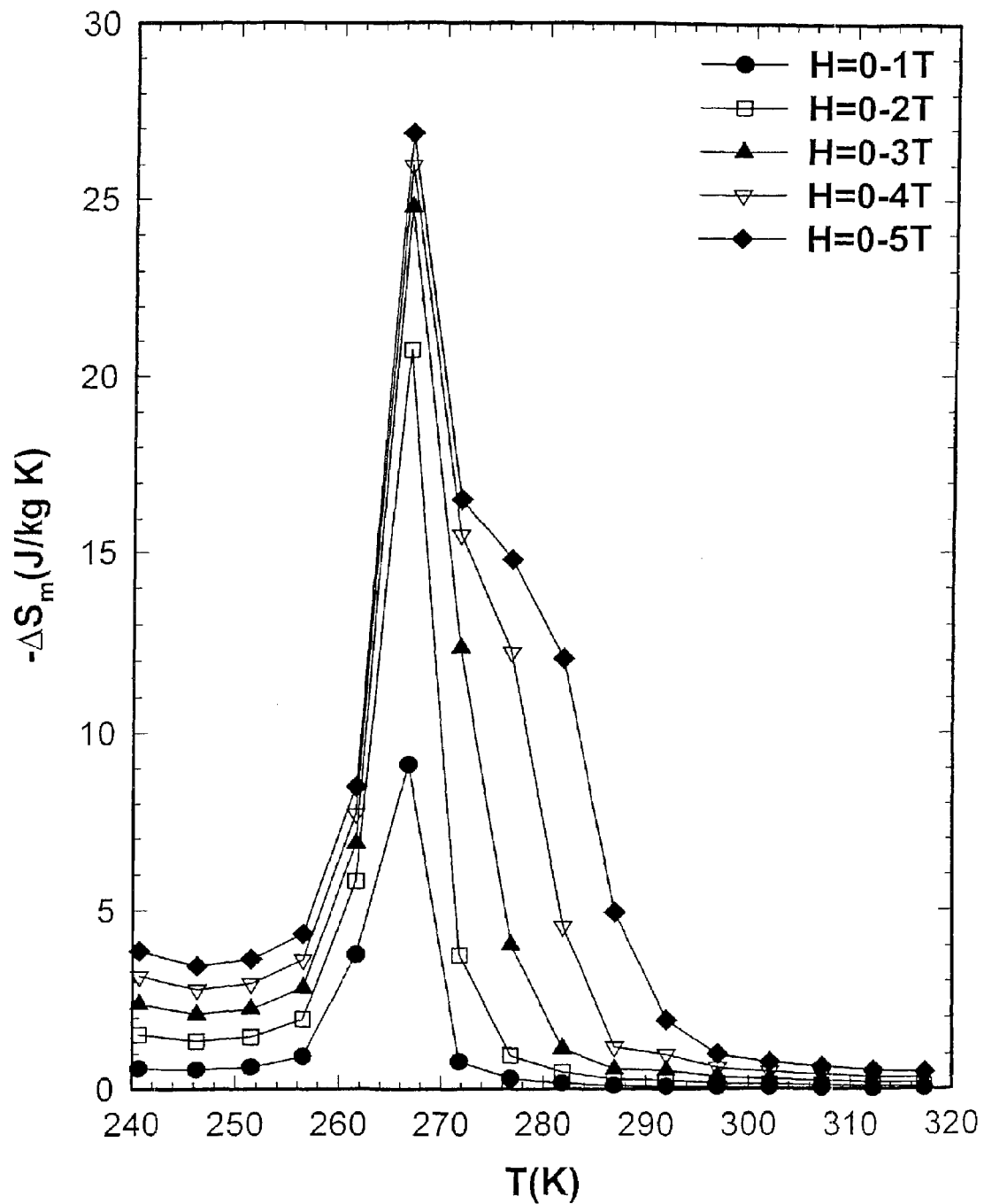
FIG. 10 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour, rapidly cooled to room temperature, and then heat treated at 1600 degrees C. for 1 hour. The sample for the measurement was taken from the bottom of the solidified ingot.

As a result, rapidly cooling the ingot from the melt should reduce or eliminate this segregation problem. An alloy was melted for one hour at 1800 degrees C. at $10^{-6}$ torr and then rapidly cooled by shutting off the power to the furnace. The $-\Delta S_m$ values were 12 J/kg K for all three samples taken from the top, middle and bottom of the ingot, and $T_c=290$ K was also the same for the 3 locations (a typical plot is shown in FIG. 9). Thus, it can be concluded that segregation does occur on slow cooling and that rapidly cooling a 30 to 40 g sample in a Ta crucible by turning off the power is sufficient to cure the segregation problem. The same alloy was then heat treated at 1600 degrees C. for 1 hour in the crucible under vacuum $10^{-6}$ torr and rapidly cooled. This time the $-\Delta S_m=27-28$ J/kg K and $T_c=267$ K for three different locations in the ingot (top, middle and bottom). A typical $-\Delta S_m$ vs. T plot is shown in FIG. 10. This set of experiments also shows the importance of a high temperature anneal to improve the MCE properties (also see below, the sections on the Si-loss Effect and the Enhanced Giant Magnetocaloric Effect). The magnetic entropy change, $-\Delta S_m$, described herein was calculated from the magnetization data as described in Reference 7 and in U.S. Pat. No. 5,743,095 where $\Delta S_m$ is used herein to represent the magnetic entropy change $\Delta S_{mag}$ set forth in the reference and the patent, both of which are incorporated herein by reference.

This work was extended to larger size samples. A 100 g alloy of $Gd_5(Si_2Ge_2)$ was prepared pursuant to the invention [melted at 1800 degrees C. for 1 hour at $10^{-6}$ torr, rapidly cooled to 1600 degrees C., held for 15 minutes, then held successively at 1500 degrees C. for 15 minutes and 1400 degrees C. for one hour before cooling to room temperature]. Four areas of the ingot were sampled and the maximum $-\Delta S_M$ varied from 19 to 23 (average was 21±2) J/kg K and $T_c=272$ K for all four samples. For a 200 g ingot similar results were obtained: $-\Delta S_m=20$ J/kg K and $T_c=272$ K. Generally, rapid cooling of the melt in the crucible to avoid segregation will involve cooling rates between 360 to 60 degrees C./minute depending upon mass of the melt being solidified.

The Si-loss Effect

Studies of interaction of a $Gd_5(Si_2Ge_2)$ sample arc melted and sealed in a Ta crucible suggested that $Ta_2Si$ may form in the preparation of $Gd_5(Si_2Ge_2)$ at least in the melting stage and perhaps when the solidified ingot is annealed at high temperatures. This would shift the Si:Ge ratio to lower values, i.e. higher Ge contents because of the removal of Si from the alloy. This would account for lower $T_c$ values observed in the alloys induction melted in Ta crucibles; i.e. $T_c \leq 270$ K, rather than the $T_c \sim 280$ K value for the as-arc-melted material using the low C, O Ames Laboratory (AL) Gd. Furthermore, a series of heat treating experiments was conducted in which a $Gd_5(si_2Ge_2)$ sample made by induction melting was held at 1600, 1500, 1400 and 1300° C. in the Ta crucible at $10^{-6}$ torr for one hour each and cooled to room temperature for magnetization measurement. After magnetization measurements the sample was reheated for another hour at the next lowest temperature and the cycle was repeated. It was noted that $T_c$ dropped ~5 K between 1600 and 1500 degrees C., and between 1500 and 1400 degrees C., but remained constant for heat treatments at 1300 degrees C. (see Table 2). This suggested that Si was still reacting with the Ta crucible at temperatures above 1400 degrees C. In order to overcome this Si loss, a 0.5% excess of Si was added to the starting amounts of Gd+Si+Ge for the $Gd_5(Si_2Ge_2)$ composition, and the normal heating protocol described above was followed.

TABLE 2

Effect of Heat Treatment on the MCE ($-\Delta S_m$) and $T_c$. The Sample was Held at Each Temperature for One Hour Before Rapid Cooling by Turning-off the Power to Induction Furnace. The Heat Treatments are Consecutive.

| Heat Treatment Temp. (° C.) | Tested Portion of Alloy Sample | $-\Delta S_m$ (J/kg K) | $T_c$ (K) |
|---|---|---|---|
| 1600 | Top | 18 | 277 |
|  | Bottom | 18 | 277 |
| 1500 | Top | 23 | 272 |
|  | Bottom | 25 | 272 |
| 1400 | Top | 28 | 267 |
| 1300 | Top | 27 | 267 |

Eutectoid Decomposition or Crystallographic Structural Transformation

Figure 11:
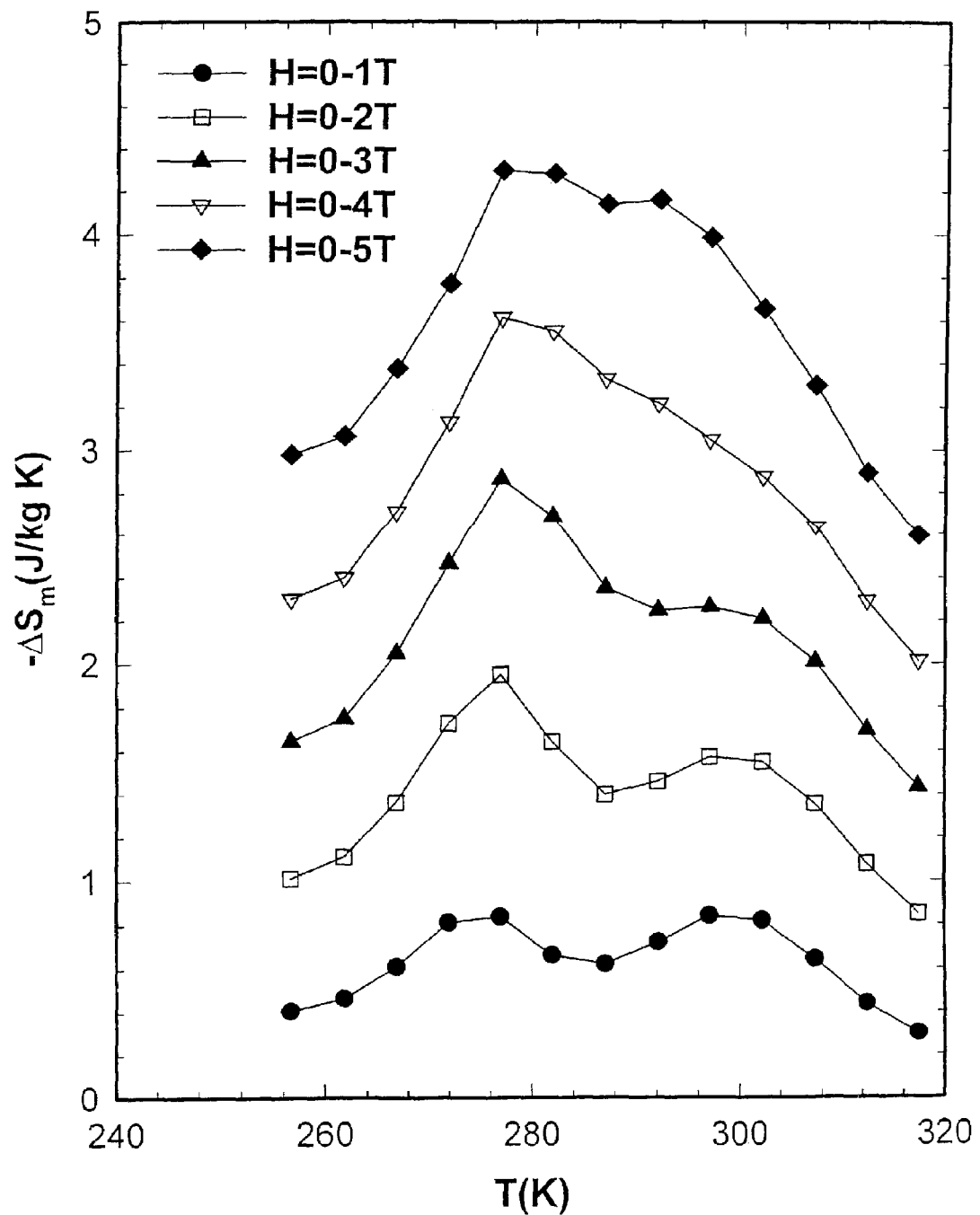
FIG. 11 illustrates the magnetocaloric effect (MCE) properties of $Gd_5(Si_2Ge_2)$ prepared by arc-melting low C, low O (AL) Gd plus Si and Ge (where AL means that the Gd was prepared by the Materials Preparation Center of the Ames Laboratory, Iowa State University, Ames, Iowa). The sample was annealed at 400 degrees C. for 2 weeks.
Figure 12:
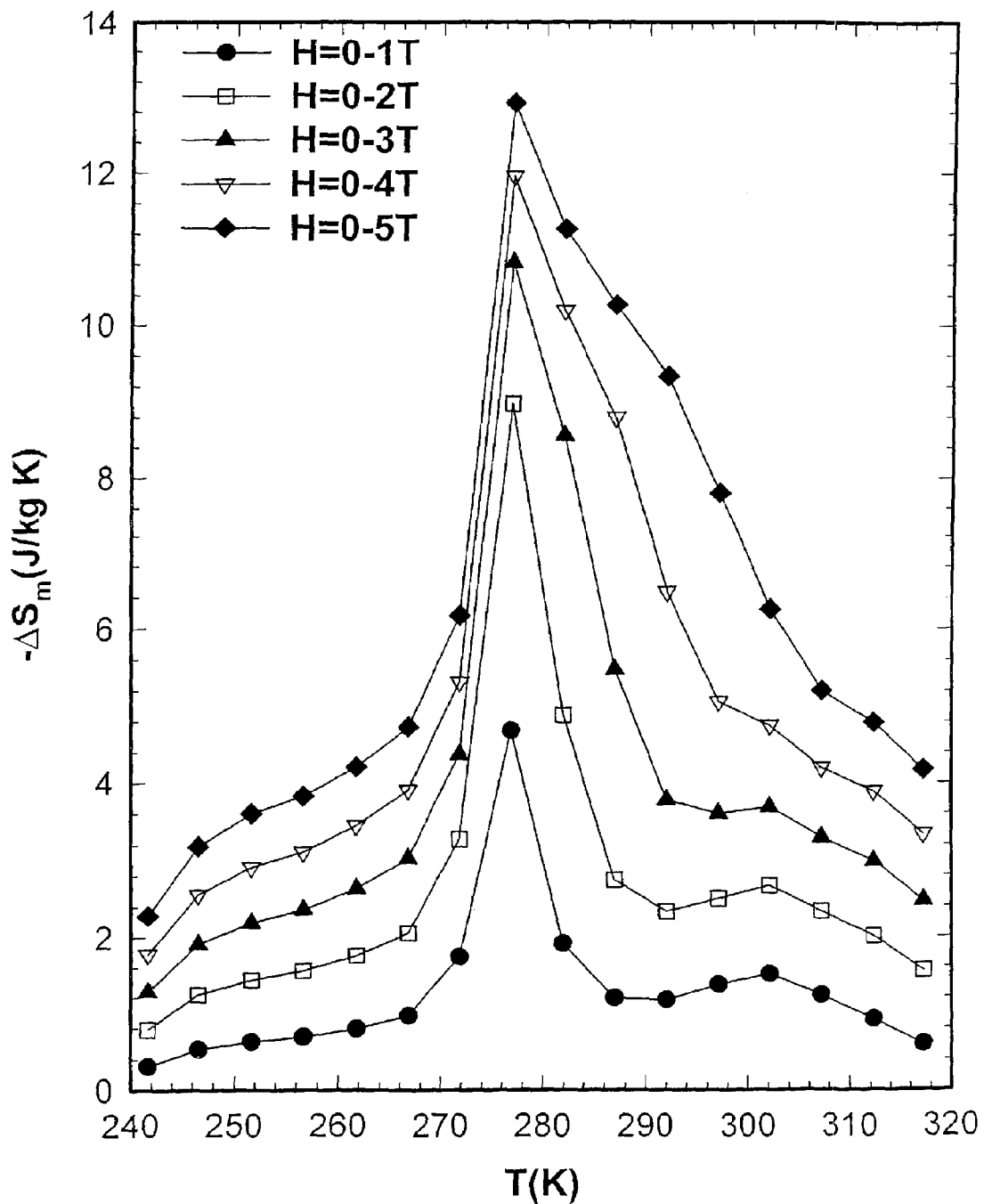
FIG. 12 illustrates the magnetocaloric effect (MCE) properties of $Gd_5(Si_2Ge_2)$ prepared by arc-melting low C, low O (AL) Gd pure Si and Ge. The sample was annealed at 600 degrees C. for 8 days.
Figure 13:
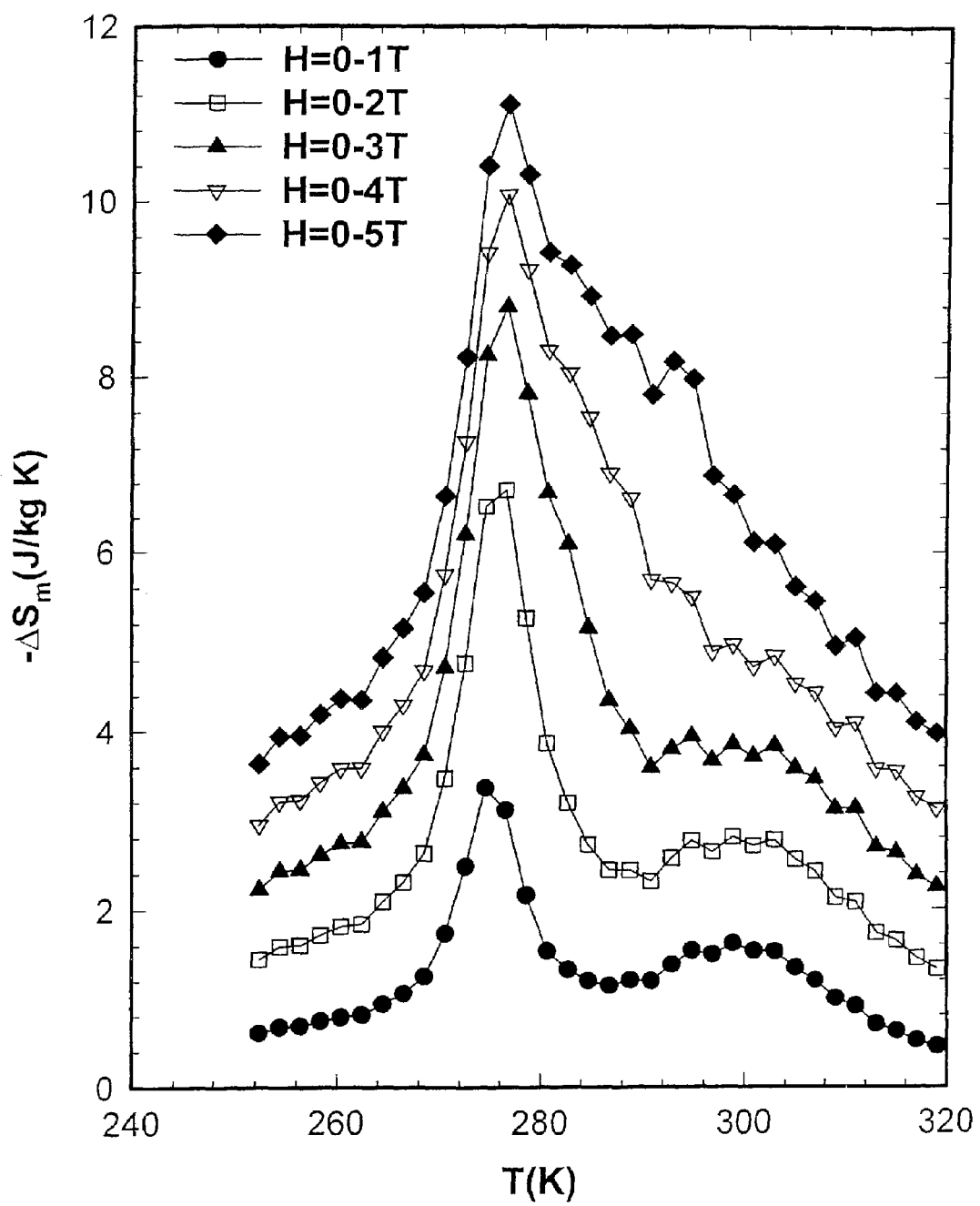
FIG. 13 illustrates the magnetocaloric effect (MCE) properties of $Gd_5(Si_2Ge_2)$ prepared by arc-melting low C, low O (AL) Gd pure Si and Ge. The sample was annealed at 700 degrees C. for 1 week.
Figure 14:
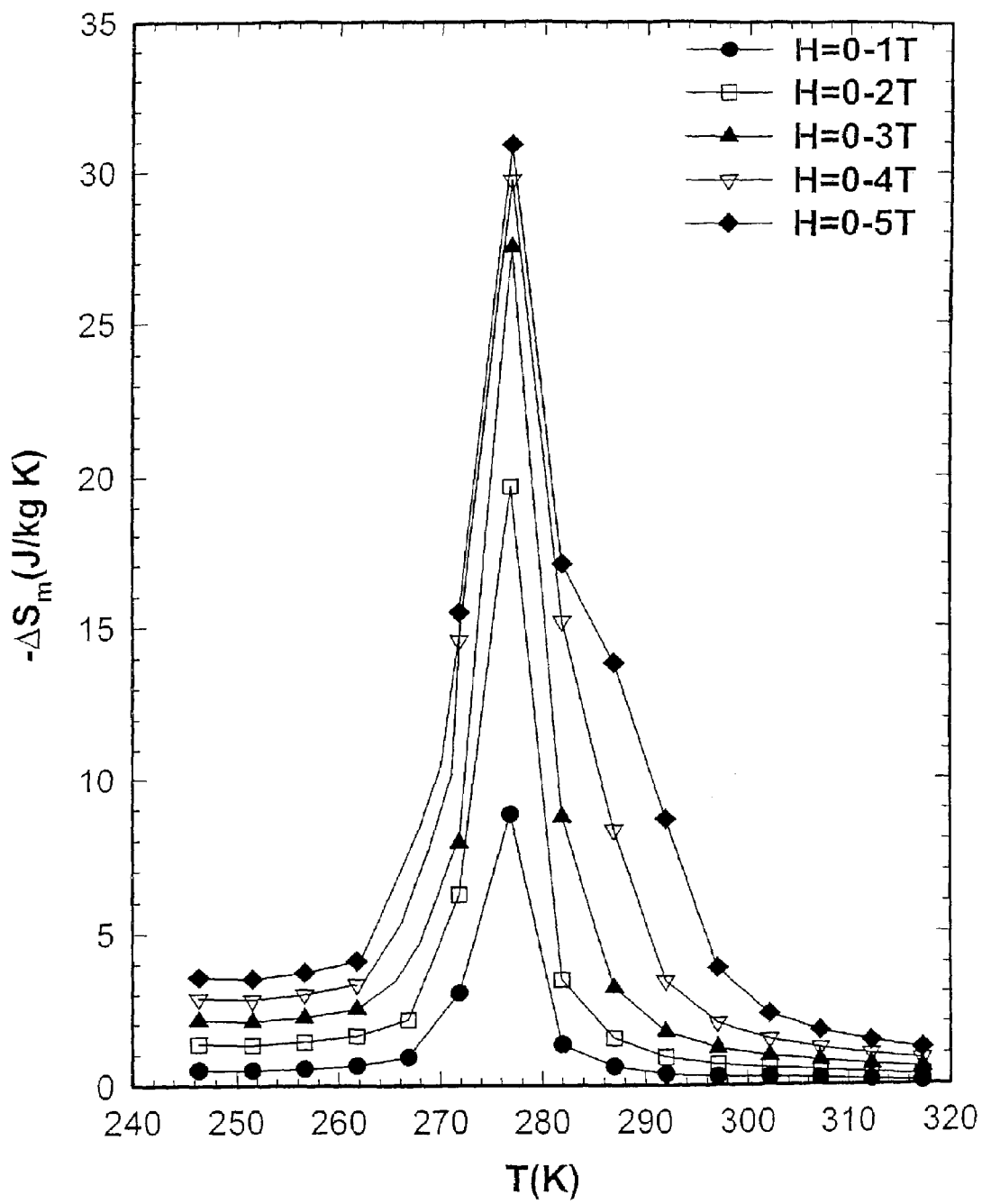
FIG. 14 illustrates the magnetocaloric effect (MCE) properties of arc-melted $Gd_5(Si_2Ge_2)$ prepared by arc-melting low C, low O (AL) Gd pure Si and Ge. The sample was annealed at 900 degrees C. for 3 days.

A series of long term anneals (several days to several weeks) were carried out at various temperatures to see if the $Gd_5(Si_2Ge_2)$ phase was thermodynamic equilibrium phase, since some phase diagram data[6] suggested that $Gd_5Si_4$ decomposes to $Gd_5Si_3$ and GdSi below about 650 degrees C. Arc-melted samples prepared as described above from the low C,O Laboratory (AL) Gd were sealed in quartz tubes back-filled with He and annealed at 400 degrees C. for 2 weeks; 600 degrees C. for 8 days; 700 degrees C. for 1 week; 800, 900 and 1000 degrees C. for 3 days each. The as-arc-melted sample had a value of $-\Delta S_m=22.5$ J/kg K and $T_c=277$ K. The $T_c$ values remained a constant 277±1 K for all of the annealed samples, but the maximum (FIG. 11) $-\Delta S_m$ values (in J/kg K) were: 4.5 for 400 degrees C. anneal; 12.9 for 600 degrees C. (FIG. 12); 11 for 700 degrees C (FIG. 13); 26.6 for 800 degrees C.; 30.9 for 900 degrees C. (FIG. 14); and 30.2 for 1000 degrees C. For $Gd_5(Si_xGe_{1-x})_4$ alloys where $0.357 \leq x \leq 0.56$, there is a crystallographic transition from the monoclinic phase to the orthorhombic phase instead of a eutectoid decomposition. Fortunately this crystallographic transition occurs rather slowly. If the transition was rapid, then when the alloys are cooled to room temperature one would have a mixture of the two structures, and since the orthorhombic (II) phase has inferior magentocaloric properties, the observed magnetocaloric effect would be small. But since a reasonable magnetocaloric effect was observed, this transformation must take place slowly. For ingots of $Gd_5(Si_2Ge_2)$ (which were prepared by the standard induction melting procedure [described above] from commercial Gd, weighed 100 g or less, heat treated for one hour between 1400 and 1600 degrees C. in the Ta crucible, and furnace cooled to room temperature), $-\Delta S_m$ values of 20 J/kg K, or slightly greater, were obtained. But as the ingot size increased, the $-\Delta S_M$ values were significantly reduced, see Table 3. The lower $-\Delta S_m$ values indicate that some of the orthorhombic (II) phase of $Gd_5(Si_2Ge_2)$ formed during cooling as a result of the crystallographic transformation. This is due to the fact the cooling process in the larger mass samples takes longer as the sample cools through the critical 700 to about 300 degrees C. temperature region, and more of the monoclinic phase transforms. Since there is graphite insulation around the crucible, which is necessary to reach 1800 degrees C., it takes several hours to reach ambient temperatures from 1400 degrees C.—about five hours for the 1 kg sample—after the power is turned-off. However, when these samples are reheat treated at 1400 degrees C. and more rapidly cooled through the 700 to about 300 degrees C. region, the $-\Delta S_m$ values were recovered. For example, for the 0.98 kg sample of Table 3, which originally had a $-\Delta S_m=16.7$ J/kg K (Table 3), the reheat treated sample had a $-\Delta S_m$ value of 19.9 J/kg K.

Although the monoclinic polymorph of the $Gd_5(Si_2Ge_2)$ alloy transforms between about 300 and 700 degrees C., if the monoclinic phase can be retained at room temperature it is in a metastable condition and will not transform to the orthorhombic form. This was demonstrated when the inventors re-examined a sample of the $Gd_5(Si_2Ge_2)$ alloy which had been used in our original study of the discovery of the giant magnetocaloric effect[3]. Five years later the remeasured $-\Delta S_m$ value and $T_c$ were essentially the same, 18.5 J/kg K and 278 K, respectively.

TABLE 3

Effect of Sample Size (Mass) on Resultant MCE ($-\Delta S_m$)

| Ingot Mass (kg) | $-\Delta S_m$ (J/kg K) |
|---|---|
| 0.10 | 20.2 |
| 0.21 | 18.9 |
| 0.51 | 17.0 |
| 0.54 | 16.6 |
| 0.98 | 16.7 |
| 1.02 | 16.5 |

Heat Treatment

The following heating and cooling procedures were used to obtain the optimum magnetocaloric properties of the $Gd_5(Si_xGe_{1-x})_4$ alloys. The Ta crucible and the inverted Ta crucible which serves as a lid are slowly heated from 200 to 1800 degrees C. over a two hour period, and then held at this temperature for 30 minutes to outgas and clean the Ta before the charge is placed into the Ta crucible. The appropriate amounts of Gd+Si+Ge were placed in a Ta crucible, which was covered with the Ta lid and placed in an induction furnace vacuum chamber. The chamber was evacuated to $2 \times 10^{-6}$ torr, and the Ta crucible and contents were heated slowly from 200 to 1800 degrees C. while maintaining the vacuum. (This usually takes about 2 hours). The charge was held at 1800 degrees C. for 1 hour, and then the power to the induction furnace is turned-off to allow the sample to rapidly solidify to prevent any macrosegregation (see above). To increase the cooling rate a graphite felt radiation shield disposed about the crucible was lifted above the sample. When the temperature reached ~1400 degrees C., the furnace was turned-on and the sample was annealed for 1 hour in the crucible to maximize the MCE (see below). Then the furnace power was turned-off and the sample was allowed to cool to room temperature as quickly as possible to prevent the eutectoid decomposition or the crystallographic transformation of the $Gd_5(Si_xGe_{1-x})_4$ phase. The alloy was then checked to verify its MCE properties. This was accomplished by taking at least two samples (one from the bottom, and one from the top) and measuring the appropriate magnetization isotherms as function of magnetic field from 0 to 5 T. For example, for the $Gd_5(Si_2Ge_2)$ composition the isotherms were taken every 5 K from 240 to 320 K. For other compositions the isotherms were measured from ~40 K below and ~40 K above the expected $T_c$ at 5 K intervals.

Enhanced Giant Magnetocaloric Effect

Figure 15A:
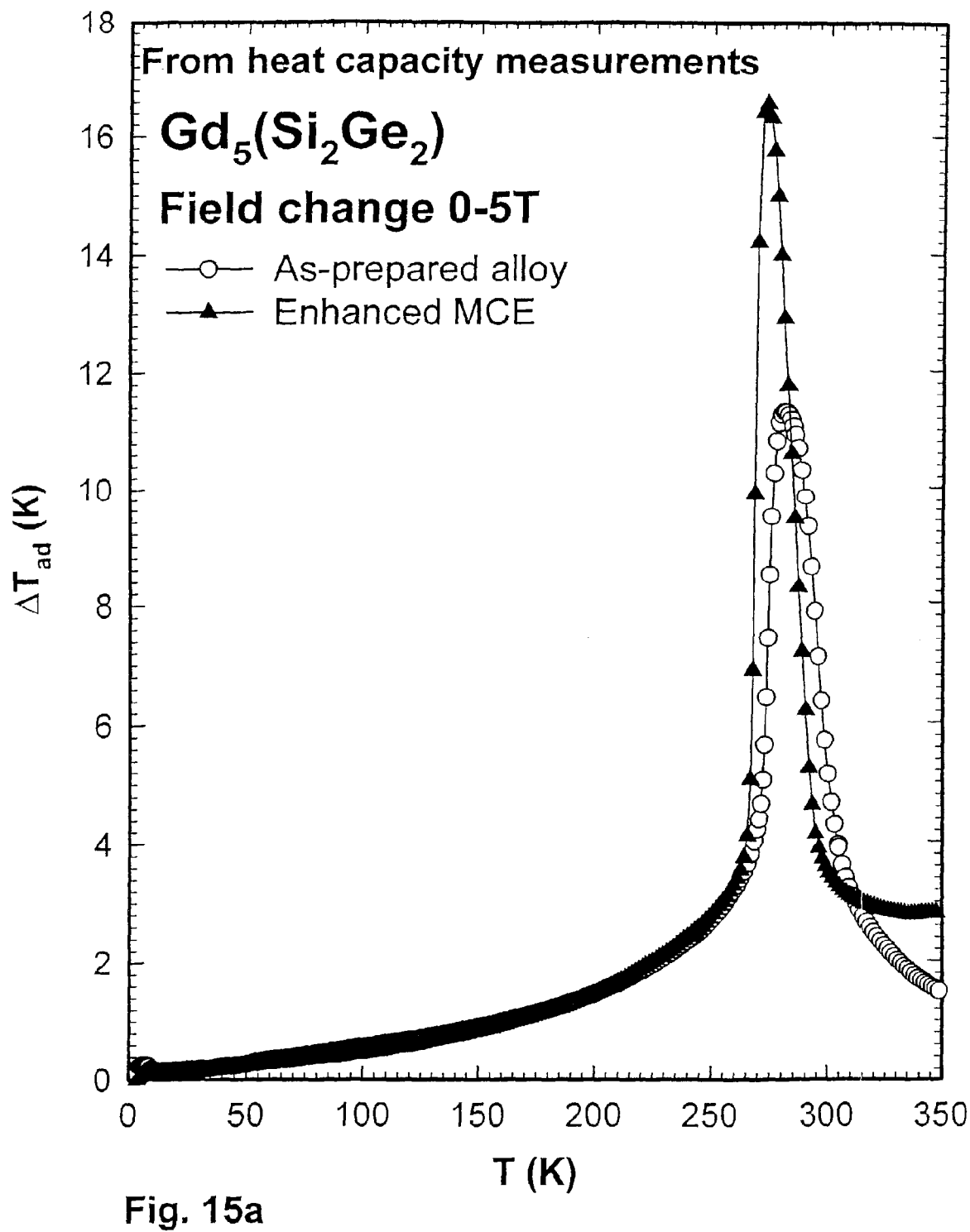
FIG. 15a illustrates the magnetocaloric effect ($\Delta T_{ad}$) of $Gd_5(Si_2Ge_2)$ prepared by arc-melting low C, low O (AL) Gd plus Si and Ge (as-prepared alloy) and the enhancement of the magnetocaloric effect by heat treatment at 1000 degrees C. (Enhanced MCE) as calculated from heat capacity measurements.
Figure 15B:
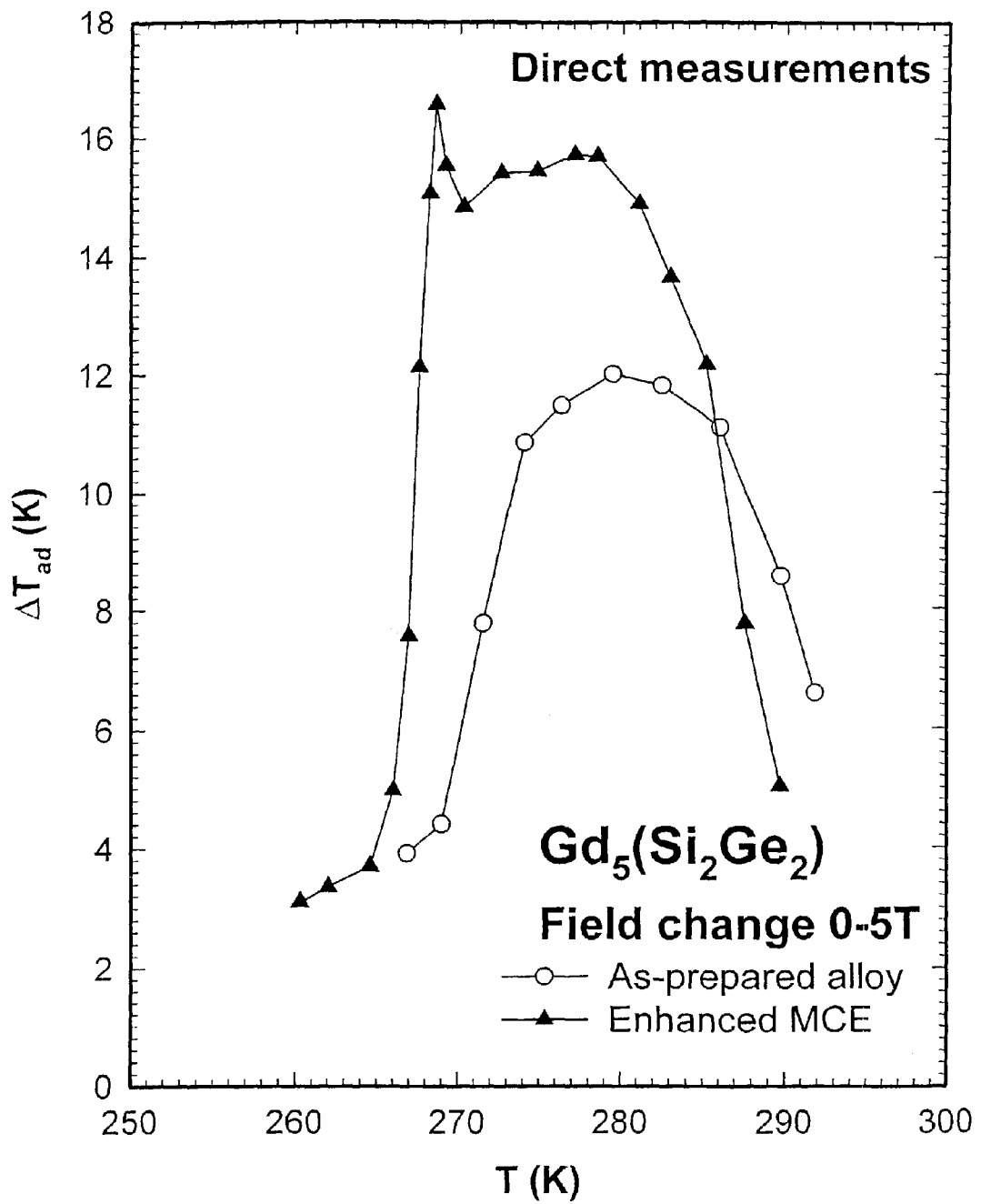
FIG. 15b illustrates the magnetocaloric effect ($\Delta T_{ad}$) of $Gd_5(Si_2Ge_2)$ prepared by arc-melting low C, low O (AL) Gd plus Si and Ge and the enhancement of the magnetocaloric effect by heat treatment at 1000 degrees C. as measured directly.
Figure 15C:
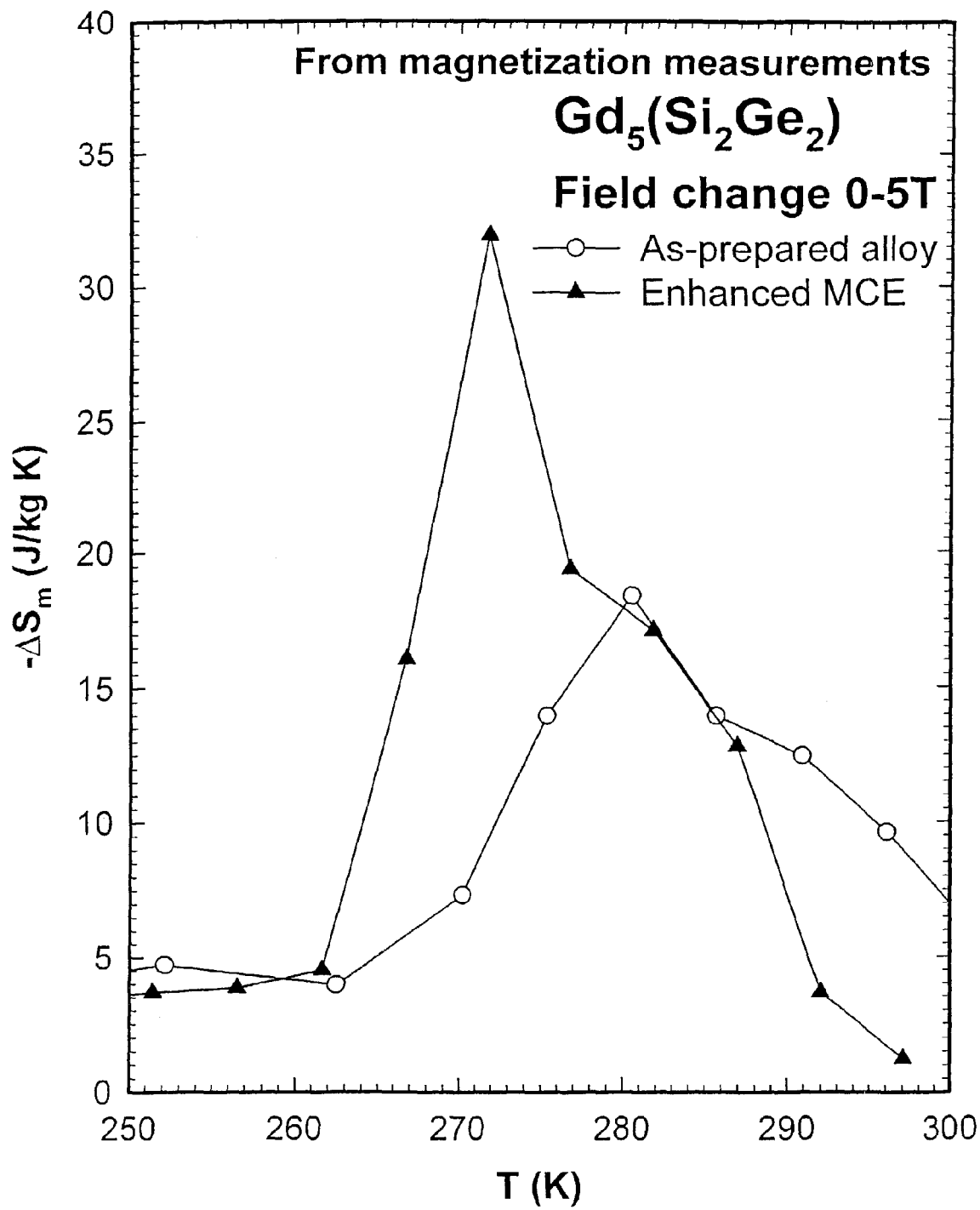
FIG. 15c illustrates the magnetocaloric effect ($-\Delta S_M$) of $Gd_5(Si_2Ge_2)$ prepared by arc-melting low C, low O (AL) Gd plus Si and Ge and the enhancement of the magnetocaloric effect by heat treatment at 1000 degrees C. as calculated from magnetization measurements.

As noted, in the Eutectoidal Decomposition or Crystallographic Structural Transformation discussion above, the MCE of $Gd_5(Si_2Ge_2)$ is enhanced by ~40% by annealing at 900 degrees C. for 3 days and ~35% at 1000 degrees C. for 3 days, and ~18% at 800 degrees C. for 3 days compared to the as arc-melted alloy pursuant to U.S. Pat. No. 5,743,095. The 900 and 1000 degrees C. $-\Delta S_m$ values (30.9 and 30.2, respectively) are within experimental error the same. A comparison of the MCE properties of the arc-melted ("as-prepared alloy") without heat treatment with the "Enhanced MCE" arc-melted sample heat-treated at 900 degrees C., both prepared from high purity (low C and O impurity) Ames Laboratory (AL) Gd, is shown in FIGS. 15a–15c. FIG. 15a shows the adiabatic temperature rise determined from the high magnetic field calorimetry measurements, while FIG. 15b shows the results of the direct measurements of $\Delta T_{ad}$. FIG. 15c compares the $-\Delta S_m$ values obtained from magnetization measurements. This enhanced MCE ($-\Delta S_M$) is 50% greater than previously reported on the discovery of the giant magnetocaloric effect.[3] For the $Gd_5(Si_xGe_{1-x})_4$ where $0.375 \leq x \leq 0.56$ materials a heat treatment at 1300 to 1400 degrees C. for 1 to 10 hours (where the time of the heat treatment depends upon the composition) also dramatically enhances the MCE.

An enhanced MCE for $Gd_5(Si_2Ge_2)$ which was prepared by induction melting using commercially pure Gd was also obtained. A series of annealing studies was conducted on $Gd_5(Si_2Ge_2)$ prepared by induction melting and holding at 1800 degrees C. for 1 hour at $10^{-6}$ torr and rapid cooling by shutting off the furnace power and followed by consecutive 1 hour anneals at 1600, 1500, 1400, 1300 degrees C. in a Ta crucible. The $-\Delta S_M$ values were, respectively, 18, 24, 28 and 27 J/kg K (see Table 2). This means the optimum enhanced MCE effect can be obtained by heat treating $Gd_5(Si_2Ge_2)$ made using commercially pure Gd at ~1400 degrees C. for 1 hour. A one hour 1400 degrees C. heat treatment is also sufficient for the $Gd_5(Si_xGe_{1-x})_4$ for $0.4 \leq x \leq 0.5$. Heat treatment in the range 800 degrees C. to 1600 degrees C. may be employed to increase the MCE effect. For the commercial $Gd_5(Si_xGe_{1-x})_4$ alloys (where $0.5 \leq x \leq 0.56$) the heat treatment times at 1400 degrees C. varies linearly with composition for 1 hour at x=0.5 to 10 hours at x=0.56.

Furthermore, the maximum value of $-\Delta S_M$ (28 J/kg K) for the $Gd_5(Si_2Ge_2)$ phase prepared by induction melting as described above using commercially pure Gd is only 12% less than the best value (32 J/kg K) obtained using low C, O impurity Ames Laboratory (AL) Gd to prepare the $Gd_5(Si_2Ge_2)$.

Production of the Giant magnetocaloric Effect Materials ($Gd_5(Si_xGe_{1-x})_4$ with the Improvement in the Magnetocaloric Properties An embodiment of the invention provides a method for the production of large quantities of the giant magnetocaloric effect $Gd_5(Si_xGe_{1-x})_4$ materials as follows. The starting components are: (1) commercially available (pure) gadolinium (Gd) having a purity described above (commercial source is Tianjiao International Trading Co., Burlingame, Calif.); (2) commercially available (pure) silicon (Si) typically 99.99 to 99.9999 wt. % pure (commercial source is Alfa Asar, Ward Hill, Mass.); and (3) commercially available (pure) germanium (Ge) typically 99.99 to 99.9999 wt. % pure (commercial source is Meldform Metals, Royston, Herts, England). The $Gd_5(Si_xGe_{1-x})_4$ alloys are produced in tantalum (Ta) or tungsten (W) crucibles made to a size large enough to hold the desired amount of starting materials and produced alloy. Generally a crucible should be filled to no more than 50% full to prevent the components from splashing out of the crucible during the initial melting when the mixture heats up due to the large exothermic heat of formation of $Gd_5(Si_xGe_{1-x})_4$ when elemental Gd, Si, and Ge are reacted.

Stoichiometric amounts of Gd, Si, and Ge charge components with up to 0.5 wt. % excess Si are placed in an out-gassed Ta or W crucible and the crucible is loosely covered with a Ta lid. To prevent excessive dissolving of Ta by molten Gd a small amount of already prepared $Gd_5(Si_xGe_{1-x})_4$ alloy is placed at the bottom of the crucible. The Gd is placed on top of this alloy, then the crucible is loaded with Si and finally with Ge. The crucible is then placed inside an induction furnace chamber and the chamber is evacuated to $10^{-6}$ torr of residual gas pressure. The mixture is slowly heated to 1800 degrees C. and held at this temperature for one hour. During heating it is important to observe both the changes in pressure inside the reaction chamber and the temperature of the crucible. The pressure typically increases between 300 to 700 degrees C. indicating that the components for the $Gd_5(Si_xGe_{1-x})_4$ alloy (i.e. elemental Gd, Si, and Ge) begin to out-gas. At this moment the power to the induction coil should not be increased and the mixture should be allowed enough time at constant temperature between 300–700 degrees C. to completely out-gas, which is observed as the return of the pressure to a target of $10^{-6}$ torr. As the temperature rises above ~940 degrees C., elemental Ge melts and reacts with Gd and Si, which causes an increase in the temperature inside the reaction chamber. The power to the induction coil must be reduced by 1 to 50% so as not to allow rapid overheating of the reacting mixture and to prevent excessive reaction of Gd and Si with Ta. A second spontaneous increase in temperature may occur approximately at 1400 degrees C. when the remaining non-reacted Si and Si+Ge solid solution melt and the chemical reaction

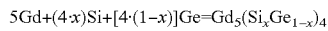

is completed.

When the chemical reaction is complete (which is observed as the decrease in crucible temperature) the furnace power is ramped until temperature of the crucible reaches 1800 degrees C. to completely melt the alloy. A constant 1800 degrees C.±10 degrees C. temperature should be maintained for one hour. The one hour melting time has been experimentally established to be adequate to: (1) homogenize the molten alloy; (2) oxidize and reduce an amount of carbon (C) impurity with oxygen (O) impurity [both are present in the starting Gd stock]; and (3) prevent excessive reaction of Si with the crucible material (Ta).

After one hour melting time the power to induction coil must be instantly reduced to 0 allowing liquid $Gd_5(Si_xGe_{1-x})_4$ alloy to solidify as rapidly as possible. Since the crucible containing the $Gd_5(Si_xGe_{1-x})_4$ alloy is placed inside a graphite heat shield to reduce excessive heat losses while holding the melt at 1800 degrees C., the graphite heat shield is quickly removed by using a hoist simultaneously with turning the power off. When the temperature of the crucible drops below 1400 degrees C. the power to induction coil is again turned on and adjusted to maintain the crucible containing the solidified alloy at 1400 degrees C.±10 degrees C. for 1 to 10 hours depending on the composition. The temperature and the heat treatment were established experimentally to be adequate to homogenize the as-solidified casting. The heat treatment at 1400 degrees C. not only homogenizes and further purifies the alloy, but also brings about the enhanced magnetocaloric effect, which is approximately 40 to 50% larger than the magnetocaloric effect observed in small arc-melted button prepared from high-purity gadolinium and in non-heat treated alloys and changes the nature of the phase transformation from a second to a first order phase transformation for the $0.5 < x \leq 0.56$ alloys. These materials should be taken from the crucible after melting and broken into small pieces (equal to or less than 1 cm$^3$) and then heat treated at 1400 degrees C. for 1 to 10 hours.

The heat treated $Gd_5(Si_xGe_{1-x})_4$ alloy will have a homogenous microstructure comprising the room temperature monoclinic crystallographic phase $Gd_5(Si_xGe_{1-x})_4$ for $0.375 \leq x \leq 0.56$, orthorhombic (I) crystallographic phase $Gd_5(Si_xGe_{1-x})_4$ for $0 \leq x < 0.30$, a mixture of both crystallographic forms for $0.30 < x < 0.375$, or orthorhombic (II) crystallographic phase $Gd_5(Si_xGe_{1-x})_4$ for $0.5 < x \leq 1.0$. When the heat treatment is complete, the electrical power to induction coil is turned-off, and the crucible as well as the alloy are allowed to cool to room (ambient) temperature, as quickly as possible, to ambient temperature to prevent the crystallographic transformation or eutectoid decomposition described above depending on the value of x. Conversely, one can remove the crucible holding the $Gd_5(Si_xGe_{1-x})_4$ phase from the heat shield assembly when the power is turned-off to obtain the same effect. The critical temperature region is 700 to 200 degrees C.—the faster the sample can be cooled through this region the larger the MCE. The critical time for cooling through this region is about one hour.

After the sample is at room temperature the crucible is then extracted from the reaction chamber and the alloy is separated from the crucible by gently pounding the crucible, which breaks the weak bond formed between the Ta crucible walls and the $Gd_5(Si_xGe_{1-x})_4$ ingot. Finally magnetization measurements are carried out on at least two ingot samples taken from the top and the bottom portions of the ingot, and the magnetocaloric effect is calculated to verify the ingot homogeneity and the presence of the enhanced giant magnetocaloric effect. In the case of the colossal magnetostriction alloy the volumetric magnetostriction is also verified by the appropriate measurements.

EXAMPLE 1

Preparation of 1 kg of $Gd_5(Si_2Ge_2)$ magnetic material with the enhanced giant magnetocaloric effect, colossal magnetostriction, and giant magnetoresistance between 275 and 300 K in magnetic fields varying between 0 and 5 T.

1. Density of the $Gd_5(Si_2Ge_2)$ alloy is 7.53 g/cm$^3$. Therefore, 1 kg of the prepared alloy will have an approximate volume of 133 cm$^3$. The total crucible volume should not be less than 270 cm$^3$ and preferably should be 300 cm$^3$ or more. Therefore, a crucible of at least 3.1 cm diameter and at least 10 cm tall should be chosen and out-gassed between 1000 and 1800 degrees C. for 30 minutes.

2. The $Gd_5(Si_2Ge_2)$ alloy contains 79.612 wt. % Gd, 5.688 wt. % Si, and 14.700 wt. % Ge. Therefore, the crucible (see item 1, above) is initially loaded with ~100 g of previously prepared $Gd_5(Si_2Ge_2)$ to prevent the reaction of molten Gd with Ta before the Gd reacts with the Si and Ge to form the ternary compound. Then it is loaded successively with 796.12±0.01 g of commercially available Gd, with 56.88±0.01 g of commercially available Si, and finally the crucible is loaded with 147.00±0.01 g of commercially available Ge. When loading of the elemental components is complete, the crucible with its content is loosely covered with a Ta lid and is placed inside an induction furnace reaction chamber. A thermocouple calibrated in the temperature range between the room temperature and at least 1900 degrees C. is placed in close vicinity of the crucible (the gap between the thermocouple jacket and the outside of the crucible should be between 0.1 and 1 mm) and at one half of the height of the alloy in the crucible after it has been melted.

3. When the crucible loading is complete, the reaction chamber is evacuated allowing the pressure inside the reaction chamber to reach 10$^{-5}$ to 10$^{-6}$ torr.

4. When reaction chamber vacuum reaches 10$^{-5}$ to 10$^{-6}$ torr residual pressure, an induction coil is energized allowing the temperature of Ta crucible loaded with elemental Gd, Si, and Ge, and loosely covered with a Ta lid (see item 2, above) to increase above 300 degrees C. or higher.

5. When the temperature of the crucible exceeds 300 degrees C. a sudden increase in the reaction chamber pressure occurs, the induction coil power is held constant allowing enough time for out-gassing of elemental Gd, Si, and Ge and the pressure to return to 10$^{-5}$ to 10$^{-6}$ torr. Then the power is ramped again until the temperature of the crucible reaches approximately 940 degrees C.

6. At approximately 940 degrees C. elemental Ge melts and flows to the bottom of the crucible dissolving some Si and reacting with Gd. This usually releases some heat due to the reactions

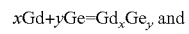

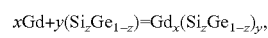

where x=1 or 5, y=1, 2, 3, or 4, and z is between 0 and 1, and the temperature of the crucible spontaneously increases. The power to the induction coil is reduced by 1 to 50% depending on the rate of spontaneous temperature increase.

7. When the temperature of the crucible is stabilized, or when it begins to decrease, this indicates that the chemical reactions mentioned in item 6 are complete, and the power of the induction furnace is again increased ramping the temperature above 940 degrees C.

8. Between 940 degrees C. and 1800 degrees C. (the later being the target temperature) one or more spontaneous temperature increases can occur indicating the melting of the $Si_zGe_{1-z}$ solid solution and the remaining Si, and the additional chemical reactions $$x1Gd + y1(Si_zGe_{1-z}) = Gd_{x1}(Si_zGe_{1-z}) \text{ and}$$

$$x2Gd_x(Si_zGe_{1-z})_{y1} + y2Si = Gd_{x3}(Si_{z1}Ge_{1-z1})_{y3},$$

which release the remaining heat of the final reaction $$5Gd + 2Si + 2Ge = Ge_5(Si_2Ge_2).$$

Spontaneous increases in temperature generally are not observed above melting temperature of Si (1414 degrees C.). In each case when spontaneous temperature increase occurs, the power to the induction furnace is manipulated as described in items 6 and 7, above.

9. When the temperature of the crucible reaches 1800 degrees C., the furnace is held at constant power without allowing temperature fluctuations exceeding ±10 degrees C. for one hour. The carbon (C) impurity is oxidized by the oxygen (O) impurity during this one hour time period according to the following chemical reactions:

$$C + O^* = CO \text{ and}$$

$$C + 2O^* = CO_2, \text{ or } CO + O^* = CO_2,$$

where O* is oxygen dissolved in the molten $Gd_5(Si_2Ge_2)$ alloy and a mixture of CO and $CO_2$ is pumped away from the melt and from the reaction chamber. Since the reaction occurs in the melt and the concentration of both C and O impurities is quite low, this process does not distort the vacuum inside the reaction chamber. Since the alloy is liquid at 1800 degrees C., the diffusivity of all atomic species (including Gd, Si, Ge, C and O) is relatively high and as established experimentally the one hour holding provides adequate time for complete homogenization of the liquid $Gd_5(Si_2Ge_2)$ alloy and the reduction of the C impurity content to a level at which it no longer has a deleterious effect on the MCE properties.

10. After one hour the furnace power is rapidly reduced to zero allowing the molten $Gd_5(Si_2Ge_2)$ alloy to rapidly solidify, which prevents macroscopic segregation.

11. When the temperature of the crucible falls below 1400 degrees C., the induction coil is re-energized and the crucible temperature with the solidified $Gd_5(Si_2Ge_2)$ alloy is stabilized at 1400 degrees C. and is held for one hour. This allows adequate time for homogenization of as-solidified $Gd_5(Si_2Ge_2)$ alloy, and/or stress relief, and/or further grain purification by diffusing the impurities out of the grains and precipitating them on the inter-grain boundaries. All or some of the effects described in this item bring about the enhanced magnetocaloric effect in $Gd_5(Si_2Ge_2)$ alloy.

12. After holding 1400 degrees C. for one hour, the induction furnace power is turned-off and the crucible containing the $Gd_5(Si_2Ge_2)$ alloy is allowed to cool to room temperature as rapidly as possible to prevent the eutectoid decomposition of the $Gd_5(Si_2Ge_2)$ alloy. The crucible is then extracted from the reaction chamber and the material is removed from the crucible by gently pounding on the walls and the bottom of the crucible. Two samples (one from the top and one from the bottom portions of the ingot) are taken and their magnetization behavior in the range 240 to 320 K are measured. The magnetocaloric effect is then calculated to ensure that the obtained ingot is homogeneous and displays the enhanced giant magnetocaloric effect.

The following additional Example is provided to illustrate practice of the invention to make and heat treat the magnetic refrigerant material $Gd_5(Si_xGe_{1-x})_4$ where $0.47 < x \leq 0.56$ using high purity or commercial grade Gd, and commercial Si, and Ge components.

$Gd_5Si_2Ge_2$ was prepared using the same technique and quality materials as described above. The alloy was arc-melted on a water-cooled copper hearth in an argon atmosphere under ambient pressure using the stoichiometric mixture of the components. High purity Gd metal (99.99 wt. % [99.86 at. %]) was prepared by the Materials Preparation Center of the Ames Laboratory and contained the following major impurities in ppm weight (atomic): O—97 (697), C—18 (236), H—4 (622), F—<3 (<25), and Fe—12 (34). The silicon and germanium were purchased from CERAC Inc., and were 99.9999 wt. % [99.89 at. %] pure. During melting, the sample was homogenized by turning over the button and re-melting eight times. The mass of the alloy was ~20 g. Considering the relatively small mass and good thermal coupling between the melt and the water-cooled copper hearth, both the solidification and cooling of the alloy were quite rapid. The weight loss of prepared sample was 0.37 wt. %.

Figure 16:
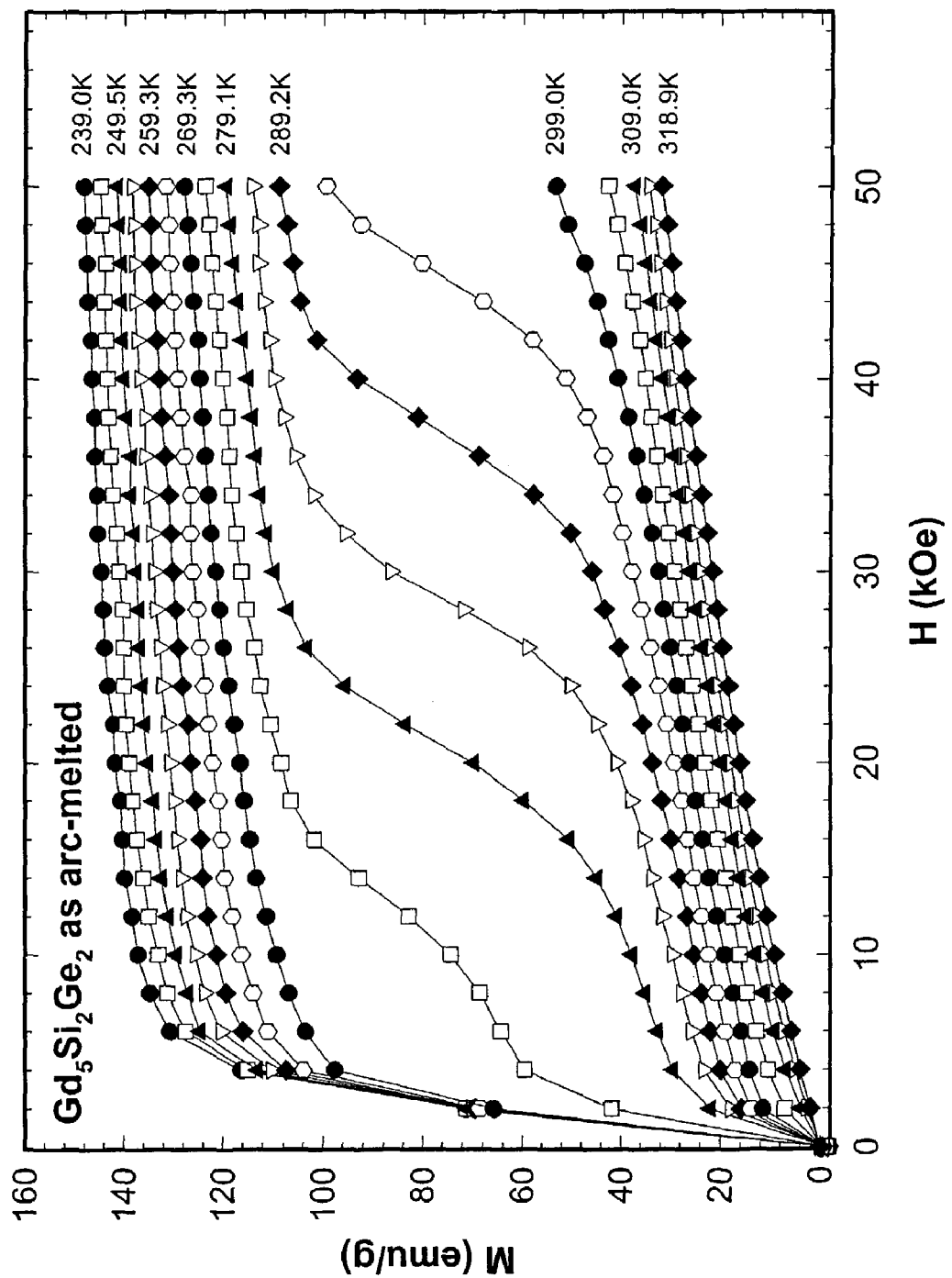
FIG. 16 are magnetization isotherms measured in the 239–319 K temperature range on increasing magnetic field of the as arc-melted $Gd_5Si_2Ge_2$.
Figure 17:
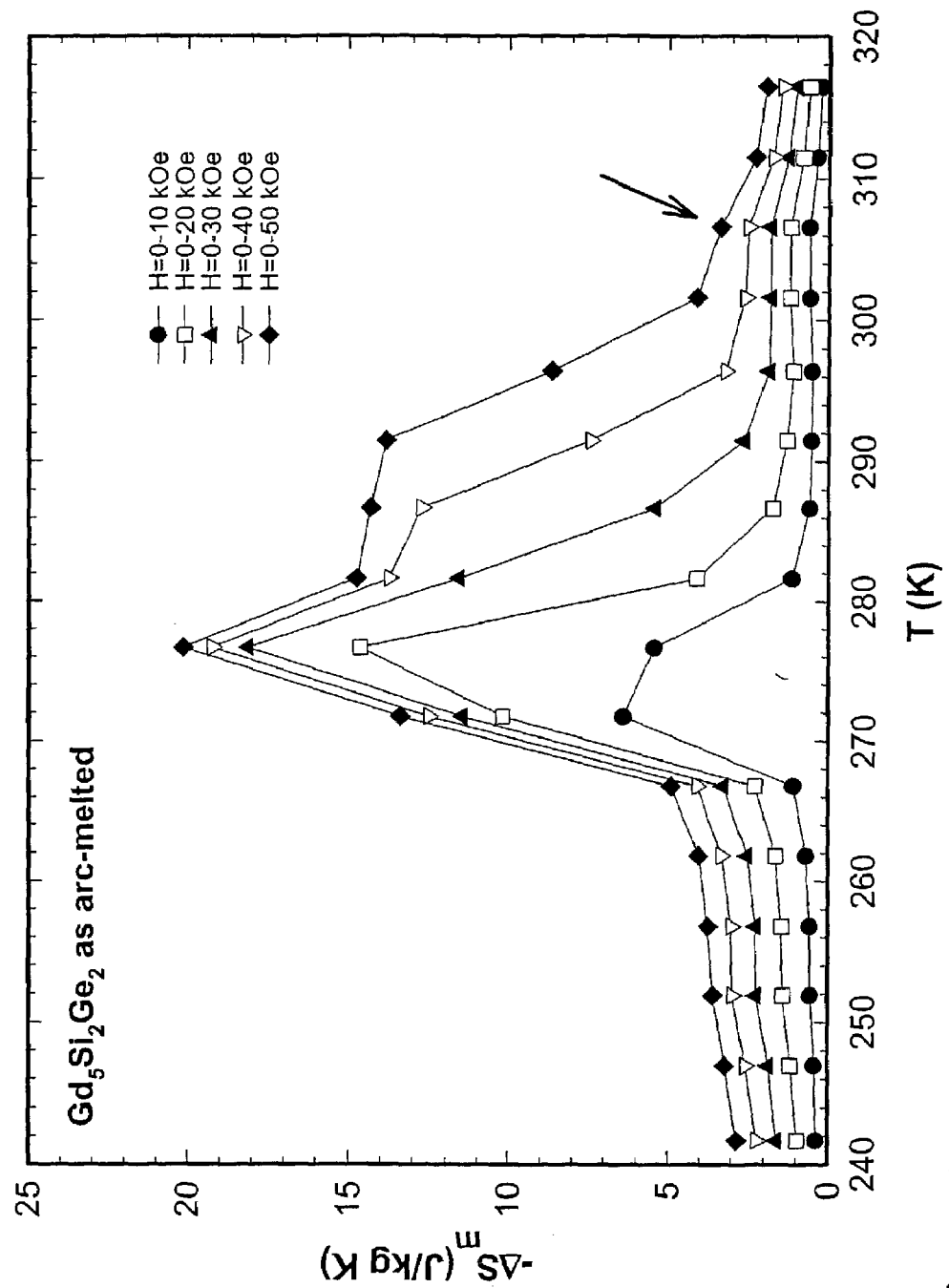
FIG. 17 shows the magnetic entropy change ($-\Delta S_m$) of the as arc-melted $Gd_5Si_2Ge_2$ as a function of temperature calculated from magnetic measurements for 10, 20, 30, 40, and 50 kOe magnetic field changes. The arrow points to the anomaly due to the presence of a second phase.

The magnetization isotherms of arc-melted specimens were measured in the vicinity of the transition temperature (~277 K) with increasing magnetic field from 0 to 50 kOe using a Lake Shore ac/dc magnetometer, model No. 7225, and are shown in FIG. 16. The behavior of the magnetization as a function of the magnetic field below ~269 K is typical of a soft ferromagnet, and above ~309 K it has the characteristics of a paramagnet. Between ~274 and ~299 K, the isotherms display a metamagnetic-like transition, which is due to the coupled magnetic-crystallographic transformation observed earlier in this and other monoclinic $Gd_5(Si_xGe_{1-x})_4$ alloys. The magnetic entropy change, $-\Delta S_m$, described herein was calculated from the magnetization data as described in Reference 7 and in U.S. Pat. No. 5,743,095 where $\Delta S_M$ is used herein to represent the magnetic entropy change $\Delta S_{mag}$ set forth in the reference and the patent, both of which are incorporated herein by reference. To avoid potential errors associated with variability of data collection parameters, all magnetic measurements and calculations were conducted in the same manner (the temperature step was ~5 K, and the magnetic field step was 2 kOe). The $-\Delta S_m$ for the as-prepared $Gd_5Si_2Ge_2$ for magnetic field changes of 0 to 10, 20, 30, 40, and 50 kOe are shown in FIG. 17. The temperature of the maximum is 277 K, and the values of $-\Delta S_m$ for 20 and 50 kOe magnetic field change are about 15 and 20 J/kg K, respectively.

Figure 18:
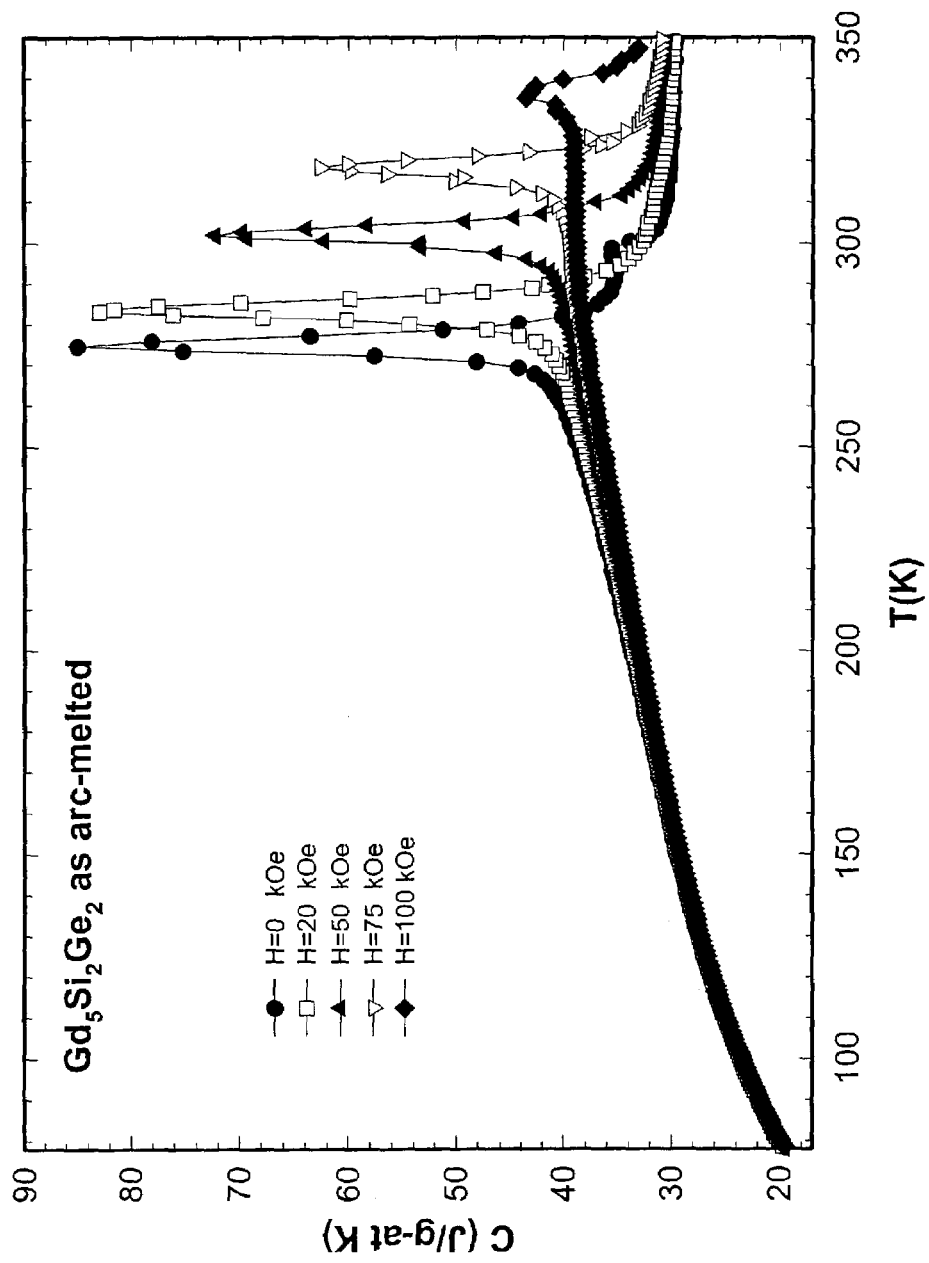
FIG. 18 shows the heat capacity of the as-prepared $Gd_5Si_2Ge_2$ as a function of temperature in 0, 20, 50, 75, and 100 kOe magnetic fields.
Figure 19:
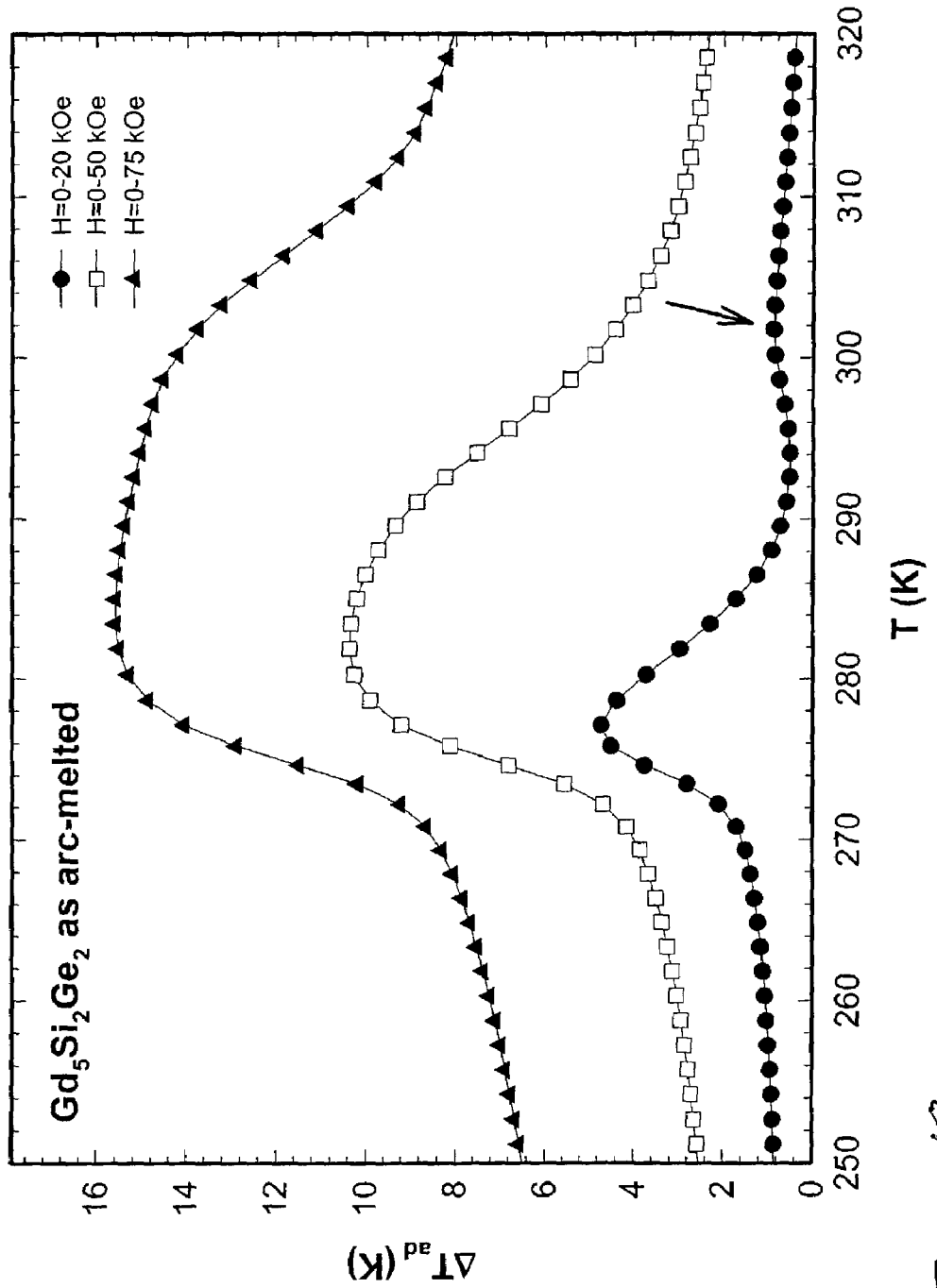
FIG. 19 shows the adiabatic temperature change ($\Delta T_{ad}$) of as arc-melted $Gd_5Si_2Ge_2$ as a function of temperature calculated from the heat capacity data for 20, 50, and 75 kOe magnetic field changes.

The heat capacity as a function of temperature and magnetic field was measured using a semiadiabatic heat pulse calorimeter[8] (also see U.S. Pat. No. 5,743,095) from 4 to 350 K in various magnetic fields: 0, 20, 50, 75, and 100 kOe (FIG. 18). The narrow peak of ~85 J/kg K, observed at 275 K in the zero magnetic field heat capacity data, shifts to a higher temperature with the increasing magnetic field, indicating the first order phase transformation. The small anomaly in the zero field heat capacity at about 300 K clearly points to the presence of a second phase in the as-prepared $Gd_5Si_2Ge_2$. The impurity in the as arc-melted $Gd_5Si_2Ge_2$ sample results in the reduction of the MCE values calculated from both the magnetization and heat capacity data. The adiabatic temperature rise (FIG. 19) was determined from the heat capacity data as described in Reference 7. The temperature of the $\Delta T_{ad}$ maximum (~280 K) is close to the temperature of $-\Delta S_m$ peak calculated from magnetization isotherms (~277 K) (FIG. 3). The value of the $\Delta T_{ad}$ peak, ~11 K for $\Delta H=50$ kOe, is slightly lower than that of Gd (~13 K for $\Delta H=50$ kOe at 293 K).

The as arc-melted $Gd_5Si_2Ge_2$, was heat treated at various temperatures between 670 and 1670 K for different periods of time ranging from one hour (h) to two weeks. Annealing at temperatures below ~1300 K was carried out by using evacuated quartz tubes and then back-filled with helium before sealing. After the heat treatment, the samples were quenched in ice-cold water. Heat treatments at higher temperatures were conducted by using an induction furnace, where the samples were heated in vacuum (~$10^{-6}$ Torr), and then cooled by shutting down the power to the furnace. In all cases, the size of the sample did not exceed 2 $cm^3$ to provide the fastest possible cooling. The results are shown in Table 4.

TABLE 4

Maximum magnetocaloric for differently heat treated $Gd_5Si_2Ge_2$ samples

| Temperature(K)/Time(hours) | $T_{TR}$(K) | Maximum $-\Delta S_m$ (J/kg K) |
|---|---|---|
| As-cast | 277 | 22.5 |
| 670 K/340 h | ~300 | 4.2 |
| 870 K/170 h | ~300 | 7.5 |
| 970 K/170 h | 277 | 20.0 |
| 1070 K/72 h | 277 | 24.9 |
| 1170 K/72 h | 277 | 25.5 |
| 1270 K/24 h | 272 | 30.2 |
| 1370 K/1 h | 272 | 31.0 |
| 1570 K/1 h | 272 | 36.4 |
| 1570 K/2 h | 272 | 32.2 |
| 1670 K/2 h | 272 | 29.3 |
| 1770 K/1 h | 267 | 25.0 |
| 670 K/340 h, then 1070 K/24 h | 277 | 29.6 |

As shown in Table 4, the samples heat treated at 670 and 870 K display a dramatic reduction of the values of the $-\Delta S_m$ and a considerable increase of the magnetic ordering temperature, which could be associated with the high temperature polymorphism of $Gd_5Si_2Ge_2$, i.e. the formation of the orthorhombic $Gd_5Si_4$-type structure phase during low-temperature annealing. Heat treatments at temperatures between 970 and 1570 K result in a gradual increase of the maximum $-\Delta S_m$ from ~20 to ~36 J/kg K with simultaneous reduction of the magnetic ordering temperature from ~277 to ~272 K. When the sample has been heat treated at 1570K for more than one hour or when it was annealed at higher temperature, a tendency for a further reduction of the magnetic ordering temperature and a slightly lower $-\Delta S_m$ are observed (see below). The polymorphic transformation from the monoclinic $Gd_5Si_2Ge_2$-type structure to the $Gd_5Si_4$-type phase between 670 and 870 K is irreversible but it becomes reversible at temperatures from 1070 K to 1570 K (also compare the second line to the last line in Table 4). The MCE for 50 kOe magnetic field change reaches the highest value of 36.5 J/kg K after heat treatment at 1570 K for one hour, which is about an 80% increase in $-\Delta S_m$ compared to the arc-melted $Gd_5Si_2Ge_2$ (20 J/kg K for $\Delta H=50$ kOe).

Figure 20:
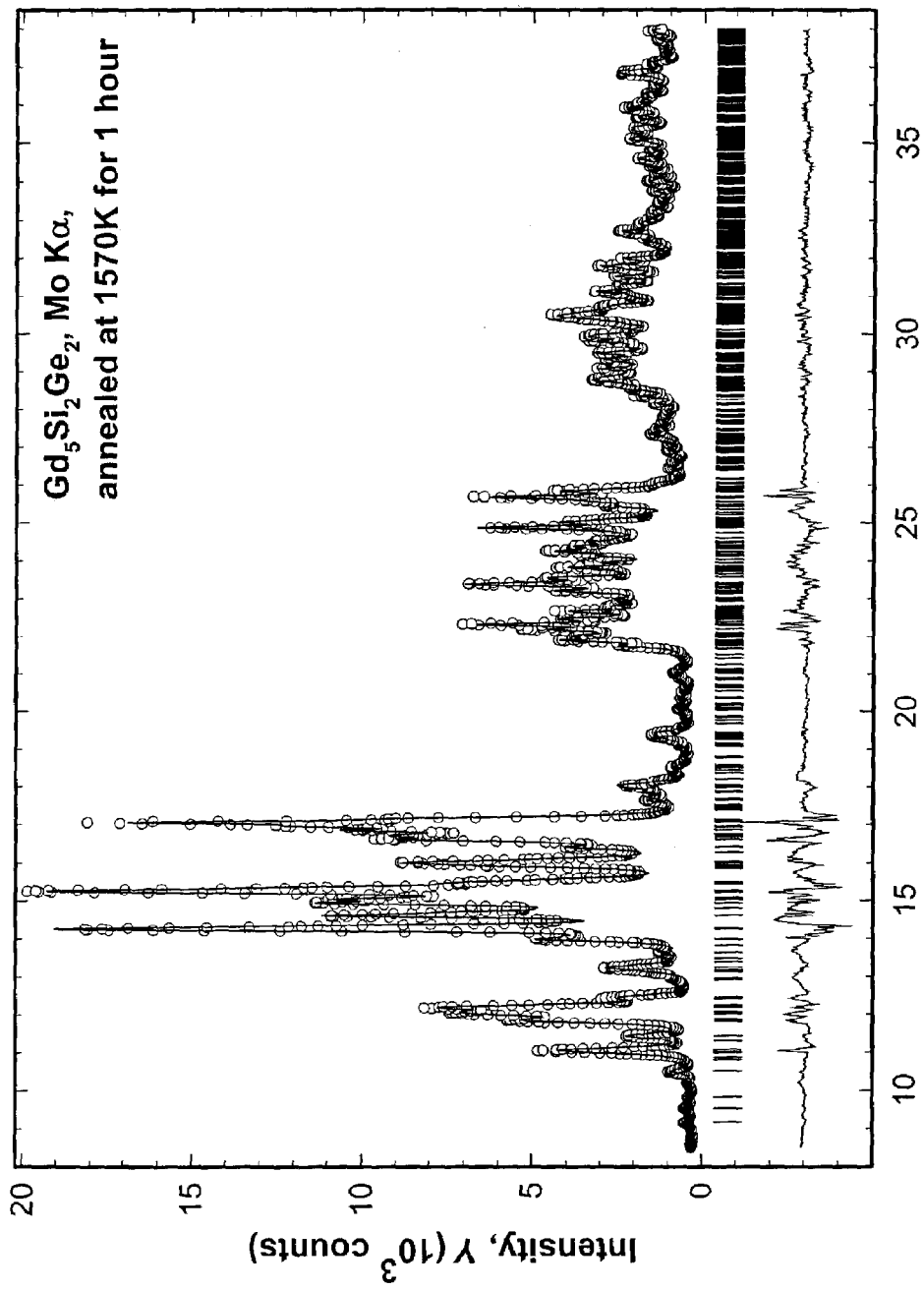
FIG. 20 shows the x-ray pattern of the $Gd_5Si_2Ge_2$ heat treated at 1570 K for one hour. The open circles represent observed data, and the lines represent calculated x-ray pattern. The difference between experimental and calculated intensity is shown at the bottom as a solid line. The vertical bars indicate calculated positions of Bragg reflections for the $K\alpha_1$ components.

The x-ray diffraction pattern of the $Gd_5Si_2Ge_2$ after annealing at 1570 K for 1 h is shown in FIG. 20. The refined lattice parameters are a=7.5820(3), b=14.8050(6), c=7.7804(3) Å, $\gamma$=93.204(2)°. The lattice parameters of the heat treated $Gd_5Si_2Ge_2$ are uniformly slightly smaller than those of the arc-melted alloy. This feature could be due to one of the following two or both possibilities: (1) the impurity $Gd_5Si_4$-type phase has a slightly higher concentration of silicon than the major $Gd_5Si_2Ge_2$-type phase or (2) the silicon and germanium concentrations are the same in both the matrix and the impurity phases and there is just a simple redistribution of the Si and Ge atoms in the monoclinic (matrix) phase. In either case, after the heat treatment, the alloy becomes homogenized, and better ordered crystallographically with the resulting small increase in the concentration of Si in the inner slab sites of the monoclinic structure. After the refinement of site occupations in the crystal structure of the annealed $Gd_5Si_2Ge_2$, it is evident that the Si and Ge atoms tend to segregate, wherein ~55% Ge populate the sites responsible for the interslab bonding, while Si preference is ~55% inside the slabs. The reduction of $-\Delta S_m$ and the lowering of the transition temperature upon annealing for more than one hour at 1570 K or at higher temperatures (see Table 4) could be due to the contamination of the $Gd_5Si_2Ge_2$ alloy by the residual gases (e.g. $O_2$, $CO_2$, hydrocarbons) in the $10^{-6}$ Torr dynamic vacuum during the annealing process. For the 1770 K one hour anneal it is doubtful that the lowering of the transition temperature is due to further redistribution of the Si/Ge atoms to increase Ge content of the interslab positions, because the observed maximum entropy change also decreases, while it would be expected to increase when the Ge concentration increases. The large drop in the transition temperature and the modest drop in $-\Delta S_M$ during the one hour anneal at 1770 K would be consistent with the increased contamination of $Gd_5Si_2Ge_2$ at the higher annealing temperature.

Figure 21:
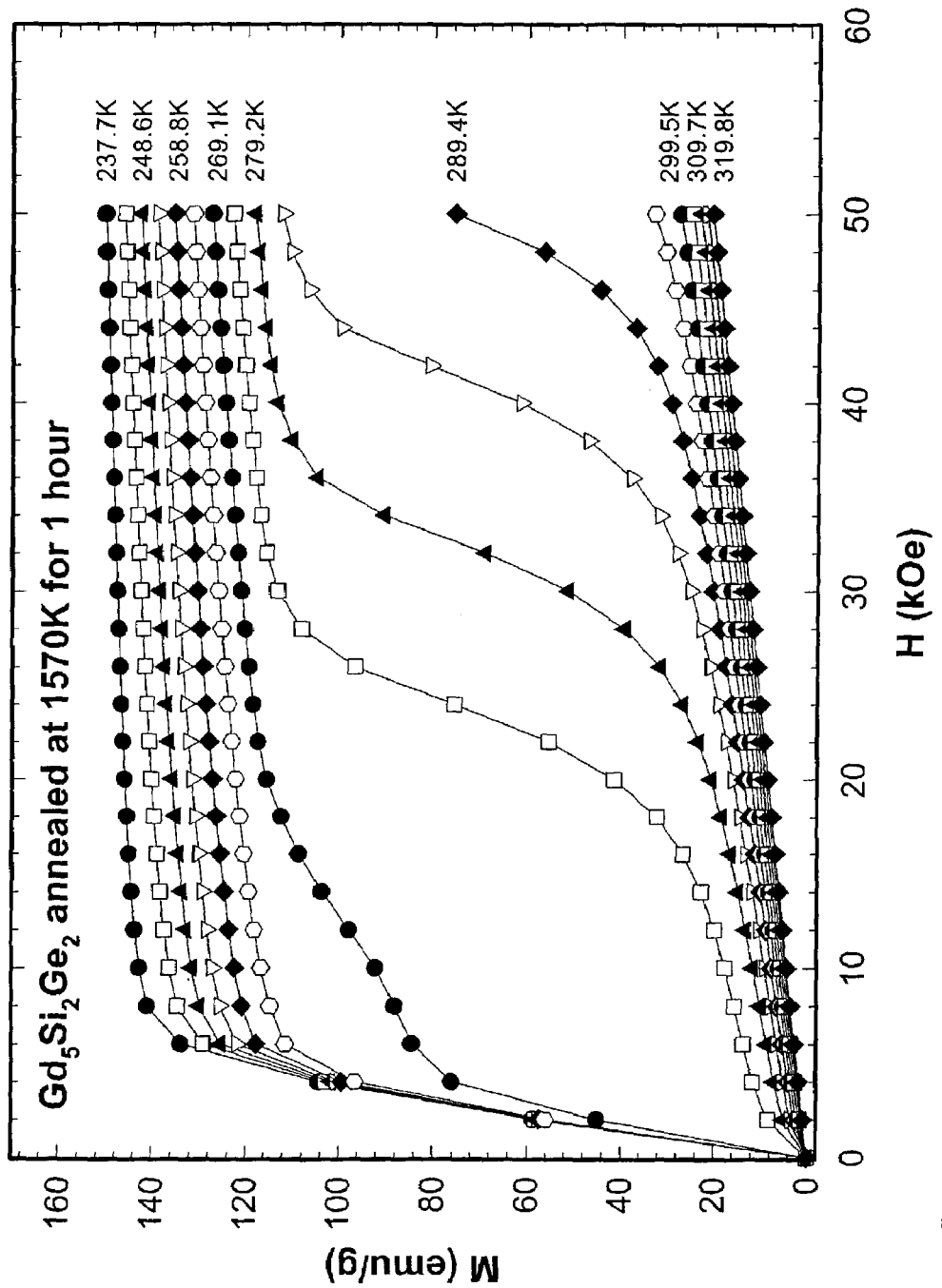
FIG. 21 shows the magnetization isotherms measured in the 238–320 K temperature range on increasing magnetic field of $Gd_5Si_2Ge_2$ heat treated at 1570 K for one hour.
Figure 22:
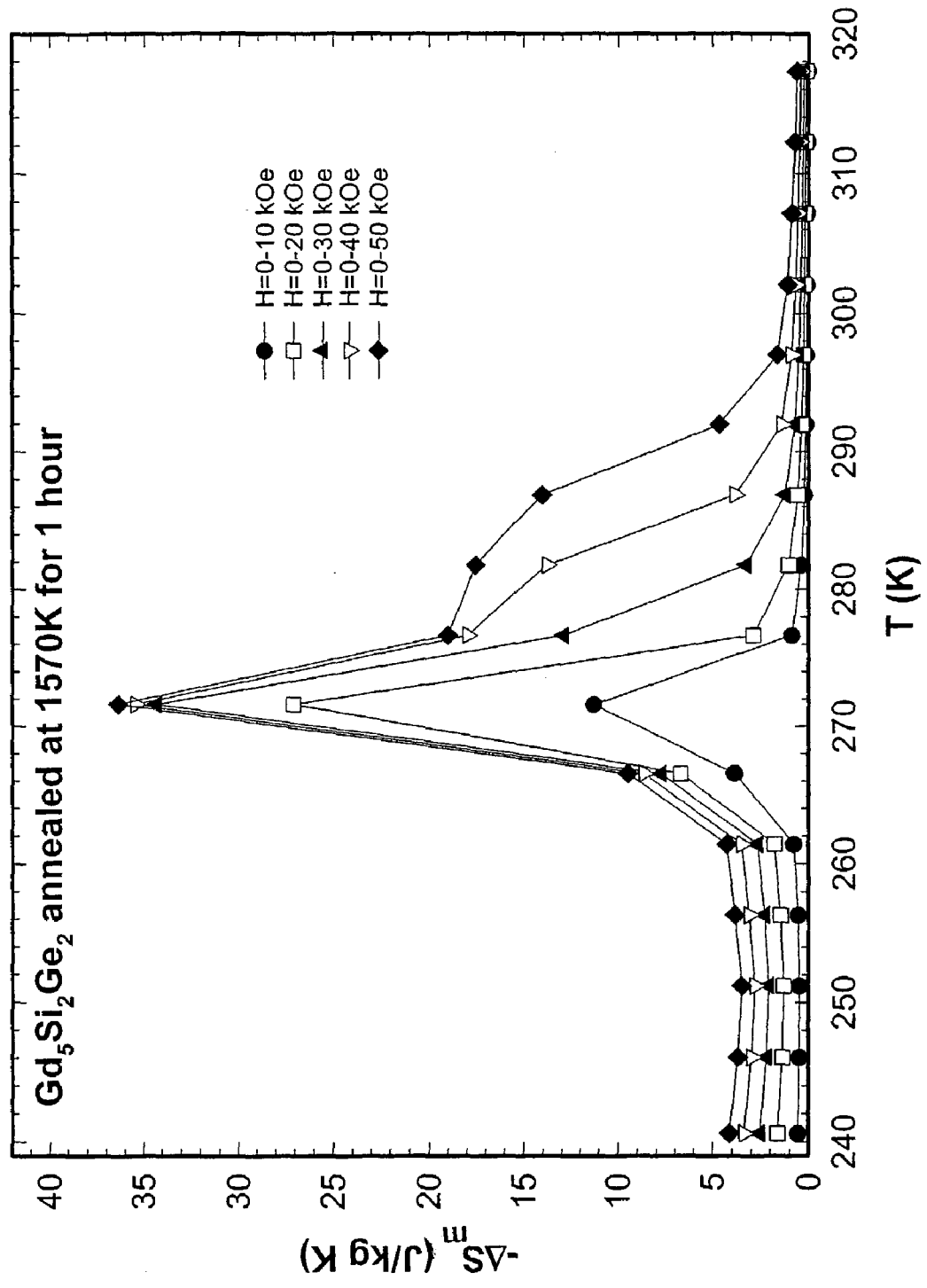
FIG. 22 shows the magnetic entropy change ($-\Delta S_m$) of the $Gd_5Si_2Ge_2$ heat treated at 1570 K for one hour as a function of temperature calculated from magnetic measurements for 10, 20, 30, 40, and 50 kOe magnetic field changes.

As seen in FIG. 21, the magnetic isotherms for the heat treated $Gd_5Si_2Ge_2$ have slightly higher saturation values and the metamagnetic-like transition appears sharper than for the as arc-melted $Gd_5Si_2Ge_2$ (compare with FIG. 16), which leads to a higher value of the MCE (FIG. 22) in the annealed $Gd_5Si_2Ge_2$. The re-distribution in Si and Ge occupancies lowers the transition temperature by about 5 K in the annealed $Gd_5Si_2Ge_2$ (~272 K) compared to the as arc-melted and slightly inhomogeneous $Gd_5Si_2Ge_2$ (~277 K). The maximum at ~300 K observed for $\Delta H=20$ kOe, which corresponds to the second orthorhombic phase in the as arc-melted $Gd_5Si_2Ge_2$ (see the arrow in FIG. 17), has disappeared in the heat treated and homogenized monoclinic $Gd_5Si_2Ge_2$ alloy, as seen in FIG. 22.

Figure 23:
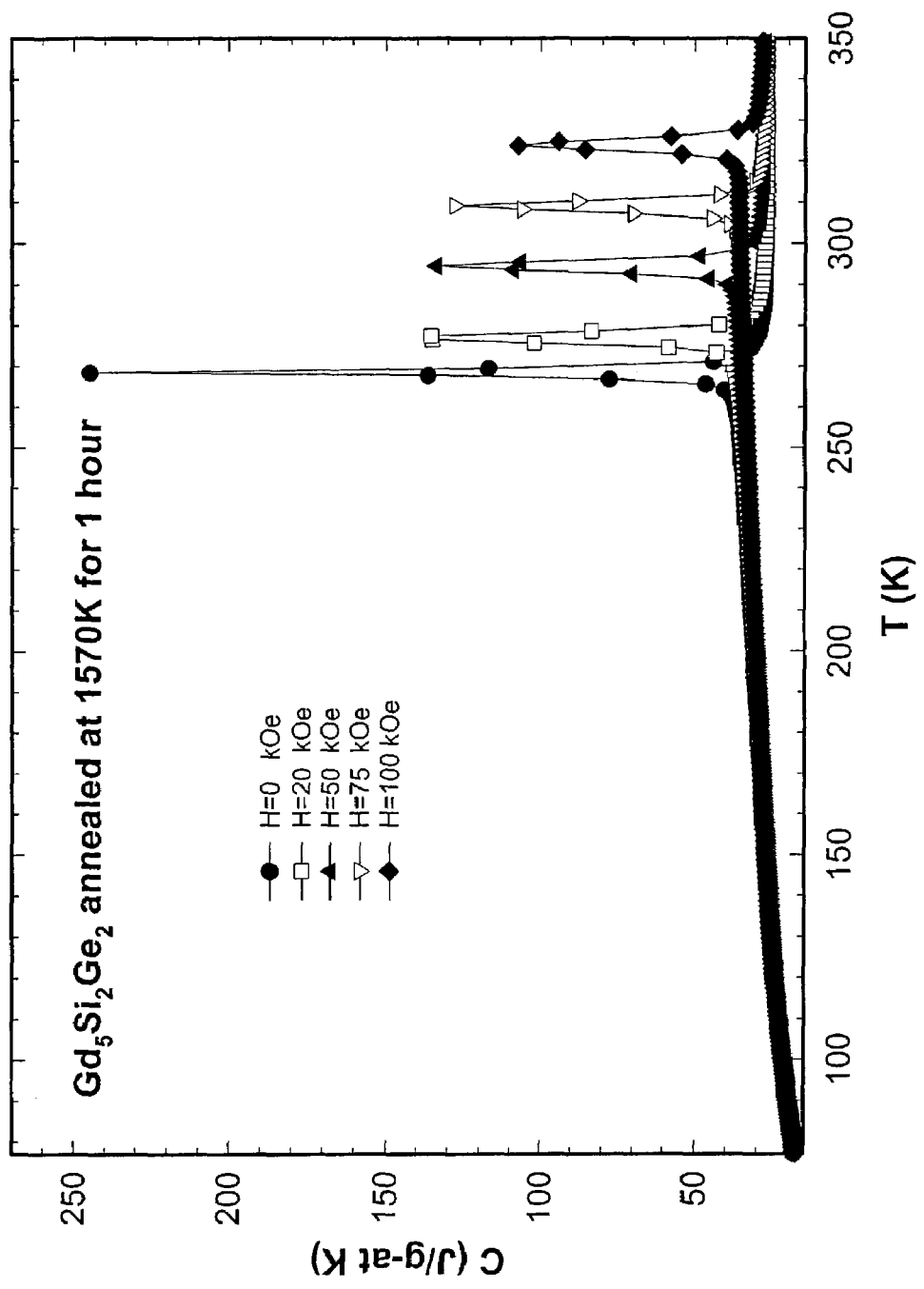
FIG. 23 shows the heat capacity of $Gd_5Si_2Ge_2$ heat treated at 1570 K for one hour as a function of temperature in 0, 20, 50, 75, and 100 kOe magnetic fields.
Figure 24:
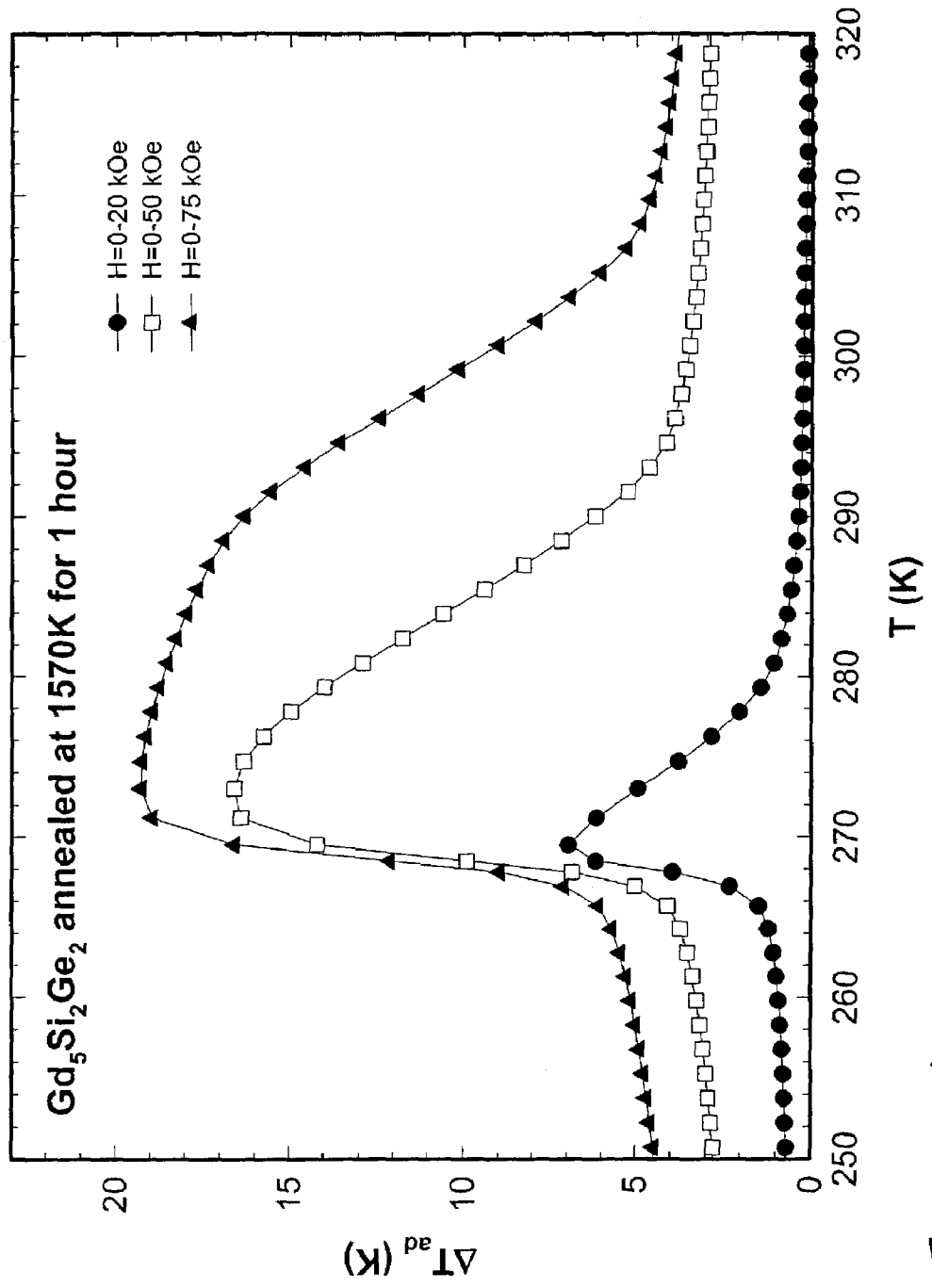
FIG. 24 shows the adiabatic temperature change ($\Delta T_{ad}$) of $Gd_5Si_2Ge_2$ heat treated at 1570 K for one hour as a function of temperature calculated from heat capacity data for 20, 50, and 75 kOe magnetic field changes.

The heat capacity data are shown in FIG. 23 for the heat treated $Gd_5Si_2Ge_2$. A narrow peak of ~245 J/g-at K is observed at ~269 K in zero magnetic field. Peak value is three times higher than that for the as-cast $Gd_5Si_2Ge_2$. The absence of a second phase in the annealed alloy is also confirmed by the disappearance of the corresponding anomaly at ~300 K in the zero field heat capacity, which was clearly evident in FIG. 18. The magnetic field has a similar effect on the heat capacity of the annealed alloy: the peak shifts to higher temperature at the same rate as in the as-cast alloy, and the transformation remains first order in magnetic fields up to 100 kOe. However, the peak values in the magnetic field heat capacities remain ~2 times larger for the heat treated sample as compared to those of the as arc-melted material (compare FIGS. 18 and 23). In FIG. 24, the temperature of the $\Delta T_{ad}$ maximum calculated from the heat capacity data is in good agreement with the magnetization results ($-\Delta S_m$) for the annealed $Gd_5Si_2Ge_2$, which is ~272 K for both $-\Delta S_m$ and $\Delta T_{ad}$. The value of the $\Delta T_{ad}$ maximum for ΔH=50 kOe is increased from ~11 to ~17 K when compared to the as arc-melted $Gd_5Si_2Ge_2$.

As is apparent from the above Example, the heat treatment at 1570 K for one hour results in the phase purification and homogenization of the arc-melted $Gd_5Si_2Ge_2$ prepared from high purity components, simultaneously leading to a partial ordering of the crystal structure via a re-distribution of Si and Ge atoms among different crystallographic sites. It appears that in the as arc-melted alloy, the Si and Ge atoms are distributed nearly randomly among the corresponding sites. Upon annealing, a tendency towards enrichment of the sites responsible for the interslab bonding in Ge is observed. These changes produce a considerable enhancement of the MCE, both the magnetic entropy change and the adiabatic temperature rise and to a small, but detectable, reduction of the coupled magnetic-crystallographic transformation temperature. The same heat treatment is also applicable to modify the properties of other monoclinic alloy phases in the $Gd_5(Si_xGe_{1-x})_4$ system where $0.47 \leq x \leq 0.56$.

EXAMPLE 2

Preparation of 1 kg of $Gd_5(Si_xGe_{1-x})_4$, where x=0.5225, magnetic material with the enhanced giant magnetocaloric effect, colossal magnetostriction, and giant magnetoresistance between 275 and 300 K in magnetic fields varying between 0 and 5 T.
1. Density of the $Gd_5(Si_xGe_{1-x})_4$ alloy, where x=0.5225, is 7.49 g/cm³. Therefore, 1 kg of the prepared alloy will have an approximate volume of 133 cm³. The total crucible volume should not be less than 270 cm³ and preferably should be 300 cm³ or more. Therefore, a crucible of at least 3.1 cm diameter and at least 10 cm tall should be chosen and out-gassed between 1000 and 1800 degrees C. for 30 minutes.
2. The $Gd_5(Si_xGe_{1-x})_4$ alloy, where x=0.5225, contains 78.625 wt. % Gd, 5.870 wt. % Si, and 13.865 wt. % Ge. Therefore, the crucible (see item 1, above) is initially loaded with ~100 g of previously prepared $Gd_5(Si_xGe_{1-x})_4$ to prevent the reaction of molten Gd with Ta before the Gd reacts with the Si and Ge to form the ternary compound. Then it is loaded successively with 799.36±0.01 g of commercially available Gd, with 59.68±0.01 g of commercially available Si, and finally the crucible is loaded with 140.96±0.01 g of commercially available Ge. When loading of the elemental components is complete, the crucible with its content is loosely covered with a Ta lid and is placed inside an induction furnace reaction chamber. A thermocouple calibrated in the temperature range between the room temperature and at least 1900 degrees C. is placed in close vicinity of the crucible (the gap between the thermocouple jacket and the outside of the crucible should be between 0.1 and 1 mm) and at one half of the height of the alloy in the crucible after it has been melted.
3. When the crucible loading is complete, the reaction chamber is evacuated allowing the pressure inside the reaction chamber to reach $10^{-5}$ to $10^{-6}$ torr.
4. When reaction chamber vacuum reaches $10^{-5}$ to $10^{-6}$ torr residual pressure, an induction coil is energized allowing the temperature of Ta crucible loaded with elemental Gd, Si, and Ge, and loosely covered with a Ta lid (see item 2, above) to increase above 300 degrees C. or higher.
5. When the temperature of the crucible exceeds 300 degrees C. a sudden increase in the reaction chamber pressure occurs, the induction coil power is held constant allowing enough time for out-gassing of elemental Gd, Si, and Ge and the pressure to return to $10^{-5}$ to $10^{-6}$ torr. Then the power is ramped again until the temperature of the crucible reaches approximately 940 degrees C.
6. At approximately 940 degrees C. elemental Ge melts and flows to the bottom of the crucible dissolving some Si and reacting with Gd. This usually releases some heat due to the reactions

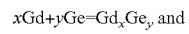
$x$Gd+$y$Ge=Gd$_x$Ge$_y$, and

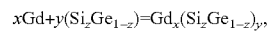
$x$Gd+$y$(Si$_z$Ge$_{1-z}$)=Gd$_x$(Si$_z$Ge$_{1-z}$)$_y$, where x=1 or 5, y=1, 2, 3, or 4, and z is between 0 and 1, and the temperature of the crucible spontaneously increases. The power to the induction coil is reduced by 1 to 50% depending on the rate of spontaneous temperature increase.
7. When the temperature of the crucible is stabilized, or when it begins to decrease, this indicates that the chemical reactions mentioned in item 6 are complete, and the power of the induction furnace is again increased ramping the temperature above 940 degrees C.
8. Between 940 degrees C. and 1800 degrees C. (the later being the target temperature) one or more spontaneous temperature increases can occur indicating the melting of the $Si_zGe_{1-z}$ solid solution and the remaining Si, and the additional chemical reactions

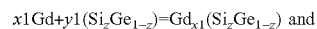
$x1$Gd+$y1$(Si$_z$Ge$_{1-z}$)=Gd$_{x1}$(Si$_z$Ge$_{1-z}$) and

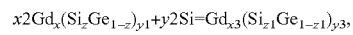
$x2$Gd$_x$(Si$_z$Ge$_{1-z}$)$_{y1}$+$y2$Si=Gd$_{x3}$(Si$_{z1}$Ge$_{1-z1}$)$_{y3}$, which release the remaining heat of the final reaction

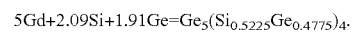
$5Gd+2.09Si+1.91Ge=Ge_5(Si_{0.5225}Ge_{0.4775})_4$.

Spontaneous increases in temperature generally are not observed above melting temperature of Si (1414 degrees C.). In each case when spontaneous temperature increase occurs, the power to the induction furnace is manipulated as described in items 6 and 7, above.
9. When the temperature of the crucible reaches 1800 degrees C., the furnace is held at constant power without allowing temperature fluctuations exceeding ±10 degrees C. for one hour. The carbon (C) impurity is oxidized by the oxygen (O) impurity during this one hour time period according to the following chemical reactions:

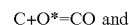
C+O*=CO and

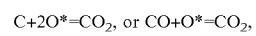
C+2O*=CO$_2$, or CO+O*=CO$_2$, where O* is oxygen dissolved in the molten $Gd_5(Si_xGe_{1-x})_4$ alloy, where x=0.5225, and a mixture of CO and $CO_2$ is pumped away from the melt and from the reaction chamber. Since the reaction occurs in the melt and the concentration of both C and O impurities is quite low, this process does not distort the vacuum inside the reaction chamber. Since the alloy is liquid at 1800 degrees C., the diffusivity of all atomic species (including Gd, Si, Ge, C and O) is relatively high and as established experimentally the one hour holding provides adequate time for complete homogenization of the liquid $Gd_5(Si_xGe_{1-x})_4$ alloy, where x=0.5225, and the reduction of the C impurity content to a level at which it no longer has a deleterious effect on the MCE properties.
10. After one hour the furnace power is rapidly reduced to zero allowing the molten $Gd_5(Si_xGe_{1-x})_4$ alloy, where x=0.5225, to rapidly solidify, which prevents macroscopic segregation.

11. When the temperature of the crucible falls to room temperature the crucible is then extracted from the reaction chamber and the material is removed from the crucible by gently pounding on the walls and the bottom of the crucible.

12. The size of the removed pieces of the $Gd_5(Si_xGe_{1-x})_4$, where x=0.5225, should not exceed approximately 1 cu. cm for heat treatment. The broken pieces are loaded into the same Ta crucible and heat treated at 1400° C. for 4 hours in the same chamber of the induction furnace. This heat treatment is to homogenize the monoclinic crystal structure of the prepared alloy. The crucible is cooled as rapidly as possible to prevent the eutectoid decomposition of the $Gd_5(Si_xGe_{1-x})_4$ alloy, where x=0.5225. Two samples (one from the top and one from the bottom portions of the ingot are taken and their magnetization behavior in the range 240 to 320 K are measured. The magnetocaloric effect is then calculated to ensure that the obtained ingot is homogeneous and displays the enhanced giant magnetocaloric effect.

The following still further Example is provided to illustrate practice of the invention to make and heat treat the magnetic refrigerant material $Gd_5(Si_xGe_{1-x})_4$ where $0.47<x\leq0.56$ using high purity Gd, Si, and Ge components.

A total of 15 alloys in the $(Gd_5Si_xGe_{1-x})_4$ system with x varying from 0.35 to 0.55 were prepared from high purity components as described above; all of the samples were heat treated at 1570 K for different periods ranging from one to 24 hours. The heat treatment was carried out in $\sim10^{-6}$ Torr vacuum using an induction furnace. After the heat treatment, the alloys were cooled by shutting the power to the furnace. The volume of the alloys for heat treatment did not exceed 1 cm$^3$ to provide faster cooling.

The alloys were examined by x-ray powder diffraction, magnetic, and calorimetric (heat capacity) measurements. The x-ray powder diffraction data were collected at room temperature on an automated Scintag diffractometer using Cu K$\alpha$ radiation between 20 and 80° 2$\theta$ with data collection step 2$\theta$=0.02°. The crystal structures of single-phase alloys were refined in the P112$_1$/a space group symmetry in an isotropic approximation using the Rietveld technique; in all cases, the refinement converged to $R_{Bragg}$ of the order of 9%.

The magnetization isotherms, $M(H)_T$, were measured in a Lake Shore ac/dc magnetometer (model 7225) in the vicinity of the magnetic phase transition temperatures in a dc magnetic field varying from 0 to 50 kOe. Magnetization data were collected with a ~5 K steps in temperature and 2 kOe steps in the magnetic field beginning from the lowest selected temperature. The measurement sequence at each temperature was carried out during a field increase beginning from zero magnetic field, after sample temperature has been stabilized and held constant for 5 to 7 min. After completion of the field dependent measurements at a specific temperature, the sample was slowly warmed (~1.5 K./min) to the next temperature in zero magnetic field. The heat capacity, $C_p(T)_H$, of selected alloys was measured using a semiadiabatic heat pulse calorimeter[8] during heating from ~4 to 350 K in constant dc magnetic fields ranging from 0 to 100 kOe. Each measurement sequence was begun after cooling the sample to the lowest temperature (~3.8 to ~4.2 K) in zero magnetic field followed by the application of a specific magnetic field. The isothermal magnetic entropy change, $-\Delta S_m$, was calculated from the isothermal magnetization and, independently, from heat capacity data as described above. The phase transition and the MCE maximum temperatures were established from calorimetric and magnetic measurements with the estimated accuracy of ±2 and ±5 K, respectively.

The x-ray diffraction patterns of six $Gd_5(Si_xGe_{1-x})_4$ alloys with x ranging from 0.43 to 0.502, which were heat treated at 1570 K for one hour, belong to the monoclinic solid solution region and are single-phase materials. When heat-treated for longer periods, i.e., two to four hours, the result was a slight decrease in the values of $-\Delta S_m$ and a slight increase of the first order phase transition temperatures. The x-ray powder diffraction patterns of the alloys heat treated for longer periods showed evidence of small amounts of the $Gd(Si_{1-y}Ge_y)$ and $Gd_5(Si_{1-z}Ge_z)_3$ phases, which have a different stoichiometry with respect to the ratio between the Gd and (Si+Ge) atoms, i.e. 1:1 and 5:3, respectively. Both the magnetic and calorimetric results confirm the appearance of impurity phases and lead to a conclusion that there are slow solid state reactions, which result in the decomposition of the intermetallic compounds with the 5:4 stoichiometry to the 1:1 and 5:3 stoichiometries at temperatures near and above ~1570 K for $0.43\leq x\leq 0.502$.

The remaining $Gd_5(Si_xGe_{1-x})_4$ alloys, with $0.35\leq x<0.43$ and $0.502<x\leq 0.55$, were annealed at 1570 K for one to 24 hours. The x-ray powder diffraction data were collected after the heat treatment at 1570 K for one to eight hours, depending on the composition. As shown in Table 5, single-phase materials exist over the range $0.375\leq x\leq 0.525$. Two of the 15 alloys, $Gd_5(Si_{0.35}Ge_{0.65})_4$ and $Gd_5(Si_{0.55}Ge_{0.45})_4$, were predominantly orthorhombic but contained detectable amounts of the neighboring monoclinic $Gd_5Si_2Ge_2$-type phase when heat treated at 1570 K for short periods of time (from one to two and one to four hours, respectively). Longer heat treatments (three to 24 hours) resulted in single phase $Gd_5(Si_{0.35}Ge_{0.65})_4$ with the $Sm_5Ge_4$-type structure and single phase $Gd_5(Si_{0.55}Ge_{0.45})_4$ with the $Gd_5Si_4$-type structure. It appears, therefore, that the monoclinic solid solution in the $Gd_5(Si_xGe_{1-x})_4$ system extends from x=0.375 to x=0.525 at 1570 K. The lattice parameters of the monoclinic $Gd_5Si_2Ge_2$-type single-phase alloys are in a good agreement with previously published data.

TABLE 5

The as-arc melted alloy stoichiometry and the phase compositions after heat treatment at 1570 K.

| Alloy stoichiometry | Time of heat treatment at 1570 K, hours | Phase composition[a] (structure type) |
|---|---|---|
| $Gd_5(Si_{0.35}Ge_{0.65})_4$ | 1–2 | $Sm_5Ge_4 + Gd_5Si_2Ge_2$ |
| $Gd_5(Si_{0.35}Ge_{0.65})_4$ | 3–24 | $Sm_5Ge_4$ |
| $Gd_5(Si_{0.375}Ge_{0.625})_4$ | 5 | $Gd_5Si_2Ge_2$ |
| $Gd_5(Si_{0.38}Ge_{0.62})_4$ | 3 | $Gd_5Si_2Ge_2$ |
| $Gd_5(Si_{0.4}Ge_{0.6})_4$ | 1 | $Gd_5Si_2Ge_2$ |
| $Gd_5(Si_{0.43}Ge_{0.67})_4$ | 1 | $Gd_5Si_2Ge_2$ |
| $Gd_5(Si_{0.45}Ge_{0.55})_4$ | 1 | $Gd_5Si_2Ge_2$ |
| $Gd_5(Si_{0.488}Ge_{0.512})_4$ | 1 | $Gd_5Si_2Ge_2$ |
| $Gd_5(Si_{0.495}Ge_{0.505})_4$ | 1 | $Gd_5Si_2Ge_2$ |
| $Gd_5(Si_{0.5}Ge_{0.5})_4$ | 1 | $Gd_5Si_2Ge_2$ |
| $Gd_5(Si_{0.502}Ge_{0.495})_4$ | 1 | $Gd_5Si_2Ge_2$ |
| $Gd_5(Si_{0.505}Ge_{0.495})_4$ | 2 | $Gd_5Si_2Ge_2$ |
| $Gd_5(Si_{0.515}Ge_{0.485})_4$ | 4 | $Gd_5Si_2Ge_2$ |
| $Gd_5(Si_{0.522}Ge_{0.475})_4$ | 7 | $Gd_5Si_2Ge_2$ |
| $Gd_5(Si_{0.525}Ge_{0.475})_4$ | 8 | $Gd_5Si_2Ge_2$ |
| $Gd_5(Si_{0.55}Ge_{0.45})_4$ | 1–4 | $Gd_5Si_4 + Gd_5Si_2Ge_2$ |
| $Gd_5(Si_{0.55}Ge_{0.45})_4$ | 5–24 | $Gd_5Si_4$ |

[a]The majority phase, if two are listed, is shown first

Figure 25:
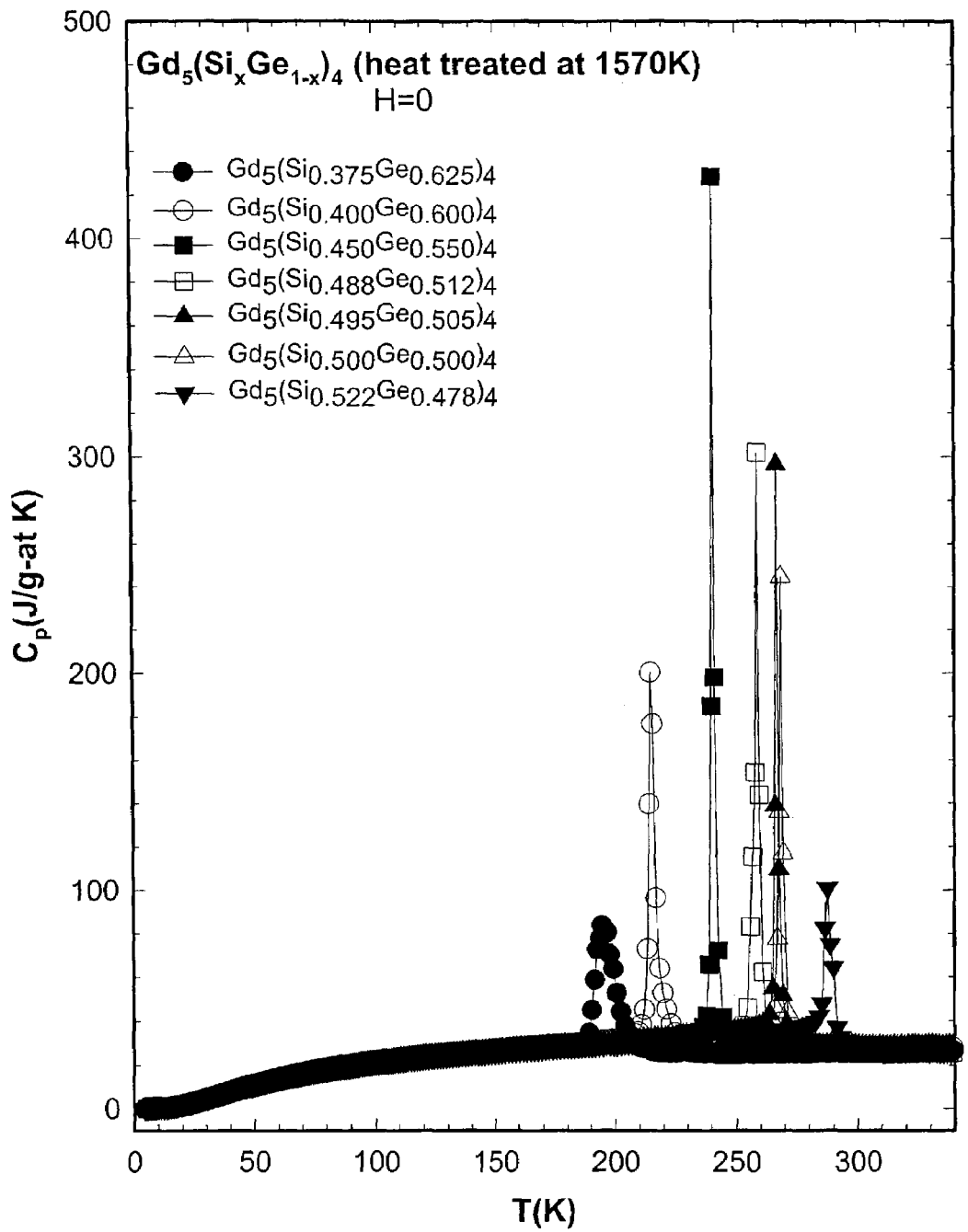
FIG. 25 shows the heat capacity vs. temperature of selected monoclinic alloys in the $Gd_5(Si_xGe_{1-x})_4$ system measured in a zero magnetic field.

FIG. 25 illustrates the heat capacity of seven single-phase alloys measured in zero magnetic field. All materials exhibit a first order phase transformation as evidenced by the characteristic behavior of the heat capacity near their respective phase transition temperatures. The phase transition temperature systematically decreases with the increasing Ge content, which agrees with the results reported for the as arc-melted monoclinic $Gd_5(Si_xGe_{1-x})_4$. The peak values of the heat capacity for the alloys near both ends of the homogeneity range are noticeably lower, and the corresponding heat capacity anomalies are broader, when compared with the alloys in the middle of the same phase region.

A possible explanation of the observed broadening of the heat capacity anomalies is microscopic chemical inhomogeneities retained in the heat-treated alloys upon rapid cooling. As follows from the x-ray powder diffraction and magnetic property data, the as arc-melted samples with the stoichiometries close to the ends of the homogeneity range contain both the monoclinic (the majority) and the orthorhombic (the minority) $Sm_5Ge_4$- or $Gd_5Si_4$-type phases for Ge-rich and Ge-poor compositions, respectively. We expect that chemical compositions of the majority phases are slightly different from the minority phases upon the solidification, as was observed in the slowly solidified large single crystalline grains of $Gd_5(Si_{0.5}Ge_{0.5})_4$. During the annealing, the entire sample transforms into the monoclinic $Gd_5Si_2Ge_2$-type phase. From the similarity of both the Si and Ge, the differences in the respective chemical potentials are small and, therefore, driving force, which controls their redistribution in the solid state during short time heat treatments (see Table 5) is negligible. Hence, the microscopic chemical inhomogeneities are likely preserved in the annealed alloys when they are close to the ends of the single-phase region. Since the Curie temperatures in the monoclinic $Gd_5Si_2Ge_2$-type materials are strongly dependent on the Si to Ge ratio, this results in different fractions of the sample undergoing combined magnetic-crystallographic transformation at slightly different temperatures, which is manifested as the considerable broadening of the respective heat capacity anomalies. On the contrary, the alloys in the middle of the solid solution are quite homogeneous in the as-arc melted state because they only contain the single monoclinic phase and this results in much narrower and higher heat capacity peaks after the heat treatment. Related to chemical inhomogeneity is the following argument: considering that the structural transition is coupled with the magnetic disordering on heating, another possible explanation of this behavior is the higher strain levels that develop in the alloys at the two ends of the homogeneity range when compared to those in the middle.

Figure 26:
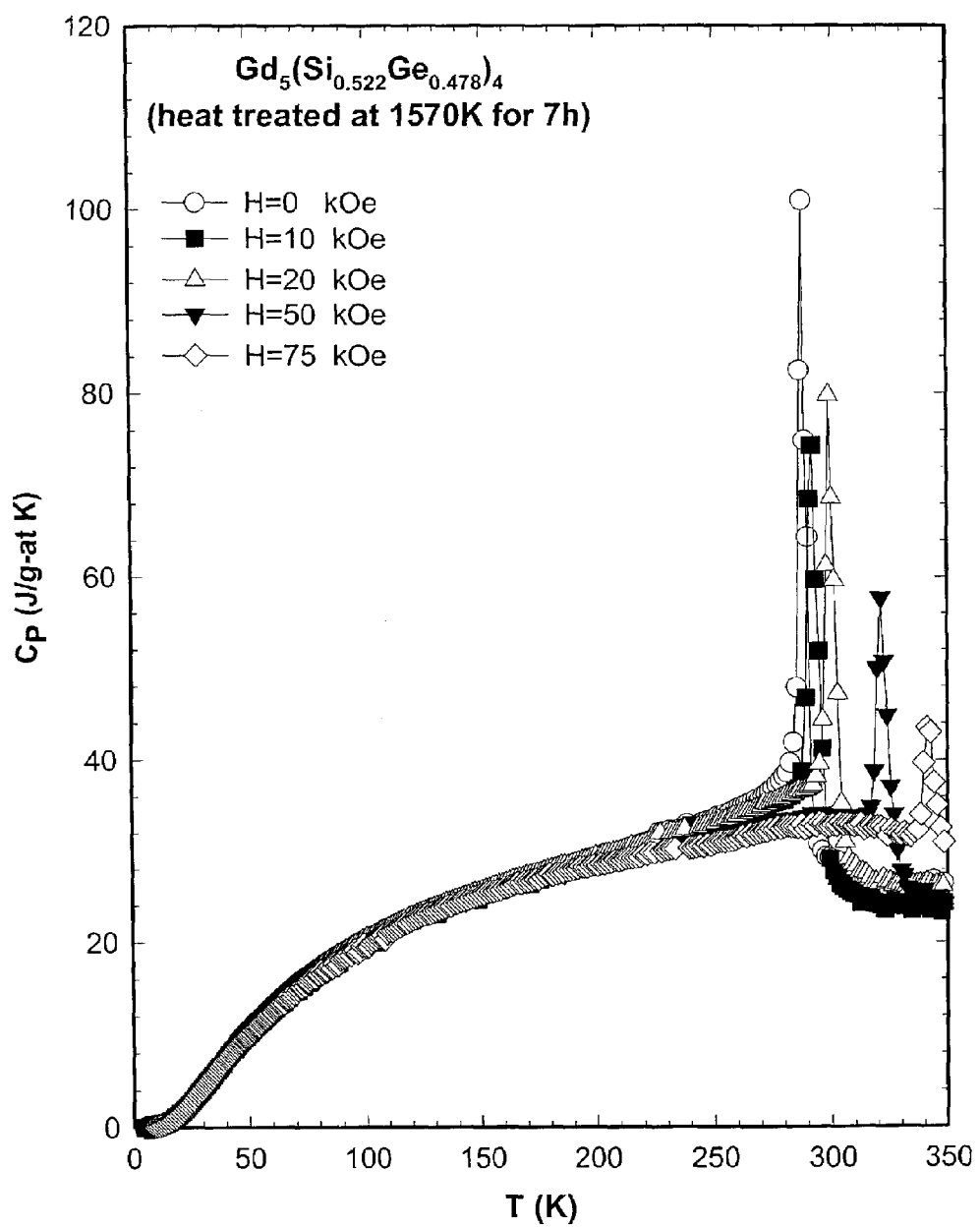
FIG. 26 shows the heat capacity vs. temperature of the $Gd_5Si_{2.09}Ge_{1.91}$ heat treated at 1570K for 7 hours measured in 0, 10, 20, 50, and 75 kOe magnetic fields.

FIG. 26 shows the effect of the magnetic field on the heat capacity of $Gd_5(Si_{0.522}Ge_{0.478})_4$, which became monoclinic after it was heat treated at 1570 K for seven hours. The behavior is typical for first order transformations exhibited by other alloys from the same monoclinic solid solution. With the increasing magnetic field, the maximum of the heat capacity is shifted to a higher temperature at a rate ~0.6 K/kOe, which is similar to other related alloys, e.g. $Gd_5(Si_{0.5}Ge_{0.5})_4$ and $Gd_5(Si_{0.45}Ge_{0.55})_4$. The transformation remains a first order phase transition in the 75 kOe magnetic field. The heat capacity anomaly is not seen in a 100 kOe magnetic field because the phase transition in this magnetic field occurs above 350 K, which exceeds the high temperature limit of our calorimeter.

Figures 27A, 27B:
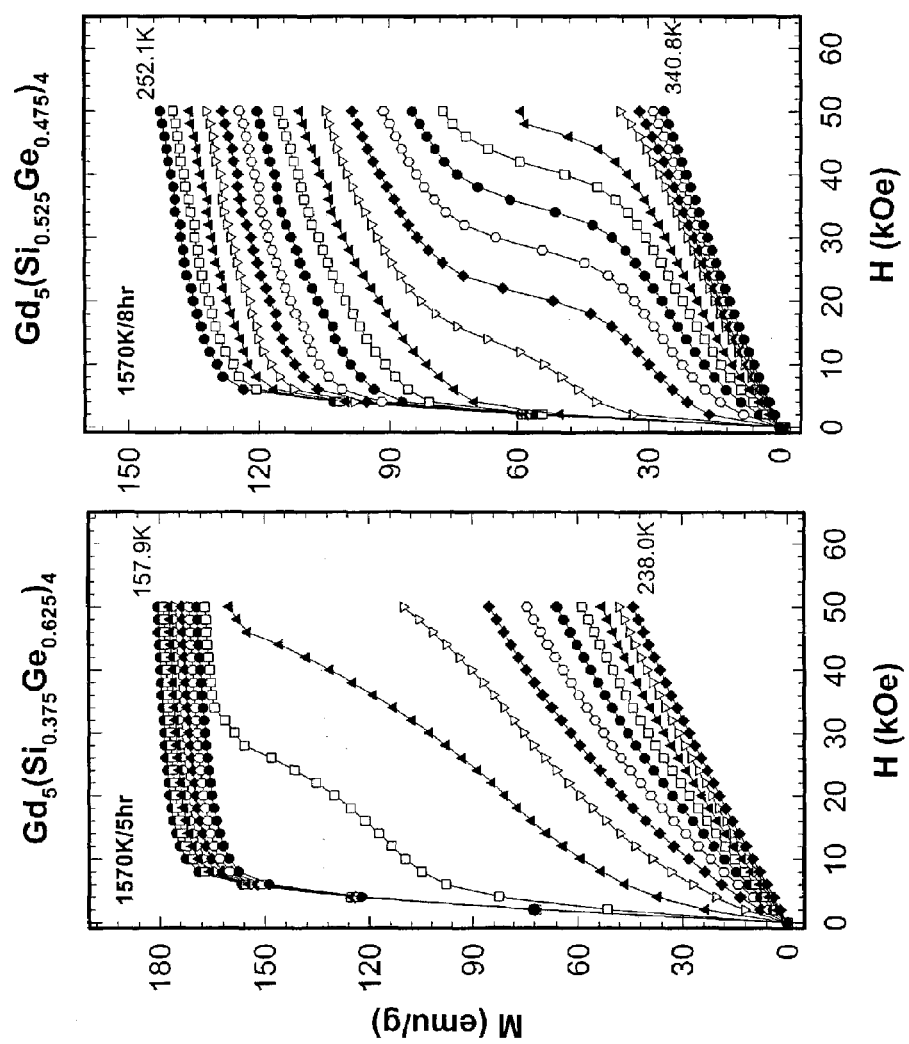
FIGS. 27A, 27B show the magnetization vs. magnetic field of the $Gd_5Si_5Si_{1.5}Ge_{2.0}$ and $Gd_5Si_{2.1}Ge_{1.9}$ alloys heat treated at 1570K for 5 and 8 hours, respectively, in the vicinities of their phase transition temperatures.
Figure 28:
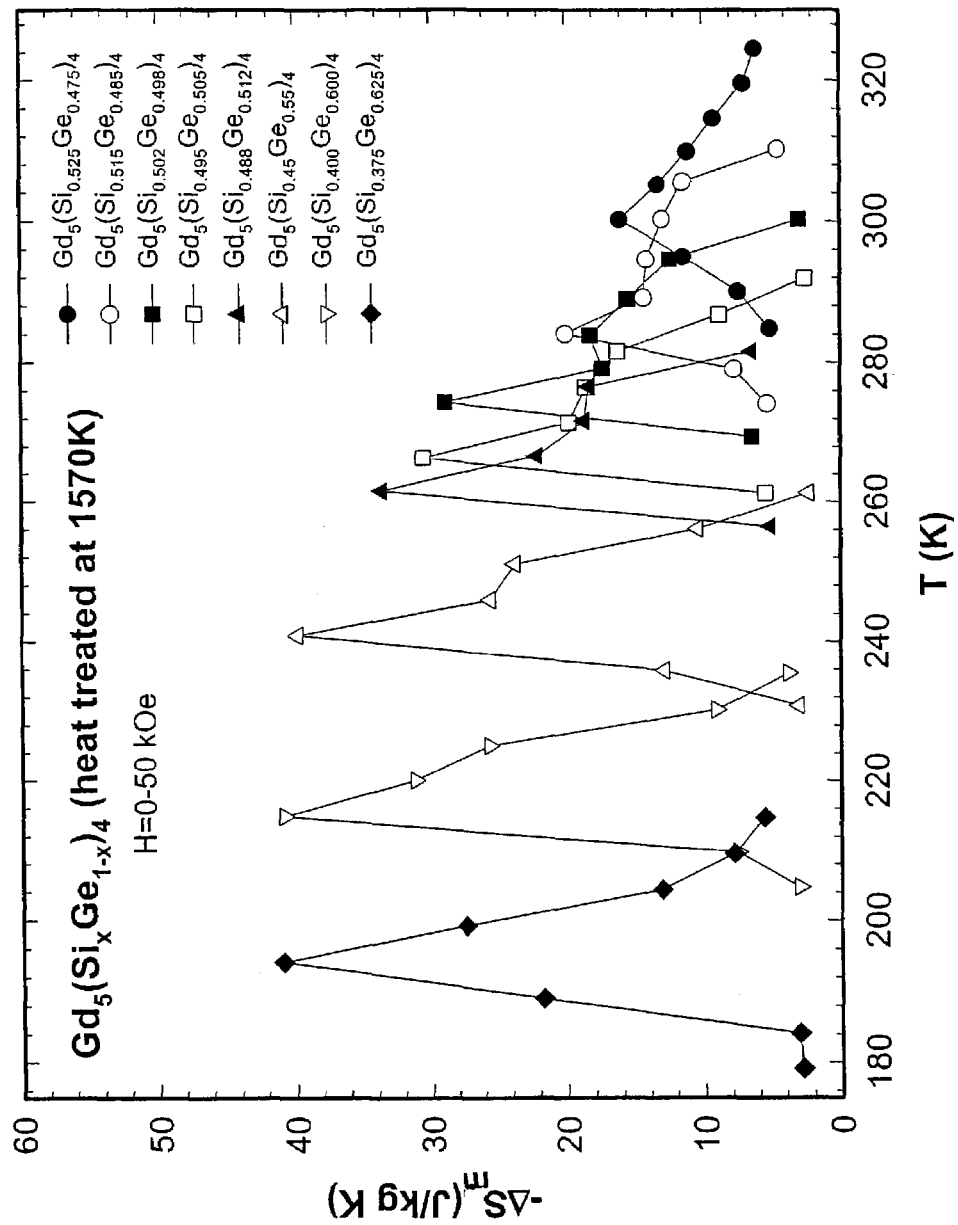
FIG. 28 shows the MCE for a 0 to 50 kOe magnetic field change calculated from magnetization data for selected monoclinic $Gd_5Si_2Ge_2$-type alloys in the $Gd_5(Si_xGe_{1-x})_4$ system.
Figure 29:
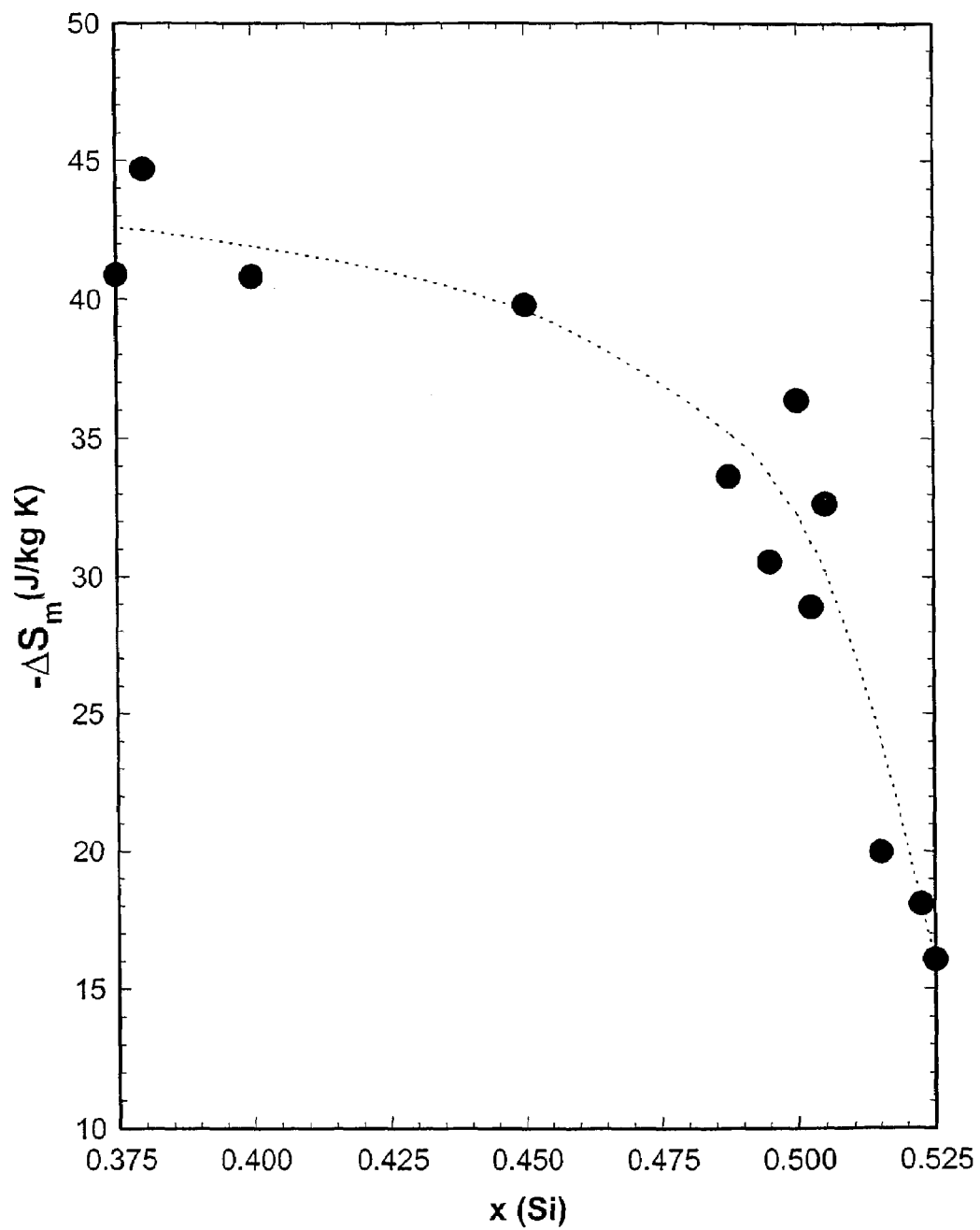
FIG. 29 shows the maximum value of $-\Delta S_m$ as a function of Si content (x). The dashed line drawn through the data points is a guide for the eye.

The isothermal magnetization as a function of a magnetic field in the vicinities of the respective transition temperatures was measured for all single-phase materials with the room temperature monoclinic crystal structure. It is shown in FIGS. 27A, 27B for the two terminal compositions: $Gd_5(Si_{0.375}Ge_{0.625})_4$ ($T_C$=~195 K) and $Gd_5(Si_{0.525}Ge_{0.475})_4$ ($T_C$=~297 K). The metamagnetic-like behavior of the magnetization in the transition region is typical for all other monoclinic alloys in the $Gd_5(Si_{1-x}Ge_x)_4$ system. The isothermal magnetic entropy change ($-\Delta S_m$) was calculated from the magnetization isotherms for all of the single-phase alloys, and it is shown in FIG. 28 for a 0 to 50 kOe magnetic field change with a few omissions for clarity. The maximum value of $-\Delta S_m$ systematically increases in a non-linear fashion with the decreasing Si concentration (see FIG. 29) and all alloys exhibit the giant magnetocaloric effect. Most importantly, the two alloys, $Gd_5(Si_{0.522}Ge_{0.478})_4$ (not shown in FIG. 28 for clarity) and $Gd_5(Si_{0.55}Ge_{0.45})_4$, exhibit the giant magnetocaloric effect at and slightly above room temperature: the $-\Delta S_m$ reaches 18 and 16 J/kg K at 292 and 301 K, respectively, for the 0 to 50 kOe magnetic field change. For comparison, high purity Gd metal exhibits $-\Delta S_m$=11 J/kg K at 293 K for the same magnetic field change. A second trend is clearly observed in $-\Delta S_m$ as a function of temperature (and composition): although the maximum values of $-\Delta S_m$ are lower for the Si-rich alloys, the width of the MCE peak increases and becomes nearly 30% broader for the $Gd_5(Si_{0.55}Ge_{0.45})_4$ when compared with the $Gd_5(Si_{0.375}Ge_{0.625})_4$ stoichiometry. It is, therefore, apparent that the overall cooling capacity (which can be estimated as the area under the $-\Delta S_m$ peaks) of the monoclinic $Gd_5(Si_xGe_{1-x})_4$ alloys remains nearly constant regardless of their composition.

The behavior discussed in the previous paragraph may be understood from the following considerations. The magnetocaloric effect is directly proportional to the derivative of the magnetization with respect to temperature at a constant magnetic field, $(\partial M/\partial T)_H$. Assuming that the magnetically ordered structures of the $Gd_5(Si_xGe_{1-x})_4$ alloys with $0.375 \leq x \leq 0.525$ remain identical, the overall change of the bulk magnetization upon the transition from the magnetically ordered to the magnetically disordered states should remain nearly constant (on per mole basis). However, since the transformation temperature increases from ~200 to ~300 K, the increased thermal fluctuations of the crystal lattice broaden the FM→PM phase transition and reduce the corresponding $|(\partial M/\partial T)_H|$ thus systematically reducing the maximum $-\Delta S_m$. On the other hand, because the overall change of the magnetization is expected to be the same, so is the cooling capacity of these alloys. A small dependence of the $-\Delta S_m$ (expressed in units J/kg K) on the composition (when the lighter Si is substituted for the heavier Ge) can be neglected because it corresponds to less than 3% reduction of the molecular weight when x changes from 0.375 to 0.525.

Figure 30:
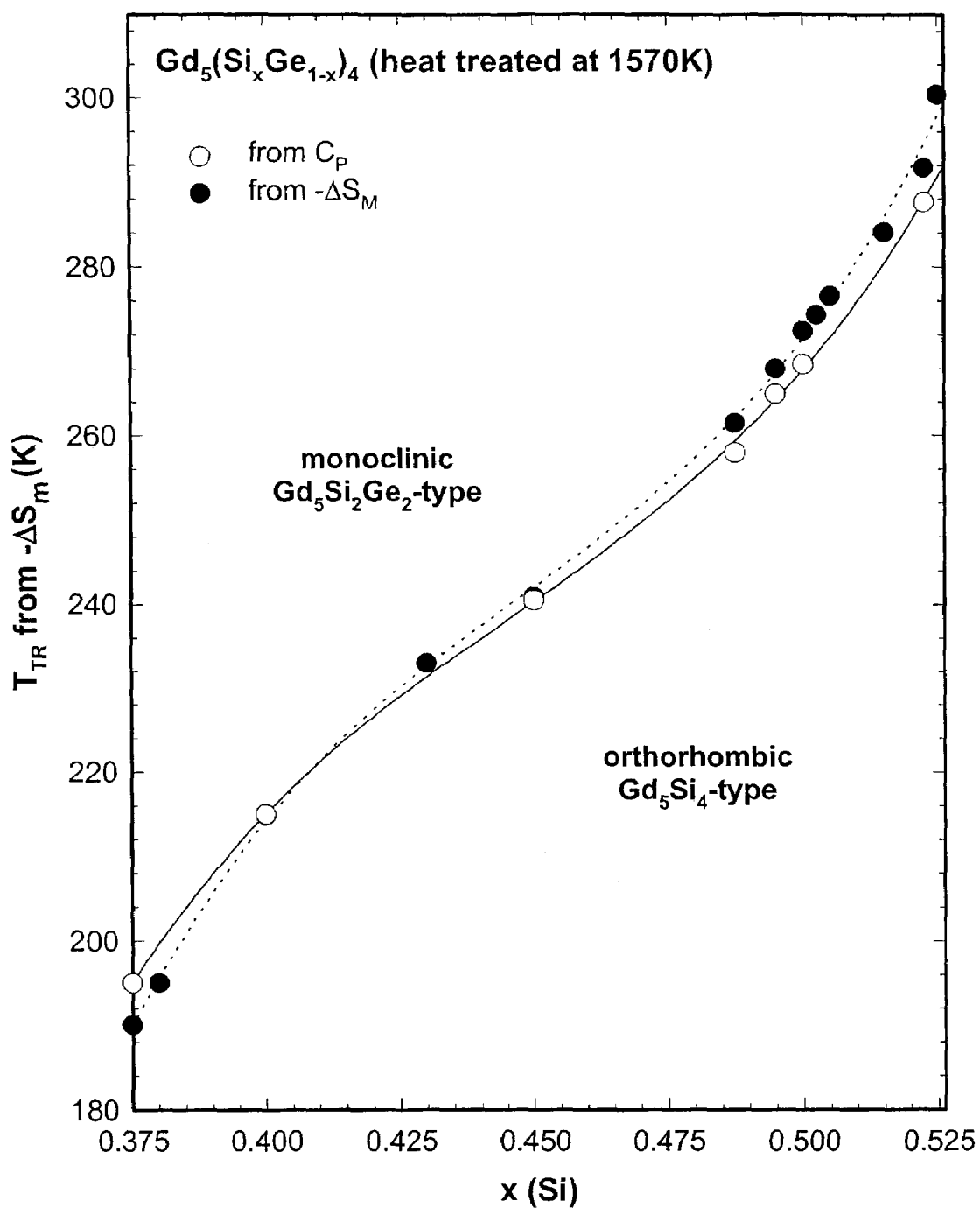
FIG. 30 shows transition temperatures determined from the locations of the heat capacity maximum observed in zero magnetic field data and the temperatures at which the maximum $|-\Delta S_m|$ occur.

FIG. 30 shows the first order phase transition temperatures determined from the locations of the heat capacity maximum (zero magnetic field data), and the temperatures at which the maximum $-\Delta S_m$ (calculated from the magnetization isotherms for a 0 to 50 kOe magnetic field change) occur. The two sets of data are in excellent agreement. The temperature at which the maximum magnetocaloric effect is observed in the monoclinic $Gd_5(Si_xGe_{1-x})_4$ alloys increases with increasing Si content and reaches ~300 K for $Gd_5(Si_{0.525}Ge_{0.475})_4$. It is interesting to note that there is a tendency to a deviation from linearity at either end of the homogeneity range. This trend, once again may be the result of intrinsic compositional inhomogeneities expected to persist in the alloys near x=0.375 and x=0.525

It is apparent from the above Example that the intermediate intermetallic phase with the monoclinic $Gd_5Si_2Ge_2$-type crystal structure at room temperature can be retained at ambient conditions after short (one to eight hours) heat treatment at 1570 K within the range of compositions from $Gd_5(Si_{0.375}Ge_{0.625})_4$ to $Gd_5(Si_{0.525}Ge_{0.475})_4$. All alloys exhibit the giant magnetocaloric, which varies from 46 J/kg K at 195 K in $Gd_5(Si_{0.375}Ge_{0.625})_4$ to 16 J/kg K at 301 K in $Gd_5(Si_{0.525}Ge_{0.475})_4$ for the 0 to 50 kOe magnetic field change, and is associated with the coupled first order magnetic-crystallographic phase transformation occurring in the title alloys. The temperature, where the large magnetocaloric effect is observed can be easily adjusted between ~190K and 300 K by varying the chemical composition (i.e. the Si to Ge ratio) of the materials between $Gd_5(Si_{0.375}Ge_{0.625})_4$ and $Gd_5(Si_{0.525}Ge_{0.475})_4$.

The heat treating procedures described for $Gd_5(Si_xGe_{1-x})_4$ alloys prepared using high purity Gd also work for the corresponding compounds prepared by using commercial grade Gd. For example, a 1.05 kg sample of $Gd_5(Si_{0.522}Ge_{0.478})_4$ which had been heat treated at 1400° C. for 4 hours and rapidly cooled to room temperature had an entropy change $(-\Delta S_m)$ of 16 J/kg K and a magnetic ordering transition temperature of 283 K. Likewise, values of 16 J/kg K for the entropy change and 279 K for the magnetic ordering temperature were measure on $Gd_5(Si_{0.515}Ge_{0.485})_4$ which was prepared by using a commercial grade of Gd metal. These results are quite similar to those found for the corresponding $Gd_5(Si_xGe_{1-x})_4$ alloys prepared from high purity Gd.

The teachings of the references listed below are incorporated herein by reference.

It will be understood that the above description of the invention is susceptible to various modifications, changes, and adaptations, and the same are intended to be comprehended within the scope of the appended claims.

REFERENCES

1. V. K. Pecharsky and Karl A. Gschneidner, Jr., "$Gd_5(Si_xGe_{1-x})_4$: An Extremum Material", Adv. Mater. 13, 683–686 (2001).
2. D. H. Dennison, M. J. Tschetter and K. A. Gschneidner, Jr., "The Solubility of Tantalum in Eight Liquid Rare-Earth Metals" J. Less-Common Metals 10, 109–115 (1965).
3. V. K. Pecharsky and K. A. Gschneidner, Jr., "Giant Magnetocaloric Effect in $Gd_5(Si_2Ge_2)$", Phys. Rev. Lett. 78, 4494–4497 (1997).
4. V. K. Pecharsky and K. A. Gschneidner, Jr., "Effect of Alloying on the Giant Magnetocaloric Effect of $Gd_5(Si_2Ge_2)$", J. Magn. Magn. Mater. 167, L179–L184 (1997).
5. V. K. Pecharsky and K. A. Gschneidner, Jr., "Tunable Magnetic Regenerator Alloys with a Giant Magnetocaloric Effect for Magnetic Refrigeration from ~20 to ~290K", Appl. Phys. Lett. 70, 3299–3301 (1997).
6. P. Rogl, "Phase Equilibria in Ternary and Higher Order Systems with Rare Earth Elements and Silicon" in Handbook on the Physics and Chemistry of Rare Earths, K. A. Gschneidner, Jr. and L. Eyring, eds., Elsevier Science Publishers, B. V., Amsterdam, pp. 92–94 (1984).
7. V. K. Pecharsky and K. A. Gschneidner, Jr., "Magnetocaloric Effect From Indirect Measurements: Magnetization and Heat Capacity", J. Appl. Phys. 86, 565–575 (1999).
8. V. K. Pecharsky, J. O. Moorman, and K. A. Gschneidner, Jr., "A 3–350 K Fast Automatic Small Sample Calorimeter", Rev. Sci. Instrum. 68, 4196–4207 (1997).

We claim:

1. Heat treated material comprising $Gd_5(Si_xGe_{1-x})_4$ where $0.47 \leq x \leq 0.56$, said material exhibiting in an annealed condition a magnetic entropy change $(-\Delta S_m)$ that is higher than that exhibited when in the as-solidified, unheat treated condition for a magnetic field change of 0 to 50 kOe at a temperature of about 300K and below.

2. The material of claim 1 also exhibiting a magnetostriction of at least 2000 parts per million and a magnetoresistance of at least 5%.

3. The material of claim 1 having a homogeneous microstructure comprising monoclinic crystallographic phase $Gd_5(Si_xGe_{1-x})_4$ for $0.47 \leq x \leq 0.56$ and orthorhombic (II) crystallographic phase $Gd_5(Si_xGe_{1-x})_4$ for a mixture thereof for $0.5 \leq x \leq 0.56$.

4. The material of claim 1 having been annealed between 800 to 1600 degrees C. for a time.

5. Heat treated material comprising $R_5(Si_xGe_{1-x})_4$ where $0 \leq x \leq 1.0$ and R is one or more rare earth elements other than Gd, said material exhibiting in an annealed condition a magnetic entropy change $(-\Delta S_m)$ that is higher than that exhibited when in the as-solidified, unheat treated condition for a magnetic field change of 0 to 50 kOe at a temperature of about 300K and below.

6. The material of claim 5 also exhibiting a magnetostriction of at least 2000 parts per million and a magnetoresistance of at least 5%.

7. Heat treated material comprising $(R_{1-y}R'_y)_5(Si_xGe_{1-x})_4$ where $0 \leq y \leq 1.0$ and $0 \leq x \leq 1.0$ and where R and R' each is a rare earth element and at least one of R and R' is other than Gd, said material exhibiting in an annealed condition a magnetic entropy change $(-\Delta S_m)$ that is higher than that exhibited when in the as-solidified, unheat treated condition for a magnetic field change of 0 to 50 kOe at a temperature of about 300K and below.

8. The material of claim 7 also exhibiting a magnetostriction of at least 2000 parts per million and a magnetoresistance of at least 5%.

* * * * *

UNITED STATES PATENT AND TRADEMARK OFFICE
CERTIFICATE OF CORRECTION

PATENT NO. : 7,114,340 B2 Page 1 of 1
APPLICATION NO. : 10/413417
DATED : October 3, 2006
INVENTOR(S) : Alexandra O. Pecharsky et al.

It is certified that error appears in the above-identified patent and that said Letters Patent is hereby corrected as shown below:

Column 28, line 27; replace "for" (first occurrence) with -- "or" --.
Column 28, line 28; replace "$0.5 \leqq x \leqq 0.56$" with -- "$0.5 < x \leqq 0.56$" --.
Column 28, line 32; replace "$0 \leqq x \leqq 1.0$" with -- "$0 < x < 1.0$" --.
Column 28, line 35; delete "when".
Column 28, line 42; replace "$0 \leqq y \leqq 1.0$" with -- "$0 < y < 1.0$" --.
Column 28, line 42; replace "$0 \leqq x \leqq 1.0$" with -- "$0 < x < 1.0$" --.

Signed and Sealed this

Twentieth Day of March, 2007

JON W. DUDAS
*Director of the United States Patent and Trademark Office*